(12) United States Patent
Havlik et al.

(10) Patent No.: US 10,206,410 B2
(45) Date of Patent: Feb. 19, 2019

(54) REDUCED WATER ACTIVITY YOGURT

(71) Applicant: The Quaker Oats Company, Chicago, IL (US)

(72) Inventors: Steven E. Havlik, Rolling Meadows, IL (US); Patrick J. Patterson, Palatine, IL (US); Brian Sambor, Vernon Hills, IL (US); John F. Schuette, Woodstock, IL (US)

(73) Assignee: The Quaker Oats Company, Chicago, IL (US)

( * ) Notice: Subject to any disclaimer, the term of this patent is extended or adjusted under 35 U.S.C. 154(b) by 18 days.

(21) Appl. No.: 14/946,578

(22) Filed: Nov. 19, 2015

(65) Prior Publication Data

US 2016/0143304 A1  May 26, 2016

Related U.S. Application Data

(60) Provisional application No. 62/257,149, filed on Nov. 18, 2015, provisional application No. 62/083,109, filed on Nov. 21, 2014.

(51) Int. Cl.
*A23C 9/123* (2006.01)
*A23C 9/13* (2006.01)
(Continued)

(52) U.S. Cl.
CPC .............. *A23C 9/1307* (2013.01); *A23C 1/12* (2013.01); *A23C 9/123* (2013.01); *A23C 9/1206* (2013.01); *A23C 2260/05* (2013.01)

(58) Field of Classification Search
CPC ..... A23C 9/1206; A23C 9/123; A23C 9/1307; A23C 1/12
(Continued)

(56) References Cited

U.S. PATENT DOCUMENTS 1,062,133 A * 5/1913 Vouga ...................... A23C 1/12
                                                         159/13.1
1,365,055 A * 1/1921 Merrell ..................... A23C 1/12
                                                         159/43.2
(Continued)

FOREIGN PATENT DOCUMENTS

DE          19650106 A1     11/1997
EP          0122104         10/1984
(Continued)

OTHER PUBLICATIONS

Kumar, P. and Mishra, H. N., "Yoghurt Powder—A Review of Process Technology, Storage and Utilization," Trans IChemE, Part C, Food and Bioproducts Processing, 2004, 82(C2): 133-142.*
(Continued)

*Primary Examiner* — Jeffrey P Mornhinweg
(74) *Attorney, Agent, or Firm* — Brandon V. Zuniga; James R. Gourley; Carstens & Cahoon, LLP

(57) ABSTRACT

A composition and method for a high solids yogurt with reduced water activity. The high solids yogurt can be formed, for example, by culturing a high solids milk. Lactose present in the high solids milk can be hydrolyzed to glucose and galactose. Water activity of the yogurt can be further reduced by applying a vacuum-dehydration process to the high solids yogurt. The water activity of the yogurt can also be reduced by adding solutes to the yogurt. The composition can be used in food products, either in isolation or in combination with other components, for example, grain-based components.

30 Claims, 31 Drawing Sheets

(51) Int. Cl.
*A23C 9/12* (2006.01)
*A23C 1/12* (2006.01)

(58) Field of Classification Search
USPC .......................................................... 426/42
See application file for complete search history.

(56) References Cited

U.S. PATENT DOCUMENTS

| | | | |
|---|---|---|---|
| 4,216,243 A | | 8/1980 | Hermann |
| 4,258,064 A | * | 3/1981 | Michener, Jr. ......... A23C 9/137 |
| | | | 426/43 |
| 4,695,472 A | | 9/1987 | Dunn |
| 4,956,185 A | | 6/1990 | Cajigas |
| 4,956,186 A | | 9/1990 | Streiff |
| 5,093,137 A | | 3/1992 | Shazer |
| 5,573,793 A | | 11/1996 | Saintain |
| 5,853,593 A | | 12/1998 | Miller |
| 6,103,283 A | * | 8/2000 | Zukerman ............... A23L 7/126 |
| | | | 426/285 |
| 6,399,122 B2 | | 6/2002 | Vandeweghe |
| 6,592,915 B1 | | 7/2003 | Froseth et al. |
| 7,323,199 B2 | | 1/2008 | De Vuyst |
| 7,351,439 B2 | | 4/2008 | Zukerman et al. |
| 7,842,325 B2 | | 11/2010 | Fitzsimmons et al. |
| 8,715,758 B2 | | 5/2014 | Pannell et al. |
| 2004/0052909 A1 | | 3/2004 | Contento |
| 2005/0084565 A1 | | 4/2005 | Gutknecht |
| 2005/0129825 A1 | | 6/2005 | Gray |
| 2005/0255192 A1 | | 11/2005 | Chaudhry |
| 2006/0068075 A1 | | 3/2006 | Fultz et al. |
| 2006/0134285 A1 | | 6/2006 | Schnieber et al. |
| 2007/0202235 A1 | | 8/2007 | Gramza et al. |
| 2009/0186124 A1 | | 7/2009 | Schaffer-Lequart |
| 2009/0269446 A1 | * | 10/2009 | Rabault ................... A23G 1/305 |
| | | | 426/94 |
| 2009/0304864 A1 | | 12/2009 | Marchal et al. |
| 2009/0317514 A1 | | 12/2009 | Sizer |
| 2010/0297294 A1 | * | 11/2010 | Ur-Rehman ........... A23C 9/123 |
| | | | 426/42 |
| 2011/0244091 A1 | | 10/2011 | Zukerman et al. |
| 2011/0250327 A1 | | 10/2011 | Smith et al. |
| 2013/0078356 A1 | | 3/2013 | Mackereth |
| 2013/0156889 A1 | | 6/2013 | Schroeder |
| 2015/0351432 A1 | | 12/2015 | Triantafyllou |

FOREIGN PATENT DOCUMENTS

| | | | |
|---|---|---|---|
| EP | 2671453 A1 | 12/2013 | |
| FR | 2905560 | 3/2008 | |
| WO | 2007051816 A1 | 2/2004 | |
| WO | 2004016103 A1 | 5/2007 | |
| WO | WO2013/009182 A1 * | 1/2013 | |

OTHER PUBLICATIONS

PCT Application No. PCT/US2015/061969 International Search Report and Written Opinion dated Feb. 9, 2016.
PCT Application No. PCT/US2015/061936 International Search Report and Written Opinion dated Feb. 2, 2016.
Anonymous: "Cranberry and Yogurt Soft Baked Oatmeal Cookies", Minitel's global new product database (GNPD), Jan. 31, 2014, pp. 1-3, XP055480652, url: http://www.gnpd.com/sinatra/recordpage/2295469/from)search/Ni9PTi6bqf/?page=18.
Anonymous: "Yogurt Muffins", Minitel's global new product database (GNPD), Oct. 31, 2012, pp. 1-2, XP055480662, url: http://www.gnpd.com/sinatra/recordpage/1896067/from_search/Ni9PTi6bqf/?page=22.
Rybka S.: "The Survival of Culture Bacteria in Fresh and Freeze-Dried AB Yoghurts", Australian Journal of Dairy Technology, Dairy Industry Association of Australia, Melbourne, AU, vol. 50, No. 2, Nov. 1, 1995, pp. 51-57, XP000543353.

* cited by examiner

[A] FROM FIG. 12A

125

COEXTRUDED CENTER-FILLED BAKED BAR

| FORMULA: | | | | |
|---|---|---|---|---|
| COMBINING PERCENTAGE | 45.00 | 55.00 | BAR | BAR |
| | FILLING | DOUGH | PRE-BAKE | POST-BAKE |
| INGREDIENT | (wt%) | (wt%) | (wt%) | (wt%) |
| HIGH SOLIDS YOGURT | 53.85 | | 24.23 | 26.10 |
| GLYCERIN | 18.21 | | 8.19 | 8.82 |
| CRYSTALLINE FRUCTOSE | 6.24 | | 2.81 | 3.03 |
| HONEY | 6.24 | 0.25 | 2.95 | 3.18 |
| MILK PERMEATE | 2.02 | | 0.91 | 0.98 |
| STARCH, MiraThik 468 | 2.67 | | 1.20 | 1.29 |
| STARCH, MiraGel 463 | 3.00 | | 1.35 | 1.45 |
| STARCH, LoTemp 588 | 1.60 | | 0.72 | 0.78 |
| XANTHAN GUM | 0.12 | | 0.05 | 0.05 |
| SUCROSE | 4.00 | 13.33 | 9.13 | 9.83 |
| LACTIC ACID (60%) | 1.75 | | 0.79 | 0.85 |
| POTASSIUM SORBATE | 0.30 | 0.30 | 0.30 | 0.32 |
| WHEAT FLOUR | | 39.72 | 21.85 | 23.54 |
| NONFAT DRY MILK | | 4.01 | 2.21 | 2.38 |
| VANILLA FLAVOR | | 0.13 | 0.07 | 0.08 |
| SALT | | 0.53 | 0.29 | 0.31 |
| BAKING POWDER | | 0.53 | 0.29 | 0.31 |
| WATER | | 13.01 | 7.16 | |
| VEGETABLE OIL | | 9.82 | 5.40 | 5.82 |
| INVERT SUGAR SYRUP | | 5.86 | 3.22 | 3.47 |
| LECITHIN | | 0.40 | 0.22 | 0.24 |
| EGG WHITE SOLIDS | | 0.03 | 0.02 | 0.02 |
| OAT FLAKES | | 12.08 | 6.64 | 7.15 |
| | | | | |
| TOTAL | 100.00 | 100.00 | 100.00 | 100.00 |

B ← FROM FIG. 13A

| LAYERED BAKED BAR | | | | |
|---|---|---|---|---|
| FORMULA: | | | | |
| COMBINING PERCENTAGE | 48.00 | 52.00 | ROPES/BAR | BAR |
| | TOP | BOTTOM | PRE-BAKE | POST-BAKE |
| INGREDIENT | (wt%) | (wt%) | (wt%) | (wt%) |
| HIGH SOLIDS YOGURT | 53.07 | | 25.47 | 28.44 |
| GLYCERIN | 17.95 | | 8.62 | 9.63 |
| CRYSTALLINE FRUCTOSE | 6.15 | | 2.95 | 3.30 |
| HONEY | 6.15 | | 2.95 | 3.30 |
| MILK PERMEATE | 1.99 | | 0.96 | 1.07 |
| STARCH, MiraThik 468 | 2.64 | | 1.27 | 1.42 |
| STARCH, MiraGel 463 | 4.00 | 1.00 | 2.44 | 2.73 |
| SUCROSE | 6.00 | | 2.88 | 3.22 |
| LACTIC ACID (60%) | 1.75 | | 0.84 | 0.94 |
| POTASSIUM SORBATE | 0.30 | 0.30 | 0.30 | 0.34 |
| VEGETABLE OIL | | 2.40 | 1.25 | 1.40 |
| WATER | | 20.18 | 10.49 | |
| INVERT SUGAR SYRUP | | 8.00 | 4.16 | 4.65 |
| BROWN SUGAR | | 8.00 | 4.16 | 4.65 |
| WHOLE OAT FLOUR | | 5.65 | 2.94 | 3.28 |
| DRY POWDERED YOGURT | | 4.70 | 2.44 | 2.73 |
| DRIED WHOLE EGGS | | 1.30 | 0.68 | 0.76 |
| SALT | | 0.20 | 0.10 | 0.11 |
| SODIUM BICARBONATE | | 0.25 | 0.13 | 0.15 |
| MALTED BARLEY EXTRACT | | 0.70 | 0.36 | 0.40 |
| CALCIUM CARBONATE | | 0.65 | 0.34 | 0.38 |
| MIXED TOCOPHEROLS | | 0.07 | 0.04 | 0.04 |
| OAT FLAKES | | 22.50 | 11.70 | 13.06 |
| DICED ALMONDS | | 8.00 | 4.16 | 4.65 |
| DICED CRANBERRIES, DRIED | | 16.10 | 8.37 | 9.35 |
| TOTAL | 100.00 | 100.00 | 100.00 | 100.00 |
| | 133 | 134 | 135 | 136 |

106

FROM FIG. 14A

C

| YOGURT FILLED MUFFIN | | | | |
|---|---|---|---|---|
| FORMULA: | | | | |
| COMBINING PERCENTAGE | 30.00 | 70.00 | MUFFIN | MUFFIN |
| | FILLING | BATTER | PRE-BAKE | POST-BAKE |
| INGREDIENT | (wt%) | (wt%) | (wt%) | (wt%) |
| HIGH SOLIDS YOGURT | 58.62 | | 17.58 | 18.50 |
| GLYCERIN | 18.21 | | 5.46 | 5.74 |
| CRYSTALLINE FRUCTOSE | 6.24 | | 1.87 | 1.97 |
| HONEY | 6.24 | | 1.87 | 1.97 |
| MILK PERMEATE | 2.02 | | 0.61 | 0.64 |
| STARCH, MiraThik 468 | 1.50 | | 0.45 | 0.47 |
| STARCH, LoTemp 588 | 1.00 | | 0.30 | 0.32 |
| XANTHAN GUM | 0.12 | | 0.04 | 0.04 |
| SUCROSE | 4.00 | 10.26 | 8.38 | 8.82 |
| LACTIC ACID (60%) | 1.75 | | 0.53 | 0.56 |
| POTASSIUM SORBATE | 0.30 | | 0.09 | 0.09 |
| PASTRY FLOUR | | 17.88 | 12.51 | 13.17 |
| BAKING POWDER | | 2.25 | 1.58 | 1.66 |
| SALT | | 0.38 | 0.27 | 0.28 |
| EGGS | | 7.88 | 5.52 | 5.81 |
| MILK | | 27.52 | 19.25 | 20.25 |
| BUTTER | | 9.00 | 6.30 | 6.63 |
| OAT FLOUR | | 8.88 | 6.22 | 6.54 |
| OAT FLAKES | | 8.88 | 6.22 | 6.54 |
| WATER | | 7.07 | 4.95 | |
| | | | | |
| TOTAL | 100.00 | 100.00 | 100.00 | 100.00 |
| | 109 | 144 | 145 | 146 |

REDUCED WATER ACTIVITY YOGURT

CROSS-REFERENCE TO RELATED APPLICATIONS

This application is a nonprovisional of, and claims priority to, U.S. Provisional Patent Application No. 62/257,149, filed Nov. 18, 2015, and is a nonprovisional of and claims priority to, U.S. Provisional Patent Application No. 62/083,109, filed Nov. 21, 2014, which are both incorporated by reference in their entirety as illustrative examples.

BACKGROUND OF THE INVENTION

1. Technical Field

The present invention relates to a yogurt with reduced water activity. The invention also relates to food products that comprise a yogurt with reduced water activity. Examples of food products made with reduced water activity yogurt include but are not limited to food bars, cookies, bakery products and cereals, including but not limited to breakfast cereals. In comparison to food products made using conventional yogurt, products made using reduced water activity yogurt can have greater microbiological stability, slower rates of degradation processes, and longer shelf lives.

2. Background

Food products comprising yogurt are preferred by many consumers for yogurt's health and taste benefits. For example yogurt has health benefits associated with milk, such as calcium for strong bones. Live cultures present in yogurt are another potential benefit. In addition, the texture and mouthfeel of a product like yogurt can also make it more desirable. For example, U.S. Pub. No. 2011/0250327 to Smith, et al. describes an effort to produce a chewy and intermediate moisture bar resembling the texture and mouthfeel of candy bars.

With respect to yogurt specifically, there has been an industry-wide desire by food product manufacturers to include yogurt in the formulation of food products for its taste, texture, mouthfeel and health benefits. However, when dairy components are added to a product, spoilage can be a problem. For example, U.S. Pat. No. 7,351,439 to Zukerman, et al. describes a dairy product that must be stored refrigerated or frozen.

Apart from refrigeration, one potential solution to spoilage is heating a product to dehydrate it, but dehydration can result in undesirable textural changes in a product. For example, chewy bars tend to have water activities in the range of 0.3 to 0.65. Dehydrating one of these chewy bars will often result in a bar with a lower water activity, which is correlated with firmer or crunchier bars. For example, Smith et al. notes that crunchy bars generally have water activities of less than about 0.5 and, in some cases, around 0.2 to 0.3.

Another potential solution to spoilage and an alternative to using a dehydrated bar is a fully-cooked bar with a water activity that is somewhat higher than the water activities of crunchy bars. U.S. Pub. No. 2011/0244091 to Zukerman, et al. describes a process for producing yogurt and cereal bars, rice pudding bars, and milk and cereal bars that provide handheld milk and cereal breakfasts that are fully cooked and have water activities that are higher than 0.85. However, using a higher water activity is problematic because pathogenic microorganisms can survive at water activities above about 0.85. For example, Staph aureus will grow at a water activity of about 0.86.

Another means of reducing water activity that avoids dehydration is increasing the solids concentration of a product. One example of a high solids dairy-based food can be found in U.S. Pat. No. 7,842,325 to Fitzsimons, et al. Fitzsimons, et al. describes a method of making a high solids, high protein dairy-based food, but it is preferably used for a cheese or cheese-like product having a protein to water ratio of between 0.6 and 3.0. Furthermore, the dairy-based food of Fitzsimons, et al. is made from a milk protein concentrate containing at least 60% protein by weight on a solids non-fat basis. As is evident in Fitzsimons, et al., at this solids concentration, a dairy product tends to have the consistency of a hard cheese or cheese "crumble," not a yogurt.

In the context of yogurt, it is desirable to obtain a product resembling the taste, texture and mouthfeel of real, fresh yogurt while avoiding spoilage problems. Currently, the addition of yogurt to a product is accomplished by adding powdered yogurt, typically resulting in a finished product with a concentration of powdered yogurt of about 1-3% by weight ("wt %"). The powdered yogurt can be added directly to the food product or added to a compound confectionery coating which is then applied to the food product. But the use of powdered yogurt can result in a less desirable texture and mouthfeel as compared to the use of real, fresh yogurt.

Although more desirable in some aspects, simply adding fresh yogurt to a product is also a generally unviable approach. One potential problem when adding real, fresh yogurt to starch-based (e.g., grain-based) food products is the difference in water activity ($a_w$) between the two components, which can result in a final product with a higher than desirable water activity. For example, yogurt typically has a water activity of about 0.99; whereas, bars typically have water activities ranging from about 0.1 to about 0.7. After combining yogurt with a grain-based component in a bar, the two components will equilibrate to a common water activity unless they are physically separated with a moisture barrier layer. Typically, the equilibration of water activity results in a bar with a water activity too high to be microbiologically stable. Also, the mixing of the cultured yogurt component with grain-based components presents the opportunity for contamination of the yogurt with undesirable microorganisms from the grain-based components. As used herein, "microbiologically stable," is defined as free of microbial spoilage due to growth of bacteria, yeasts, or molds throughout the intended shelf life. Although these problems have been discussed in the context of a starch-based component (e.g. a grain-based component), similar problems can result from combining a protein-based component with a yogurt component.

One method of addressing the problems that result from adding real, fresh yogurt to grain-based foods is physical separation of the two components. This involves the use of a moisture barrier that completely separates the yogurt and the grain-based component. An example is the granola component on top of a cup of yogurt. The granola component is physically separated from the yogurt until the consumer mixes the granola component into the yogurt prior to consumption.

While physical separation theoretically allows consumers to combine a real, fresh yogurt component and a grain-based component, it has several disadvantages. First, the use of a barrier layer limits product configuration. For example, a non-edible barrier layer is incompatible with products in which the yogurt component is in direct contact with the grain-based component. Specific examples include bars, cookies, bakery products and cereals. Also, a non-edible barrier means that the product is not ready-to-eat. The consumer must do something, for example, removing the barrier layer and mixing a yogurt component and a granola component, prior to eating the components. Although at first glance this may appear to be a small inconvenience, for some consumers it is a serious problem. For example, it can be a key consideration for consumers of hand-held foods such as bars and baked goods. A second problem with the use of a barrier layer is that it requires additional product packaging. This has several undesirable results, including but not limited to one or more of the following: additional production costs, more manufacturing steps, and additional post-consumer waste.

What is needed is a new and innovative yogurt product incorporating the taste, texture, mouthfeel and health benefits of yogurt, but with greater resistance to spoilage. For example, it would be desirable to have a real, fresh yogurt with a sufficiently reduced water activity to provide enhanced microbiological stability for the yogurt, but without undesirable changes to the taste, texture or health benefits of the yogurt. A yogurt with a water activity of less than about 0.85 is especially desirable, because below that water activity, no pathogens can survive.

However, reducing the water activity of a yogurt can result in potentially undesirable changes in a yogurt. For example, dehydration can cause grittiness, or result in the texture and mouthfeel of a powder rather than fresh yogurt. Accordingly, a need exists for a microbiologically stable yogurt with the taste, texture, mouthfeel, and health benefits of real, fresh yogurt, as opposed to an overly dehydrated, powdered, or fully cooked yogurt. Furthermore, it would be desirable if such a yogurt had a smooth, creamy texture, as opposed to a gritty, hard, or crumbly texture.

Likewise, a need exists for a microbiologically stable food product that comprises both a real, fresh yogurt component and a starch-based component or protein-based component in direct contact. For example, it would be desirable if such a product incorporated fresh yogurt and grain but had a sufficiently low water activity such that it was microbiologically stable without using a barrier layer between the yogurt and grain components.

SUMMARY OF THE INVENTION

The present invention generally provides a composition and method for producing products that comprise a reduced water activity yogurt. This invention further provides for the production of microbiologically stable products that comprise real, fresh yogurt and grain-based components without having to employ a moisture barrier between the components.

In a first aspect, the present invention provides for a product that comprises reduced water activity yogurt. In one embodiment, the reduced water activity yogurt comprises or consists of cultured high solids milk and additional solutes (e.g., low molecular weight materials that are soluble in water and water-soluble solids). In one embodiment, lactase is optionally added to the high solids milk to hydrolyze the lactose to glucose and galactose. The present invention further provides for a microbiologically stable product that comprises a reduced water activity yogurt component and grain-based component without having to employ a moisture barrier between the components.

In a second aspect, the invention provides a method comprising the steps of culturing a high solids milk with yogurt cultures to form a high solids yogurt and adding solutes to the high solids yogurt to form a reduced water activity yogurt. In one embodiment, the culturing step further comprises adding the enzyme lactase to the high solids milk to hydrolyze lactose to glucose and galactose.

In a third aspect, the invention provides for a food product comprising a yogurt. The yogurt comprises a cultured milk made from a milk comprising about 17-30 wt. % milk solids, non-fat.

In a fourth aspect, the invention provides a method for making a food product comprising a yogurt. The method comprises the step of culturing a milk to form the yogurt, and the yogurt comprises about 17 to about 30% milk solids, non-fat by weight.

The inventors have developed a new and innovative yogurt product. In some embodiments, the yogurt product incorporates the taste, texture, mouthfeel and health benefits of yogurt, but provides greater resistance to spoilage. The inventors have found that by employing both high solids milk (low moisture milk) as a starting material and then adding solutes, a reduced water activity yogurt could be obtained. For example, one embodiment of the invention includes real, fresh yogurt with a sufficiently reduced water activity to provide enhanced microbiological stability for the yogurt, but without undesirable changes to characteristics selected from the taste, texture and/or health benefits of the yogurt. In another embodiment, the yogurt has a water activity of less than about 0.85, which is desirable, because below that water activity, no microbiological pathogens can survive.

One embodiment of the invention provides for a microbiologically stable yogurt with desirable organoleptic and health-related properties, for example the taste, texture, mouthfeel, and health benefits of real, fresh yogurt, as opposed to an overly dehydrated, powdered, or fully cooked yogurt. For example, one embodiment has a reduced water activity, but it avoids potentially undesirable changes in the yogurt, such as grittiness that can be associated with dehydration. Another embodiment provides the texture and mouthfeel of a fresh yogurt rather than a powder. Another embodiment of the invention has a smooth, creamy texture, as opposed to a gritty, hard, or crumbly texture. In another embodiment, the yogurt has increased shelf life and better microstability. One example of increased microstability is microbiological stability at room temperature. Regular yogurt is not microbiologically stable at room temperature, but some embodiments of reduced water activity yogurt can be microbiologically stable at room temperature.

As another benefit of the invention, the inventors have discovered a formulation for reduced water activity yogurt that eliminates the need for a barrier layer in various yogurt-containing food products. For example, in one embodiment, the invention provides for a microbiologically stable food product that comprises both a real, fresh reduced water activity yogurt component and a grain-based component in direct contact.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 12B is a flow chart representation depicting part of the overall process of one embodiment of the invention in which a reduced water activity yogurt component is coextruded with an outer dough layer to form a coextruded center-filled baked bar.

FIG. 13B is a flow chart representation depicting part of the overall process of one embodiment of the invention in which a reduced water activity yogurt component is used as a topping or layer for a layered baked bar.

FIG. 14B is a flow chart representation depicting part of the overall process of one embodiment of the invention in which a reduced water activity yogurt filling is used in a yogurt-filled muffin.

DETAILED DESCRIPTION

Figure 1:
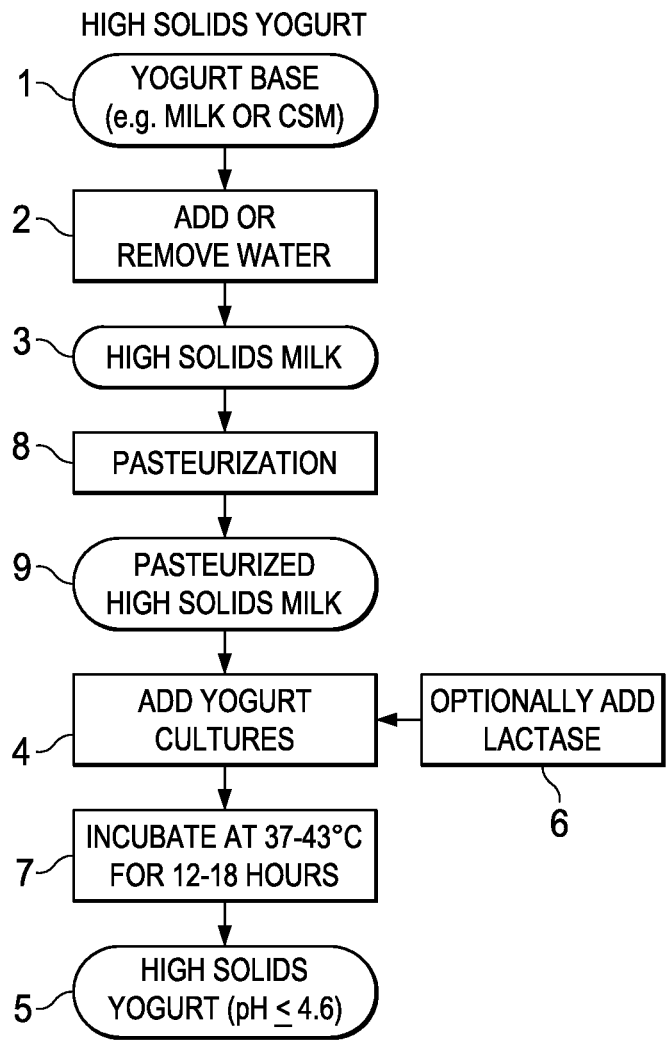
FIG. 1 is a flow chart representation depicting the overall process for obtaining one embodiment of the invention comprising a high solids yogurt.

As a result of yogurt's many desirable attributes, manufacturers and consumers have sought to include yogurt in a variety of finished food products. For example, it is desirable to include yogurt in food bar products, cookies, bakery products and cereals, including breakfast cereals. In particular, there has been an industry-wide desire in the bars category to include yogurt in the formulation of bars for the taste and health benefits of yogurt. In the past, the addition of yogurt has been accomplished with the addition of a powdered yogurt component. Typically, the amount of added yogurt has been about 1-3 wt % powdered yogurt in the yogurt component which is added directly to another component (e.g. a bar component) to form a food product. Alternatively, yogurt has been added to a compound confectionery coating which is then applied to another component to form a food product.

The challenge when adding a real, fresh yogurt component to grain-based component is the difference in water activity ($a_w$) between the two components. Yogurt has a water activity of about 0.99; whereas grain-based products typically have water activities ranging from about 0.1 to about 0.7. For example, after combining yogurt with a grain-based bar, the two components will equilibrate to a common water activity unless they are physically separated with a moisture barrier layer. An example of this physical separation is the barrier layer that separates a granola component on top of a cup of yogurt from the yogurt within the cup. If physical separation is not used, equilibration of the water activities in the yogurt and a grain-based component typically results in a food product with a water activity that is too high to be microbiologically stable. Another problem is that the mixing of the cultured yogurt component with a grain-based component presents the opportunity for contamination of the yogurt with undesirable microorganisms from the grain-based components.

While physical separation theoretically allows consumers to combine a real, fresh yogurt component and a grain-based component, it has several disadvantages. First, the use of a barrier layer limits product configuration. For example, a barrier layer is incompatible with products in which the yogurt component is in direct contact with the grain-based component. Specific examples include bars, cookies, bakery products and cereals. A second problem with the use of a barrier layer is that it requires additional product packaging. This has several undesirable results, including but not limited to one or more of the following: additional production costs, more manufacturing steps, and additional post-consumer waste.

The inventors of the present invention have discovered a process and a formulation for reduced water activity yogurt that eliminates the need for a barrier layer in various yogurt-containing food products. Instead, the reduced water activity yogurt of the present invention can be added to a starch- or protein-based component, such as a grain-based component, to produce a microbiologically stable composite food product, even if the yogurt component and starch- or protein-based component are in direct contact. In one embodiment, the present invention results in increased shelf life and better microstability. In one embodiment, the invention results in microbiological stability at room temperature. In another embodiment, the reduced water activity yogurt possesses desirable organoleptic properties or health-related properties.

However, reducing the water activity of yogurt presents many difficulties. The inventors herein discovered that several approaches either did not achieve the desired reduction in water activity or were less desirable for some other reason. For example, the use of heat helps to further dehydrate reduced water activity yogurt for a finished yogurt component. However, dehydrating yogurt with heat can denature the milk proteins in the yogurt. This, in turn, can result in yogurt with an unacceptable grainy texture. Accordingly, in one embodiment when using heat to dehydrate yogurt, sequestering agents are used to help prevent denaturing of the milk proteins. Examples of sequestration agents include citrate salts, and phosphate salts including mono, di, tri and polyphosphate salts. Another embodiment uses a lower temperature vacuum dehydration to reduce grittiness or graininess that can result from heating. Such an embodiment can be desirable, for example, to form a yogurt that has a smooth texture. Vacuum dehydration can be accomplished, for example, by thin film, falling film or scraped surface evaporation under vacuum. These methods can be used, for example, for reducing the moisture content of sugar-based syrups.

A second approach to reducing water activity, making yogurt and then straining off some of the liquid to reduce the moisture content of the yogurt, did not result in enough water removal to obtain the desired reduction in water activity. Thus, in isolation, this approach is less desirable than other approaches for reducing water activity.

Another complicating factor in the development of a reduced water activity yogurt is the presence of lactose which, depending on the concentration of solutes in the yogurt, can lack sufficient solubility to remain in solution in the yogurt. In one approach, the inventors attempted hydrolyzing the lactose in milk by adding lactase and then making yogurt from the resulting milk. This approach resulted in a yogurt with reduced water activity due to the generation of one mole of glucose and one mole of galactose for every mole of lactose in the milk, but an even greater reduction in the water activity of the yogurt was still desirable. In a second approach, the inventors tried hydrolyzing the lactose in milk (9 wt % milk solids), making yogurt from that milk, straining the yogurt, and then adding solutes. Following this approach, the lactase was able to hydrolyze the lactose. However, this approach was inefficient because the straining step removed a significant amount of the glucose and galactose that were created by lactose hydrolysis. Consequently, these removed compounds were not present in the finished yogurt to help lower the water activity.

In a third approach, the inventors tried culturing yogurt and then hydrolyzing the lactose in the yogurt to glucose and galactose which are soluble in the yogurt. This approach was unsuccessful because the pH of the yogurt was approximately 4.5, and at that pH, the lactase had insufficient activity to hydrolyze the lactose into glucose and galactose.

In a fourth approach, the inventors tried adding lactase to the reduced water activity yogurt after adding the solutes to produce reduced water activity yogurt. The goal was to hydrolyze the lactose remaining in the reduced water activity yogurt. Following this approach, the yogurt had reduced water activity, but lactose hydrolysis was unsuccessful because the pH of the yogurt was below the optimum activity range for the lactase enzyme and because the enzyme and its substrate (i.e. lactose) had less mobility in this high solids system.

Although the inventors found that several approaches either did not achieve the desired reduction in water activity or were less desirable for some other reason, the inventors ultimately discovered that several approaches did achieve a desirable reduction in water activity. For example, the inventors found that the water activity of a yogurt can be reduced by using two approaches. The first approach involves removing water from yogurt or a yogurt precursor. The second approach involves adding solutes to yogurt or a yogurt precursor. Although the approaches can be used to reduce the water activity of a yogurt or pre-yogurt system in isolation, the inventors found that they are especially effective in combination.

Without wishing to be bound by theory, the inventors theorize that the mole fraction of water in a system must be reduced in order to reduce the water activity of the system. This is described by Raoult's law. For example, the water activity of a yogurt can be reduced by adding solutes including soluble solids to the yogurt. Alternatively, the water activity of a finished yogurt can be reduced as a result of making the finished yogurt from a high solids milk. As used in this specification, high solids milk (lower water milk) comprises milk solids of about 17-30 wt % milk solids. More preferably, high solids milk ranges from about 21-27 wt % milk solids. In other embodiments, milk solids range from 23-27 wt %, 25-27 wt %, and 26-27 wt %, respectively. In another embodiment the milk solids level is 27 wt %. Unless otherwise provided, when ranges are disclosed herein, the ranges are inclusive of the end points. The inventors also contemplate that when ranges for a value are given, the endpoints of the ranges can be combined to create a new range for the value unless otherwise provided, either expressly or through context.

The inventors have found that both removing water from and adding solutes to a yogurt or yogurt precursor are useful for reducing the water activity of yogurt. For example, the inventors of the present invention have achieved a desired reduction in water activity by employing high solids milk (low moisture milk) as starting material, and adding solutes to the high solids milk after it has been cultured. At one preferred milk solids content (i.e., about 21-27 wt %), the inventors found it desirable to use yogurt cultures which have the ability to tolerate (e.g., grow in population and ferment milk sugars to make acid) in this high solute environment to produce yogurt, for example, yogurt cultures which are resistant to an environment with a high solute concentration or an environment with a high soluble solids concentration. Examples of high solute concentrations include water-solute systems with milk solids, non-fat concentrations of about 17 wt % or more, about 21 wt % or more, about 23 wt % or more, about 25 wt % or more, about 26 wt % or more, about 27 wt % or more, about 17-30 wt %, about 21-27 wt %, about 23-27 wt %, about 25-27 wt %, and about 26-27 wt %, respectively. As another example, a high solute concentration includes a milk solids, non-fat concentration of about 27 wt %.

The inventors also found that not all solutes have sufficient solubility to remain in solution in the reduced water activity yogurt. For example, the inventors found that erythritol and lactose lacked a desired level of solubility. In particular, lactose, which was naturally present in the high solids milk, would sometimes crystallize in the yogurt. Thus, lactase was used to convert lactose to glucose and galactose.

Many of the solutes that did possess sufficient solubility in the reduced water activity yogurt were sugars, and the inventors found that yogurt with these added sugar solutes could be too sweet for some consumers. To help make the yogurt more desirable for these consumers, the inventors found that the addition of milk permeate, with its salty flavor, helps to reduce consumers' perception of sweetness. Accordingly, one preferred formulation of solutes for the reduced water activity yogurt comprises glycerin, fructose, honey, sucrose, invert sugar syrup, milk permeate and lactic acid. Lactic acid can be added to further reduce the pH of the reduced water activity yogurt and to give it a more tart flavor.

When the term "add" and its various grammatical conjugates are used herein, it is contemplated that the addition of an added component can be accompanied or followed by an application of one component to another component, a mixing of one component with another component, a dissolving of one component into another component, or a dispersal of one component into another component.

According to the present invention, one embodiment of a reduced water activity yogurt is obtained by the following steps. First, a yogurt base is obtained to be used as a base for the yogurt. For example, the yogurt base can comprise milk or condensed skim milk (CSM). In another embodiment, the yogurt base can comprise a combination of milk and dried milk (e.g., powdered milk), for example, skim milk and non-fat dry milk. As another example, sweetened condensed milk (SCM) can be used as a base or starting material for making yogurt or a yogurt-like product, although depending on the ratio of protein and total nonfat solids in the starting material, the ultimate product can fail to qualify as a yogurt, for example, under the FDA's standard of identity in 21 CFR 131.200(d). Second, the base is either hydrated or dehydrated to form a high solids milk (lower water milk). In one embodiment the amount of water in a milk can be reduced by processing the milk using a reverse osmosis (RO) or ultrafiltration (UF) process. The use of a high solids milk serves to reduce the amount of water in the finished yogurt. In one embodiment, the high solids milk ranges from about 17-30 wt % milk solids. In another embodiment the high solids milk ranges from about 21-27 wt % milk solids. In other embodiments, the high solids milk has milk solids concentrations greater than about 17 wt %, greater than about 21 wt %, greater than about 23 wt %, greater than about 25 wt %, greater than about 26 wt %, greater than about 27 wt %, of about 17-30 wt %, of about 21-27 wt %, of about 23-27 wt %, of about 25-27 wt %, and in the range about 26-27 wt %, respectively. As another example, one embodiment of a high solids milk has a milk solids concentration of about 27 wt %.

Third, the high solids milk is cultured with the required yogurt cultures, for example, *Streptococcus thermophilus* and *Lactobacillus bulgaricus*, as in a yogurt production process. Herein, this step is defined as the culturing step. Depending on relevant laws and regulations, which can vary by jurisdiction, certain required yogurt cultures are necessary to make a product classified as a yogurt. In some countries, other suitable lactic acid producing cultures can be used to make yogurt, for example, *Lactobacillus helveticus* and *Lactobacillus jugurti* are permitted to be used in Australia. The duration of the culturing step is defined herein as the culturing time. The temperature at which the culturing step is performed is defined herein as the culturing temperature. In one embodiment, the culturing step has culturing times that range from about 8-16 hours and culturing temperatures up to about 45° C. These longer culturing times and higher culturing temperatures allow the yogurt cultures to generate enough lactic acid to lower the pH of the yogurt to below 4.6. In other embodiments the culturing temperature can be about 37-45° C., 42-45° C., 42-44° C., 43-44° C. or 43° C., respectively. When lower temperatures are used, for example about 37° C., longer culturing times are required.

Although the acidity of yogurt has been discussed in terms of pH, the key measure of acidity pursuant to the U.S. Code of Federal Regulations (CFR) is actually titratable acidity. The CFR requires a titratable acidity of at least about 0.9% in the standard of identity for yogurt. Depending upon the buffering capacity of a solution, which is in turn related to the concentration of certain solutes in the solution (e.g. proteins), a pH of 4.6 provides a titratable acidity of at least about 0.9%. In one yogurt embodiment made from 27% MSNF milk, the titratable acidity of the yogurt is 1.9% when the yogurt has a pH of 4.5. In some embodiments, because of the relatively higher MSNF concentrations and commensurately higher buffering capacities in a high solids milk, the high solids milk, high solids yogurt, and reduced water activity yogurt have titratable acidities that are at least 0.9% at a pH of 4.6 or lower.

Although for conventional yogurt the water activity of the milk/yogurt does not change appreciably during culturing, for the high solids yogurt the water activity can decrease somewhat during culturing. This is because, for example, higher acid level is required to overcome the buffering capacity for the higher levels of protein in the high solids yogurt. For example, for regular yogurt, the titratable acidity is 0.9% at a pH of 4.5; however, for the high solids yogurt, the titratable acidity is ~1.9% at a pH of 4.5. Examples of titratable acidity values for traditional and Greek yogurt at a pH of 4.5 and made from 17 wt %, 21 wt %, 25 wt %, and 27 wt % high solids milk, respectively, are shown in Table 11. Accordingly, in order to achieve the desired pH in a high solids yogurt, more lactic acid must be created than for regular yogurt which does not have as much buffering capacity as the high solids yogurt. Since the creation of lactic acid from lactose results in a net increase in the number of moles of solute present in the yogurt, the culturing of high solids yogurt can have somewhat of an effect on the water activity of the yogurt even though the culturing of the regular yogurt has no appreciable effect.

Nonetheless, a large amount of added solute can be required to obtain significant changes in water activity. Thus, even the decrease in water activity caused by culturing high solids yogurt can be negligible in comparison to the decrease in water activity due to the addition of solutes. For example, water has a relatively low molecular weight of about 18 g/mole. Sugars, on the other hand, have a much higher molecular weight (e.g. 342 g/mole for disaccharides and 180 g/mole for monosaccharides). Thus, it takes a substantially greater mass of solutes (for example, 10 times as much mass of monosaccharides compared to water) to provide a mole of solutes. Because water activity depends on the mole fraction of water in a solute in water solution, decreasing the water activity of a solution can require a substantial mass of solutes relative to water.

Some simplified calculations for water activity of various compositions can help provide a frame of reference for the effects of various solutes concentrations on water activity. For example, assuming that lactose, lactic acid, glucose and/or galactose provides the soluble solids content and whey proteins can be ignored due to their high molecular weight (e.g., 14,000 to 70,000 g/mol), an 8.25% MSNF milk has a water activity of about 0.997 (based on lactose content), a 27% MSNF milk has a water activity of about 0.989 (based on lactose content), a 27% MSNF yogurt has a water activity of about 0.985 (based on 13% lactose and 2% lactic acid), and the 27% MSNF yogurt with most lactose converted to glucose and galactose has a water activity of about 0.979. As shown by these rough, simplified calculations and the experimental data provided herein, providing a desired reduction in water activity can require adding a substantial amount of soluble solids (e.g., in the form of glycerin and sugars).

During the culturing step, the enzyme lactase can also be added, although lactase can also be added at other times. The advantage of adding lactase is that it hydrolyzes lactose to glucose and galactose. This serves two purposes. It produces two moles of soluble monosaccharides from one mole of lactose, which increases the mole fraction of solutes in the system, and it removes lactose from the yogurt and generates the more soluble sugars glucose and galactose. This prevents the potential subsequent crystallization of lactose in the reduced water activity yogurt.

Fourth, solutes (e.g. soluble solids) are added to the high solids yogurt and mixed into the yogurt so that solutes dissolve into the yogurt solution to form a reduced water activity yogurt. This step is defined herein as the solute addition step. These solutes include, but are not limited to, at least one component selected from the group consisting of sugars (monosaccharides, disaccharides and soluble polysaccharides); sugar alcohols; corn syrup and high fructose corn syrup; syrups from tapioca wheat, rice or other grains; invert sugar syrup; honey; agave syrup; fruit juice; fruit juice concentrate; fructooligosaccharides; inulin; polydextrose; corn syrup solids; tapioca, wheat, rice and other grain syrup solids; maltodextrins; glycerin; propylene glycol; erythritol; other polyols; milk permeate; soluble minerals; salts; food acids such as lactic acid, citric acid, acetic acid, phosphoric acid and hydrochloric acid. These soluble solutes serve to lower the water activity of the yogurt to the range of about 0.85 to 0.40. In this water activity range, for example, the reduced water activity yogurt can be used as a filling, layer, topping or other component for cereal bars, or other cereal-based products.

Reducing the water activity to below about 0.85 is important because below that water activity no pathogenic microorganisms will grow. For example, *Staph aureus* will grow at a water activity of about 0.86. In the water activity range of about 0.85 to about 0.70, food products comprising yogurt and grain-based components are stable at refrigerated temperatures, but at room temperature, the food products are typically only stable with the addition of antimycotics to prevent the growth of yeasts and molds. In the water activity range from about 0.70-about 0.60, food products comprising yogurt and grain-based components that have been baked (which reduces the microbiological load) or otherwise treated to reduce the microbiological load are stable at room temperature, but products that are cold-formed are only stable at room temperature with the addition of yeast and mold inhibitors.

As used herein, cold-formed refers to products that are not heated during the manufacturing process after the product is formed. For example, cold-form processes are typically used to make protein, granola or particulate type bars. Current cold-formed bar technology employs components having water activities of less than about 0.65. Although osmophilic yeasts and molds might grow at a water activity between about 0.65-0.60, at a water activity below about 0.60 no microorganisms will grow. For example, at a water activity range of about 0.60 to about 0.40, yeast and mold inhibitors are unnecessary. In fact, the water activity range over which yeast and mold inhibitors are unnecessary extends from about 0.60-0.00. However, since a water activity of 0.00 corresponds to the absence of water, the lowest commercially useful water activity for a water-containing product is higher than 0.00.

In addition to adjusting the water activity of a yogurt, components can be added to a yogurt or yogurt precursor to adjust other yogurt properties. These components can be added before during or after the addition of the solutes. For example, in one embodiment at least one antimycotic, including at least one antimycotic selected from the group consisting of sorbic acid, potassium sorbate, benzoic acid, sodium benzoate, propionic acid and sodium propionate, is added to the yogurt. Antimycotics prevent yeast and mold growth. In one embodiment, at least one component selected from the group consisting of starches and hydrocolloids is added to the yogurt. These components allow the texture of the yogurt to be adjusted to provide the desired attributes. In one embodiment, at least one suitable food grade acid, for example lactic acid, is added to modify the acidity of the yogurt. Lactic acid and other suitable food grade acids allow the tartness of the yogurt to be increased and they reduce the pH of the yogurt. In one embodiment, at least one flavoring agent is added to the yogurt to modify its flavor. Flavoring agents include, for example, preps, fruit preps, vanilla, maple, coffee, chocolate, caramel, or dulce de leche. In one embodiment, fruit, alone or in combination with other components, is added to the yogurt. For example, in one embodiment at least one component selected from the group consisting of fruit pieces, processed fruit and fruit preps is added to the yogurt. As used herein, processed fruit includes but is not limited to liquefied, pureed, sliced, mashed, heated, cooled, hydrated, and dehydrated fruit and components of fruit that have been separated from fruit such as fruit juice, flesh, or peeling. As used herein, a fruit prep is a composition comprising fruit or processed fruit and at least one other constituent. Examples of additional constituents include but are not limited to starches, hydrocolloids, sugars, syrups, food acids, and combinations thereof.

One embodiment of the invention will now be described with reference to FIG. 1. First, a yogurt base 1, for example milk, including but not limited to skim milk, low fat milk, full fat milk and condensed skim milk (CSM), is obtained. In one embodiment, the milk is from a mammalian source. In another embodiment, the milk is from a bovine source. In one embodiment, the yogurt base comprises almost no fat or little fat content so the yogurt formed from the base also has almost no fat or little fat. Skim milk, low fat milk, and full fat milk can all have a water activity of about 0.99 as fat is typically insoluble and does not appreciably affect water activity. Second, if the yogurt base is milk, water 2 is removed from the yogurt base through dehydration. However, if the yogurt base is CSM, for example CSM at 35% solids content, water 2 can be added to the yogurt base through hydration. Thus, by either dehydration or hydration of a yogurt base, a high solids milk 3 can be formed. The high solids milk can be pasteurized 8 to form a pasteurized high solids milk 9 before yogurt cultures are added, for example, as necessary to meet the standard of identity for yogurt in U.S. regulations or any other standard. Although, in other embodiments the high solids milk is not pasteurized. Third, yogurt cultures 4 are added to the high solids milk in a yogurt culturing process to form a high solids yogurt 5. In one embodiment, the water activity of the high solids milk/yogurt does not change appreciably as the high solids milk is cultured to form a high solids yogurt. In one embodiment, lactase 6 is optionally added to the high solids milk 3 to hydrolyze lactose to glucose and galactose. After yogurt cultures 4 and, optionally, lactase 6 are added to the high solids milk, incubation 7 occurs at 37-43° C. for 12-18 hours. The resultant yogurt has a pH that is less than or equal to 4.6. Although, in some embodiments, the resultant yogurt has a pH of less than or equal to 4.5.

The illustrative process for making yogurt that has been described can also be modified to satisfy particular standards of identity. For example, the FDA has listed standards of identity for yogurt at 21 CFR 131.200, low fat yogurt at 21 CFR 131.203, and nonfat yogurt at 21 CFR 131.206, which are hereby incorporated by reference in their entirety as examples. Although, a yogurt made according to this invention need not comply with these standards of identity, certain embodiments of this invention can comply with these or other standards of identity. Additionally, milk used to make yogurt according to this invention can satisfy the standard of identity for milk at 21 CFR 131.110, which is hereby incorporated by reference in its entirety as an example. Although, a milk in accordance with this invention need not comply with this particular standard of identity, certain embodiments of this invention can comply with these or other standards of identity.

In one embodiment, the high solids milk is formed by adding dried milk, such as nonfat dry milk, to milk to achieve the desired total solids content. In another embodiment, the high solids milk is formed from milk that has been dehydrated by reverse osmosis (RO). In another embodiment, the high solids milk is formed from milk that has been dehydrated by ultrafiltration (UF); although, UF also removes some minerals and lactose from the milk which may impact the ability of the milk to qualify as a starting material that meets the standard of identity for yogurt under U.S. regulations.

In one embodiment, lactase is added at approximately the same time that the yogurt cultures are added. In determining when to add lactase to milk, several considerations are relevant. First, higher solids content in milk can reduce the effectiveness of lactase. This suggests it can be desirable to add lactase to milk at a point in the yogurt production process when the milk solids content is lower, for example, before removing water 2 or after adding water 2. This, in turn, suggests adding lactase to milk before yogurt cultures. However, if lactase is added to milk too far in advance of adding yogurt cultures, the lactase can convert too much lactose to glucose and galactose before the yogurt cultures have an opportunity to convert the lactose into lactic acid. If the yogurt cultures are unable to make a sufficient amount of lactic acid, it is possible that the pH of the milk will not be lowered sufficiently to make yogurt. This, in turn, suggests that it can be desirable to add lactase to milk after the yogurt cultures are added, so that the lactase does not prevent the yogurt cultures from making sufficient amounts of lactic acid. However, this must be balanced against the fact that the culturing process can lower the pH of the high solids milk or yogurt beyond the range at which lactase efficiently hydrolyzes lactose. Thus, adding lactase after adding yogurt cultures can also be problematic. These competing considerations suggest that it can be desirable to add lactase to a yogurt base such as milk at the same time as yogurt cultures.

Figure 2:
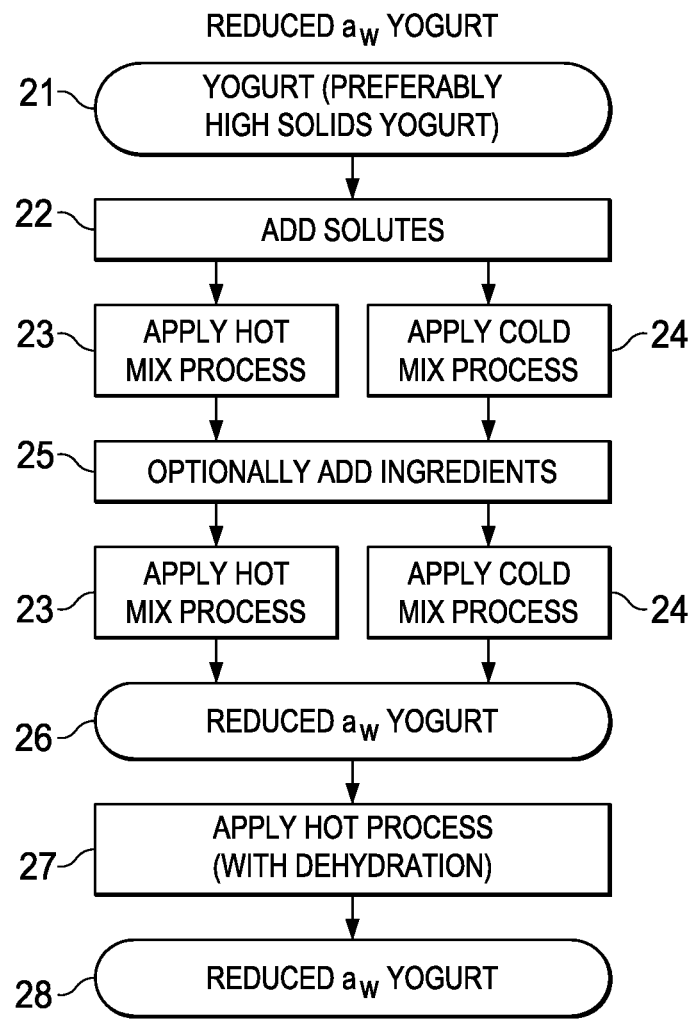
FIG. 2 is a flow chart representation depicting the overall process for obtaining one embodiment of the invention comprising a reduced water activity yogurt.

Another embodiment of the invention will now be described with reference to FIG. 2. First, a yogurt 21, preferably a high solids yogurt, is provided. Second, solutes 22 are added using a hot mix process 23 or cold mix process 24 to form a reduced water activity yogurt 26. As used herein, a cold mix process is defined as a process in which two or more components are combined without the addition of heat. As used herein, a hot mix process is defined as a process in which two or more components are combined with the addition of heat. For example, heat can be added using heating elements, a heat exchanger, an oven or some other suitable heating process.

Optionally, at least one ingredient 25 is added using a hot or cold mix process 23, 24 to form reduced water activity yogurt 26. Although, in one embodiment at least one ingredient 25 is added at other times, for example, at the same time that solutes 22 are added or before solutes 22 are added.

Third, a hot process with dehydration 27 is applied to the yogurt to form another reduced water activity yogurt 28 with a further reduced water activity. As used herein, "hot process," is defined as using heat to further dehydrate a component. In one embodiment, a hot process employs vacuum dehydration. In another embodiment, vacuum dehydration of a component occurs separately from the use of a hot process.

Figure 4:
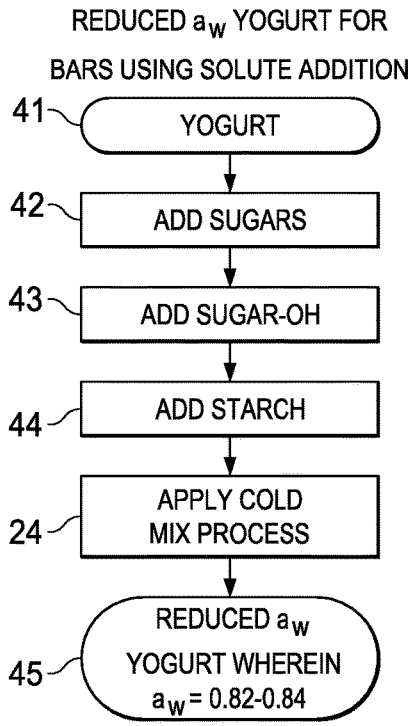
FIG. 4 is a flow chart representation depicting the overall process of one embodiment of the invention using solute and starch addition to obtain a reduced water activity yogurt for bars.

Another embodiment of the invention will now be described with reference to FIG. 4. First, a yogurt 41, preferably a high solids yogurt, is provided. Second, sugars 42, sugar alcohol 43, and starch 44 are added to the yogurt 41. Third, the yogurt 41, sugars 42, sugar alcohol 43, and starch 44 are subjected to a cold mix process 24 to form a reduced water activity yogurt 45 with a water activity of about 0.82 to 0.84. Although multiple sugars, sugar alcohols, and starches can be added, it is also possible to add only a single sugar, sugar alcohol, or starch. In some embodiments, the reduced water activity yogurt has a water activity of about 0.85 or less so that it is microbiologically stable. In some embodiments, the reduced water activity yogurt has a water activity of about 0.40 to 0.85. In some embodiments, the reduced water activity yogurt has a water activity of about 0.83.

Another embodiment of the invention will now be described with reference to FIG. 5. First, a yogurt 41, preferably a high solids yogurt, is provided. Second, sugars 42, sugar alcohol 43, and starch 44 are added to the yogurt 41. Third, the yogurt 41, sugars 42, sugar alcohol 43, and starch 44 are subjected to a cold mix process 24 to form a reduced water activity yogurt 45 with a water activity of about 0.82-0.84. In another embodiment, solutes are added to reduce the water activity to about 0.70. Fourth, a hot process 52 at greater than or equal to 100° C. is applied to the reduced water activity yogurt 45. This hot process 52 results in dehydration of the reduced water activity yogurt 45 to form a reduced water activity yogurt 53 with a water activity of 0.67-0.68. In another embodiment, a hot process reduces the water activity to about 0.60-0.70.

Figure 5:
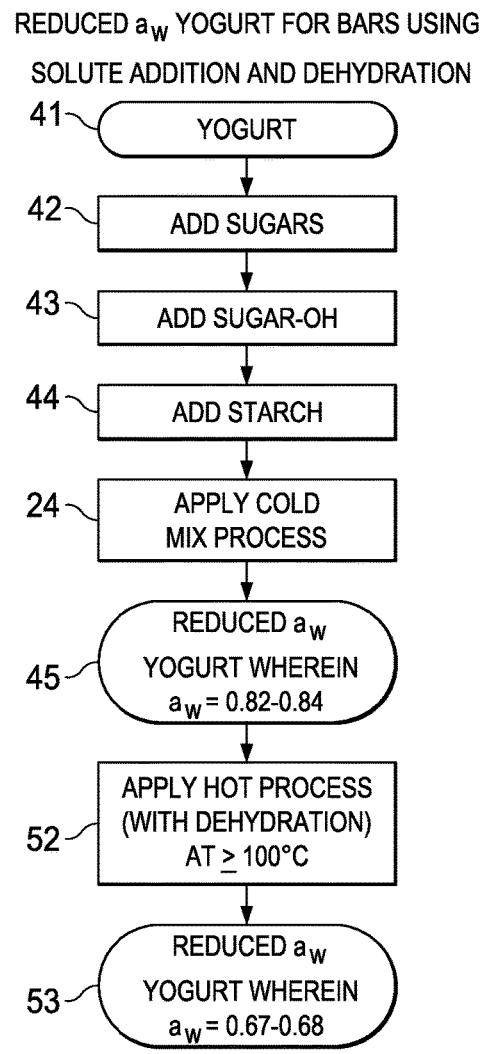
FIG. 5 is a flow chart representation depicting the overall process of one embodiment of the invention using solute addition and dehydration to obtain a reduced water activity yogurt for bars.
Figure 5A:
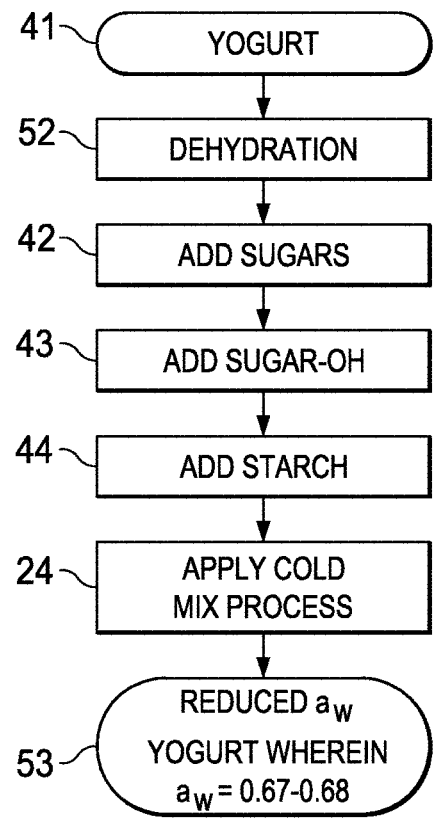
FIG. 5A is a flow chart depicting an example of dehydration occurring before the addition of solutes.

Although FIG. 5 shows dehydration 52 occurring after the addition of solutes 42, 43, 44, dehydration 52 can also occur before the addition of solutes. If dehydration occurs before solutes are added, it can be easier to remove water from the yogurt. This is because adding solutes increases the boiling temperature of the yogurt so that it takes more heat or higher vacuum to evaporate the water in the yogurt. An example of dehydration occurring before the addition of solutes in shown in FIG. 5A. Additionally, FIG. 5A shows that dehydration does not need to be a hot process. For example, dehydration could be vacuum dehydration, which lowers the temperature at which boiling occurs. Accordingly, for example, vacuum dehydration of a solution can occur at lower temperatures than the temperature at which the solution would boil at atmospheric pressure. Additionally, vacuum dehydration can occur even if a solution is not boiling, although boiling tends to result in faster evaporation at a given pressure.

As an example of dehydration followed by solute addition, in one embodiment, high solids yogurt is dehydrated and solutes are added to the yogurt to provide a yogurt with a water activity of about 0.67-0.68, although other water activity ranges can also be provided. Using this approach, a final desired water activity can be achieved during a solute addition step, rather than during a dehydration step. This can provide a desirable degree of flexibility, simplicity, and efficiency to the process of providing a reduced water activity yogurt.

In one embodiment, the invention further provides for the production of a microbiologically stable product that comprises real, fresh yogurt and another component wherein the product is manufactured using a hot-form process or a cold-form process. For example, the other component can include, but is not limited to, a grain-based component.

One embodiment of the invention that involves a method for producing a microbiologically stable yogurt product using a cold-form process will now be described. First, a "reduced water activity yogurt" as described herein is provided. In one embodiment, this yogurt comprises high solids yogurt. In another embodiment the yogurt comprises at least one added sugar, sugar alcohol, or starch.

Second, the reduced water activity yogurt is combined with a grain-based component. In one embodiment, the combination of the yogurt component and the grain-based component is accomplished through a cold mix process. In another embodiment, this mixing step is accomplished through a hot mix process.

Third, after the yogurt and at least one other component are combined in a cold or hot mix step to form a product, no additional heat is used.

One example of a cold-form process is a process in which ingredients and an optional binder syrup are mixed and warmed to approximately 48.9-71.1° C. to form a mixture. In other embodiments of a cold-form process, ingredients and an optional binder syrup can be mixed and warmed to approximately 32.2-121.1° C. The mixture is then mixed with unheated dry particulates to form a subsequent mixture. This subsequent mixture is then cooled down and formed into bars. After the bars are formed, the bars are not heated again (e.g. baked) in a cold-form process.

In other embodiments, the yogurt in a cold-form bar is used as a topping. In another embodiment, the yogurt is used as a layer in a multi-layer cold-form process. As used herein, a multi-layer cold-form process is defined as a cold-form process in which a product is formed comprising a plurality of reduced water activity yogurt layers. Although, in some embodiments of the invention, a cold-form process is used in conjunction with a single layer of reduced water activity yogurt. One embodiment comprises at least one layer comprising reduced water activity yogurt.

Since there is no heating step after forming a product in a cold-form process, the starting water activity of the yogurt layer must generally be reduced to accommodate the lower water activity of the cold-formed bars. An appropriately reduced water activity is typically in the range of 0.30 to 0.65, but in one embodiment can be as high as 0.85, consistent with the water activity below which no pathogens will grow, if appropriate antimycotic and antibacterial preservatives are used.

Another embodiment involves a method for producing microbiologically stable products that comprise real, fresh yogurt and grain-based components wherein the production of the products is obtained through a hot-form process. As used herein, a hot-form process is a process in which heat is used after forming a product that comprises a yogurt component and some other component.

One embodiment of the invention in the form of a method using a hot form process comprises the following steps. First, a reduced water activity yogurt, as described herein is obtained. In one embodiment, this yogurt comprises high solids yogurt. In another embodiment, the yogurt comprises at least one sugar, sugar alcohol, or starch.

Second, the reduced water activity yogurt is combined with a grain-based component. In one embodiment, this combination is accomplished through a cold mix process. In another embodiment, this combination is accomplished through a hot mix process.

Third, after the yogurt and at least one other component are combined in a cold or hot mix step to form a product, additional heat is used to heat treat the product during a hot process. As an example, in one embodiment the additional heat is supplied through a baking process. This hot process results in dehydration of the product. In one embodiment, the hot process comprises heating the product to about 135-232° C. In another embodiment, the product is heated to about 149-218° C. In another embodiment the product is heated to about 163-204° C. In another embodiment the product is heated to about 177-191° C. In another embodiment the product is heated to about 191° C.

One example of a hot-form process is baking a product after it has been formed. A hot-form process can include either a hot mix or cold mix step for combining the fresh yogurt and at least one other component.

Figure 3:
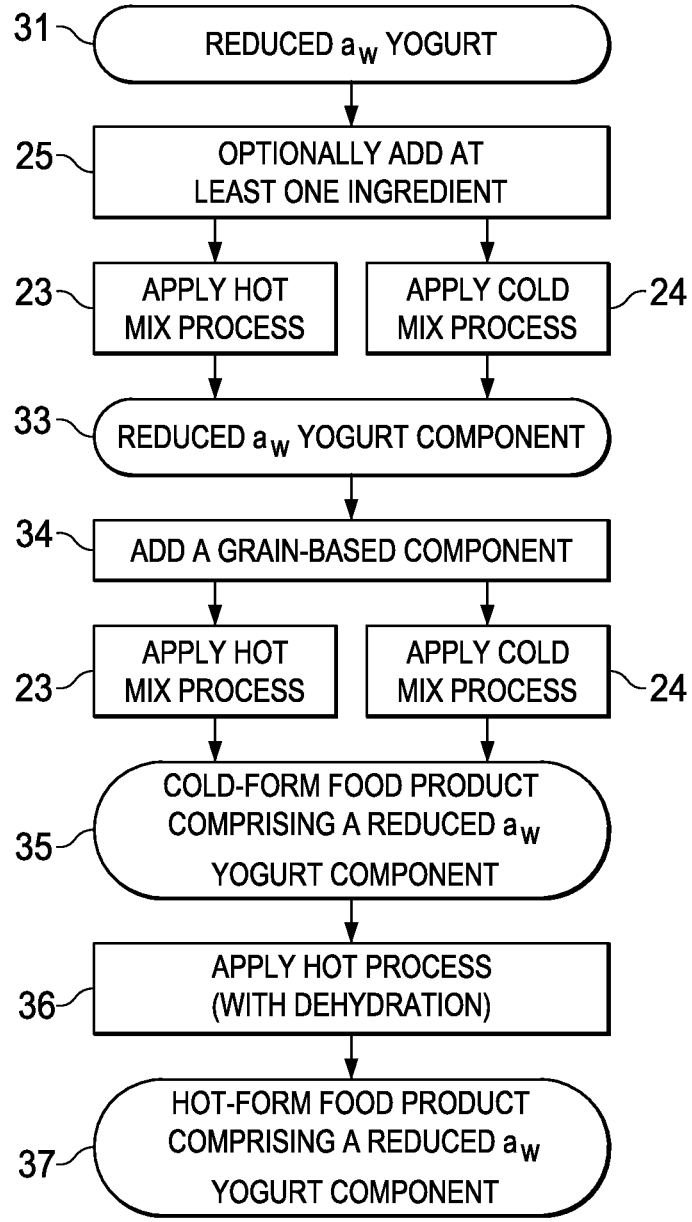
FIG. 3 is a flow chart representation depicting the overall process for obtaining one embodiment of the invention in the form of a food product comprising a reduced water activity yogurt.

One embodiment of the invention will now be described with reference to FIG. 3. First, a reduced water activity yogurt 31 is obtained. This reduced water activity yogurt 31 is one example of a reduced water activity yogurt component 33. Second, at least one ingredient 25 is optionally added using a hot mix process 23 or cold mix process 24 to form another reduced water activity yogurt component 33. Third, a starch- or protein-based component 34 is added to the yogurt using a hot mix process 23 or cold mix process 24 to form a cold-form food product 35 comprising a reduced water activity yogurt component. In other embodiments, a starch-based component is a grain-based, potato-based or cassava-based component, respectively. Fourth, a hot process 36 with dehydration is applied to the cold-form food product 35 to form a hot-form food product 37 comprising a reduced water activity yogurt component.

In one embodiment, a food product comprising a reduced water activity yogurt of the present invention comprises a filling. In addition to being used as a filling, one composition comprising a reduced water activity yogurt is used as a topping for, a layer for, or a coating for at least one other component. In one embodiment, a composition comprising a reduced water activity yogurt is combined with, dispersed as a solid in, dispersed as a liquid in, or otherwise added to at least one other component. For example, in one embodiment the reduced water activity yogurt by itself or in combination with at least one other component, forms a filling, a topping, a layer, a coating, a dispersed component, or an additive for any kind of food product, such as a food bar, a cookie, a bakery product, or a cereal, or other food products. As another example, one embodiment of a reduced water activity yogurt component forms a filling or topping for a muffin.

In another embodiment, a food product comprising a reduced water activity yogurt of the present invention comprises a filling that is used to produce filled bars which contain high levels of yogurt. For example, in one embodiment the reduced water activity yogurt is coextruded with a typical cereal bar outer layer, and then baked to produce a bar with a yogurt filling. Baking also serves to further reduce the water activity of the bar, and it provides a heating step which reduces the microbiological load of the finished bar. In one embodiment, at least one preservative, including but not limited to preservatives selected from the group consisting of sorbic acid, potassium sorbate, benzoic acid, salts of benzoic acid (e.g., sodium benzoate), parabens (e.g., methyl paraben, ethyl paraben, propyl paraben, butyl paraben, heptyl paraben) diethyl pyrocarbonate (no longer approved in the U.S.), glyceryl esters (e.g. glycerol monolaureate, which is effective against bacteria), natural preservatives, propionic acid and sodium propionate is added to the finished bar to prevent the growth of yeast, mold or other microorganisms. In one embodiment a natural preservative is used, for example natural antimycotics. In one embodiment, natural preservatives are derived from natural sources (e.g. fermentation products). Examples of natural preservatives include natamycin (natural antimycotic composition), nisin (a natural anti-bacterial composition), lauric arginate, polylysine, and glyceryl monolaureate. In some embodiments, propionic acid can also be natural, although it is typically synthetic.

In another embodiment, a reduced water activity yogurt component is used as a topping for bars that are then baked. This can be accomplished in a two-step layering process. In another embodiment, the reduced water activity yogurt component is used as a layer in a multilayer bar. This can be accomplished in a multi-step layering process.

In another embodiment, the high level of yogurt in a reduced water activity yogurt component (e.g., layer, topping, filling, etc.) and a high level of inclusion of that component in a food product (e.g. bar, cookie, bakery product, cereal, etc.) results in high levels of yogurt in the finished bar. For example, this level of yogurt can be as high as about 25-30 wt % real yogurt in the finished bar when the component makes up about 50-55 wt % of the finished bar. Due to this high level of yogurt, the layer or filling also delivers a strong yogurt experience to the consumer including the flavor of yogurt. In addition, components including but not limited to food acids and flavoring agents can be added to the yogurt component to enhance its yogurt flavor. For example, in one embodiment texturants are added to the yogurt component prior to combining it with the bar to modify its texture and to prevent boil-out during baking. These texturants include but are not limited to starches and hydrocolloids.

In one embodiment, the yogurt component for a food product is manufactured at a dairy plant and the yogurt component is added to a bar, cookie, bakery product, cereal or other component at a bakery. However, in another embodiment the food product is manufactured at a single facility or multiple facilities as desired.

Comparative Examples

One embodiment of the method of the present invention will now be described with reference to FIG. 6. First, the base 61 for the yogurt is condensed skim milk (CSM). The CSM has a solids content adjusted to 27 wt % total solids, wherein 15 wt % solids is lactose. Note that for some milks (e.g. skim milk or condensed skim milk), the total solids content can be approximately the same as the MSNF content because they have essentially no fat. However, for low fat milk or full fat milk, the MSNF can be the same as for skim milk, but the total solids content can be higher because the low fat or full fat milk has a higher fat content, which is considered a solid.

Milk with any of the typical fat contents (skim, low fat or nonfat) can be used as a base for the high solids yogurt. For example, fluid milk at 8.25% MSNF could have less than 0.5% (skim), 1% or 2% (low fat), or at least 3.25% (whole) fat content by weight, respectively. The fat content increases proportionally to MSNF as water content is reduced. Thus, for example, an 8.25% MSNF fluid milk could have 0%, 2%, or 3.25% fat content by weight. If the water content of the 8.25% MSNF milk is reduced until the milk has 27% MSNF the resulting milk could have 0% (skim), 6.55% (low fat), or 10.64% (whole) fat content by weight, respectively. The fat content can vary without affecting the water activity of the milk because undissolved solids, including milk fat, do not affect the colligative properties (e.g., water activity).

Because only solutes, for example dissolved solids, contribute to reduced water activity of a reduced water activity yogurt, it is the solute concentration in a yogurt, rather than its MSNF content or total solids content, that is key to reducing water activity. Nonetheless, MSNF is useful as an indication of the amount of solutes present in a reduced water activity yogurt. For example, it is possible to calculate approximate solute concentration in a yogurt from a given MSNF content if the fractional amount of soluble solids is known or if reasonable assumptions are made. For example, it can be reasonable to assume that milk solids, non-fat (MSNF) contains 36.79% protein and that 80% of that is casein proteins. It can also be reasonable to assume that all the solids in MSNF, except the casein, are soluble. Using these assumptions, approximately 29.43% of MSNF content is insoluble casein, while approximately 70.57% of the MSNF content is soluble. For example, given the previous assumptions and a milk with 27% MSNF, the amount of insoluble casein can be calculated as approximately equal to 29.43% soluble solids times 27% MSNF. This calculation indicates that approximately 7.95% of the MSNF is insoluble casein, while the rest (27% minus 7.95%), approximately 19.05% of the MSNF is soluble solids. The same or similar assumptions or actual information regarding the fractional amount of MSNF content that is soluble can be used to determine the amount of solutes in any milk or yogurt.

To provide some additional detail for approximating soluble solids from MSNF, the solutes in MSNF are composed of the carbohydrates (e.g., lactose, galactose, glucose, lactic acid) plus a percentage of the proteins (e.g., soluble proteins) in milk, which can be cultured to provide a yogurt. About 55 wt. % of the MSNF are solutes derived from milk carbohydrates. About 7 wt. % of the MSNF are solutes derived from soluble proteins. Accordingly, a total of about 62% of MSNF can be assumed to be solutes. In some embodiments, the solute content can be about 55-65 wt. % of the MSNF. Accordingly, in some embodiments, it can be reasonable to assume that the soluble fraction of the MSNF is any value from about 55-65 wt. % of the MSNF.

Returning to FIG. 6, in a second step, the CSM is subject to incubation 62 with yogurt cultures and lactase at 43° C. for 16 hours to form a finished yogurt 63 with a pH less than or equal to 4.6. Yogurt cultures resistant to high solids content were used during the culturing process.

Third, filling ingredients 64, including but not limited to solutes such as soluble solids are added to the finished yogurt 63.

Fourth, a cold mix process 24 is employed to mix the yogurt and filling ingredients to form a reduced water activity yogurt component 65. In one embodiment the reduced water activity yogurt component is used, for example, as a filling for a food bar. The reduced water activity yogurt component has a water activity of 0.83-0.84 and a smooth texture. A smooth texture means, for example, that a typical human tongue perceives the yogurt as smooth.

Figure 6:
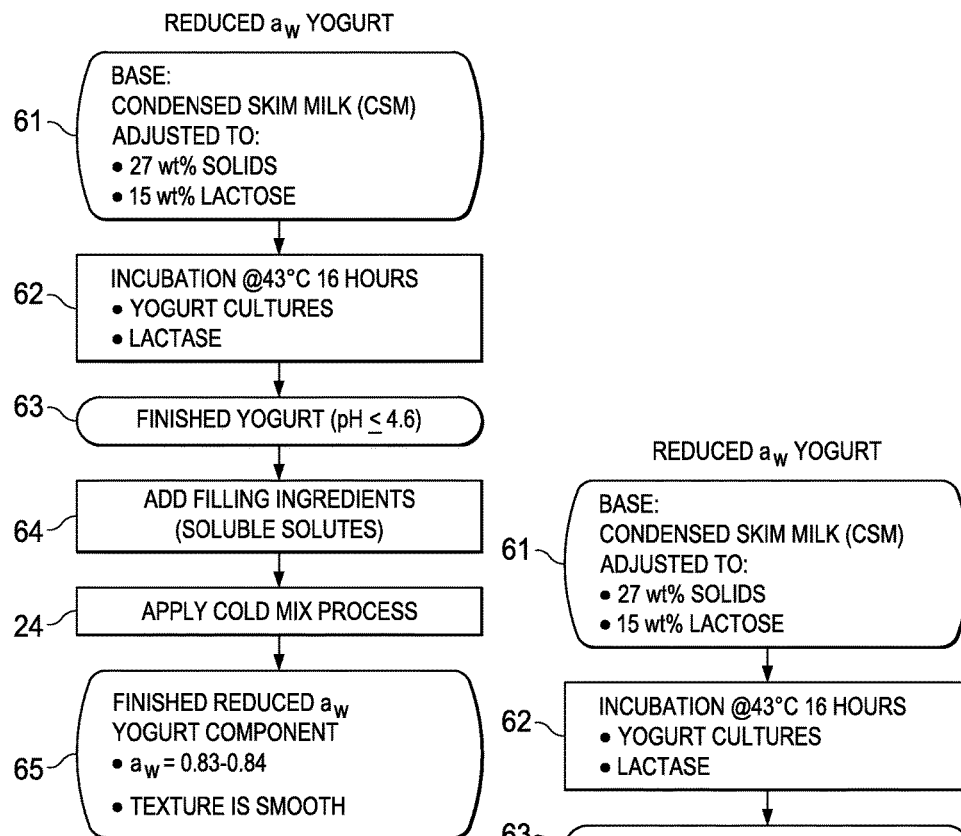
FIG. 6 is a flow chart representation depicting the overall process of one embodiment of the invention that uses a cold mix process to obtain a reduced water activity yogurt.

The inventors found that in conjunction with the embodiment of FIG. 6, using a 29 wt % solids and 16 wt % lactose CSM was less desirable than using a 27 wt % solids and 15 wt % lactose CSM. For example, when using a 29 wt % solids and 16 wt % lactose CSM, less culture activity occurred during the culturing process and the final yogurt pH reached only 5.5.

Another embodiment of the method of the present invention will now be described with reference to FIG. 7. First, the base 61 for the yogurt is condensed skim milk (CSM). The CSM has a solids content adjusted to 27 wt % solids and 15 wt % lactose.

Second, the CSM undergoes incubation 62 with yogurt cultures and lactase at 43° C. for 16 hours to form a finished yogurt 63 with a pH less than or equal to 4.6. Yogurt cultures resistant to high solids content were used during the culturing process.

Third, filling ingredients 64, including but not limited to solutes such as soluble solids are added to the finished yogurt 63.

Fourth, a cold mix process 24 is employed to mix the yogurt and filling ingredients without applying heat to form a reduced water activity yogurt component 65.

Fifth, the reduced water activity yogurt component 65 is treated in a hot process 71 to produce a finished filling 72 which can be used, for example, as a filling for a food bar. In one embodiment, the hot process dehydrates the yogurt through the application of heat under a vacuum.

Another embodiment of the invention in the form of a reduced water activity yogurt for bars was prepared from the components of Table 1:

TABLE 1

Finished Filling Formulation

| Component | wt % |
| --- | --- |
| CSM Yogurt | 54.2-52.3 |
| Glycerin | 18.2 |
| Fructose | 6.2 |
| Honey | 6.2 |
| Sucrose | 6.0 |
| Milk Permeate | 2.0 |
| Starches | 5.6-7.5 |
| Lactic Acid | 1.3 |
| K Sorbate | 0.3 |
| Total | 100.0 |

Figure 7:
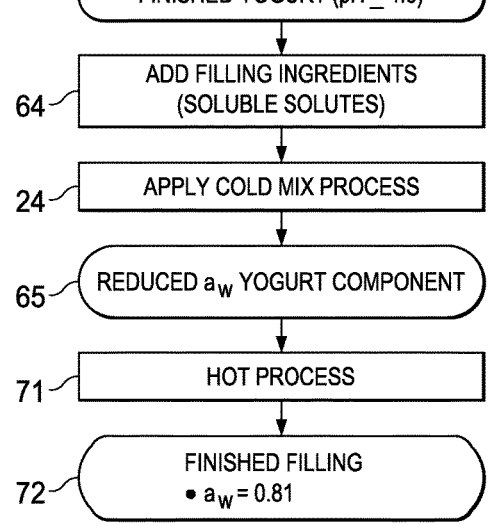
FIG. 7 is a flow chart representation depicting the overall process of one embodiment of the invention using a hot process to obtain a reduced water activity yogurt component in the form of a finished filling.

A finished filling with a composition as described in Table 1 was produced using a cold mix process and hot process as described in FIG. 7. The ranges given for CSM Yogurt and Starches in TABLE 1 indicate that as the weight percentage of Starches increases, the weight percentage of CSM Yogurt correspondingly decreases. The finished filling was used as a filling inside baked bars to form yogurt-filled bars. The finished filling was also used as a spread on top of baked bars to form a yogurt-on-top bar. The filling was applied by hand, although it could also be applied by any suitable application process, for example, using sheeting equipment. The yogurt filling was added to both the yogurt-on-top bar and the yogurt-filled bar, using a cold mix process. The bars were then baked to form a finished product. The finished yogurt-on-top and yogurt-filled bars comprised 25 wt % fresh yogurt and after baking had a water activity of 0.80.

Another embodiment of the invention in the form of a reduced water activity yogurt filling for bars was prepared from the components of Table 2:

TABLE 2

Finished Filling Formulation

| Component | wt % |
| --- | --- |
| CSM Yogurt | 55 (56.7-53.7) |
| Humectants | 38 |

TABLE 2-continued

Finished Filling Formulation

| Component | wt % |
|---|---|
| Starches | 6.7 (5-8) |
| Preservative | 0.3 |
| Total | 100.0 |

A finished filling with a composition as described in Table 2 was produced using a cold mix process and hot process as described in FIG. 7. The ranges for CSM Yogurt and Starches given in Table 2 indicate that as the weight percentage of Starches increases, the weight percentage of CSM Yogurt correspondingly decreases. The preservative in Table 2 comprised potassium sorbate. The finished filling comprised 55 wt % yogurt, 6.7 wt % starches, and was used as a spread on top of a bar to form a yogurt-on-top bar. The filling was applied by hand, although it could also be applied by any suitable application process, for example, using sheeting equipment. The yogurt-on-top bar was then baked to lower the water activity of the bars to 0.80.

Figure 8:
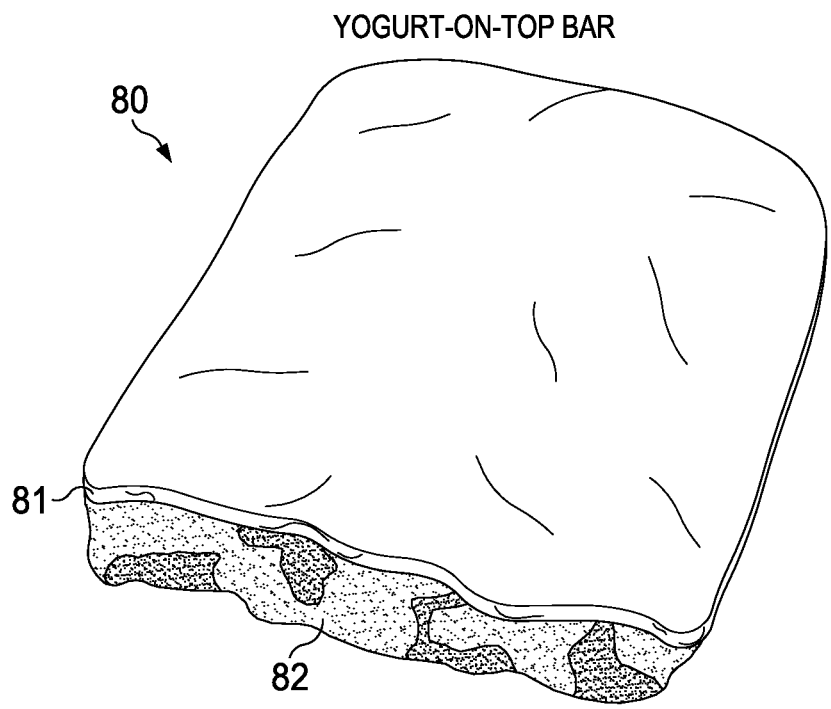
FIG. 8 is a schematic view of one embodiment of the invention depicting a yogurt-on-top bar comprising 25 wt % fresh yogurt and potassium sorbate that was baked to a water activity level of 0.80.

FIG. 8 is a schematic illustration of a food product 80 (e.g., a baked yogurt-on-top bar). In FIG. 8, a yogurt component 81 is on top of the grain-based component 82. The finished filling was also used as a filling inside baked bars to form yogurt-filled bars. The finished yogurt-on-top and yogurt-filled bars comprised 25 wt % fresh yogurt and had an equilibrium water activity of 0.80 after baking. The bars contained much more yogurt than many typical yogurt bars which only contain 1-3 wt % yogurt. The bars also delivered the great taste and texture of real yogurt in a bar form. The grain-based component of the yogurt-on-top bar comprised inclusions.

Figure 9:
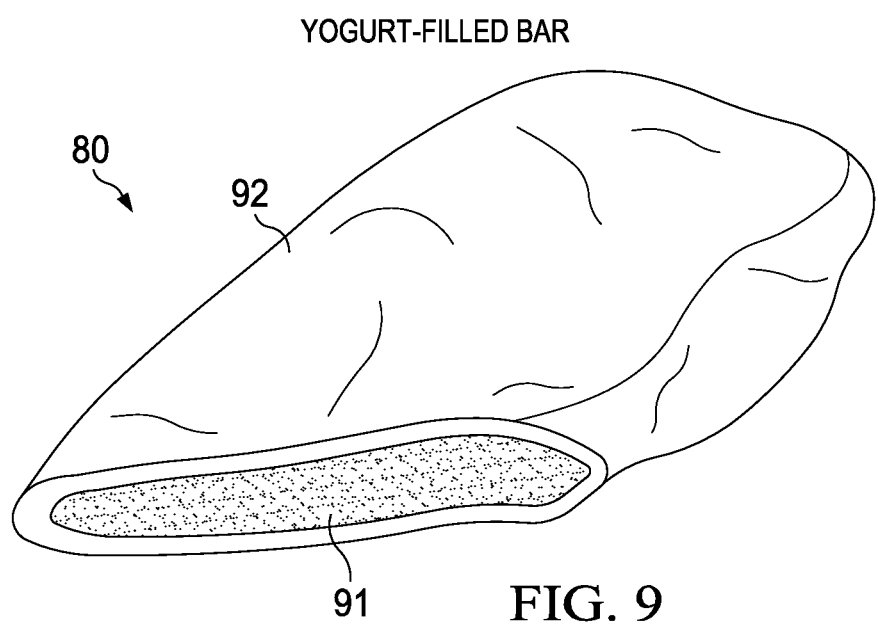
FIG. 9 is a schematic view of one embodiment of the invention depicting a yogurt-filled bar comprising 25 wt % fresh yogurt and potassium sorbate that was baked to a water activity level of 0.80.

FIG. 9 is a schematic illustration of a food product 80 (e.g., a baked yogurt-filled bar incorporating the finished filling of Table 2). In FIG. 9, a yogurt component 91 is encompassed by a grain-based component 92. The finished yogurt-on-top and yogurt-filled bars comprised 25 wt % fresh yogurt and had a water activity of 0.80.

The ingredient list for the baked yogurt-filled bar of FIG. 9 is as follows: Yogurt (Condensed Skim Milk, Yogurt Cultures, Lactase), Wheat Flour, Sugar, Glycerin, Oat Flakes, Vegetable Shortening (Canola, Palm & Palm Kernel Oil), Modified Corn Starch, Invert Sugar Syrup, Fructose, Honey, Milk Permeate, Lactic Acid, Nonfat Dry Milk, Potassium Sorbate, Salt, Baking Powder (Sodium Acid Pyrophosphate, Sodium Bicarbonate, Corn Starch, Monocalcium Phosphate), Lecithin, Honey, Vanilla Extract, Xanthan Gum, Egg White Solids. Nutrition facts for the baked yogurt-filled bar of FIG. 9 can be found in Table 3:

TABLE 3

| Nutrition Facts | | |
|---|---|---|
| Serving Size: 1 bar (50 g) | | |
| Amount per serving | | |
| Calories | 170 | |
| Calories from Fat | 33 | |
| | | % Daily Value |
| Total Fat | 4 g | 12% |
| Saturated Fat | 1 g | 3% |
| Trans Fat | 0 g | |
| Polyunsaturated Fat | 1 g | |
| Monounsaturated Fat | 2 g | |
| Cholesterol | 1 mg | 0% |
| Sodium | 120 mg | 5% |
| Potassium | 105 mg | 3% |

TABLE 3-continued

| Nutrition Facts | | |
|---|---|---|
| Total Carbohydrates | 31 g | 10% |
| Dietary Fiber | 1 g | 4% |
| Sugars | 10 g | |
| Sugar Alcohols | 4 g | |
| Protein | 3 g | |
| Calcium | | 9% |

Figure 10:
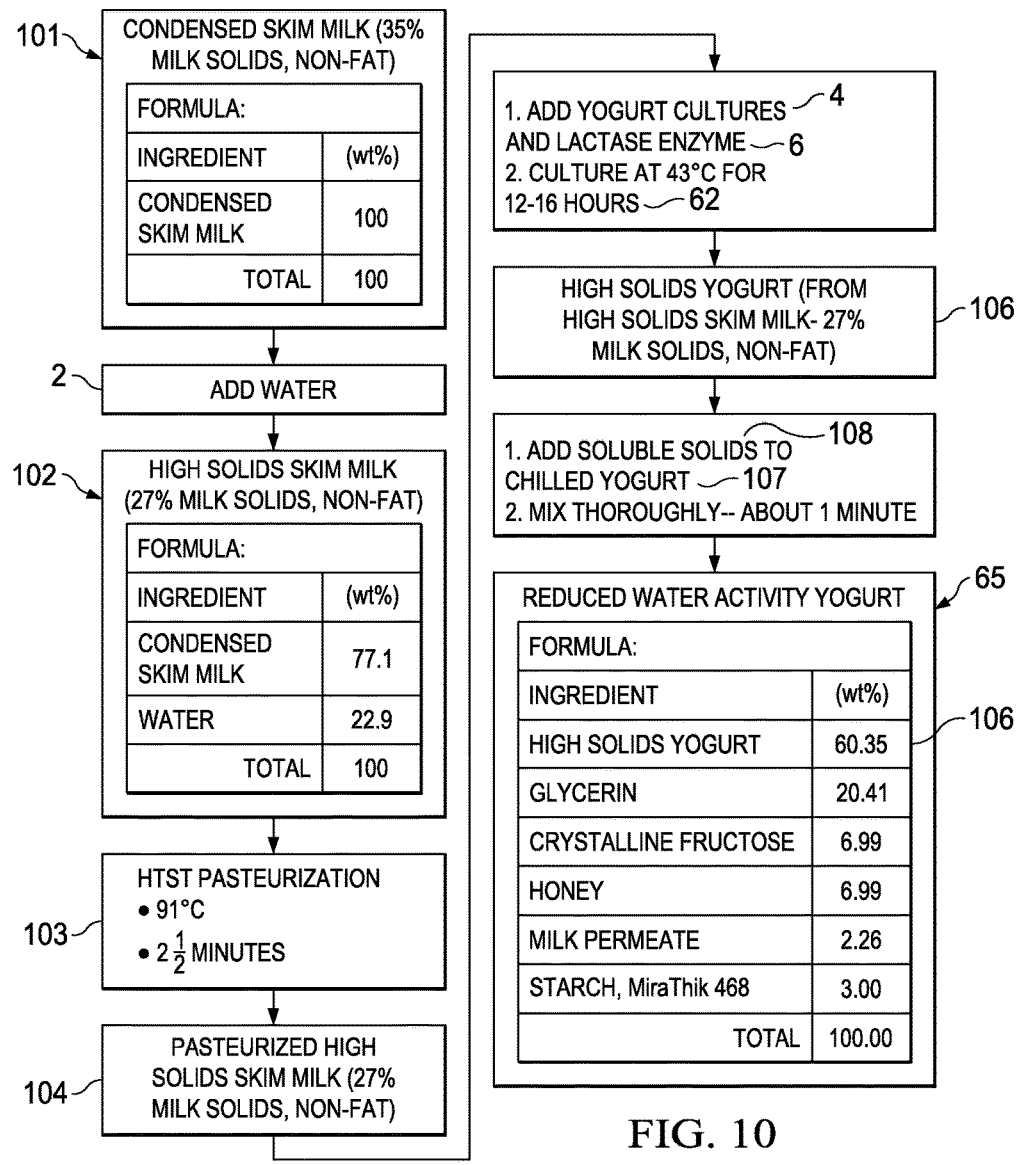
FIG. 10 is a flow chart representation depicting the overall process of one embodiment of the invention using condensed skim milk to obtain a reduced water activity yogurt component.

Another embodiment of the invention will now be described with reference to FIG. 10. The following percentages are all weight percentages unless otherwise provided. Starting with condensed skim milk 101, for example, 35% milk solids, non-fat (MSNF) skim milk, water 2 is added to decrease the solids content of the milk to 27%. This results in a High Solids Skim Milk 102 with 27% MSNF. In order to reduce condensed skim milk from 35% MSNF to 27% MSNF, it is necessary to add water to the condensed skim milk until the water comprises 22.9% of the combined weight as shown in FIG. 10. However, if 25% MSNF is desired, it is necessary to combine water and condensed skim milk until water makes up 28.6% of the total weight and condensed skim milk makes up 71.4% of the total weight.

The high solids skim milk (27% MSNF) is then pasteurized using a High Temperature Short Time (HTST) pasteurization process 103. In this case, it is pasteurized at 91° C. for 2½ minutes. This results in Pasteurized High Solids Skim Milk 104 (27% MSNF).

Yogurt cultures 4 (e.g., yogurt starter culture) are added to the pasteurized high solids skim milk. Since this is a high solids milk, a culture that will withstand high solids, in particular the high lactose, is used. In this case the culture used is YF-L706 thermophilic yogurt culture from Chris Hansen, Inc., 9015 West Maple St., Milwaukee, Wis. 53124, US. Information is also available at www.chr-hansen.com. YF-L706 contains *Streptococcus thermophilus* and *Lactobacillus delbrueckii* subsp. *bulgaricus*. The culture is provided in the form of frozen pellets, and it is added to the pasteurized milk at 0.02% or 200 g per 1000 liters.

The lactase enzyme 6 is added to the pasteurized high solids skim milk at the same time as the yogurt starter culture. The lactase is GODO-YNL2 from Danisco, Four New Century Parkway, New Century, Kans. 66031, US. Information is also available at www.danisco.com. GODO-YNL2 is a beta-galactosidase. It is added to the pasteurized high solids skim milk at 0.05% or 0.5 g/kg. The reduced $a_w$ yogurt can be produced either with or without the lactase.

During incubation 62 the pasteurized high solids skim milk is cultured at 43° C. for approximately 12-16 hours until it reaches a pH of less than 4.6. In one embodiment, the target pH is 4.5. The result is a high solids yogurt 106. The titratable acidity for the high solids yogurt at the target pH is approximately 1.9%. The $a_w$ is approximately 0.98.

After culturing the high solids yogurt is cooled to 4° C. (refrigeration temperature) to form a chilled yogurt 107. At this point, the water activity of the high solids yogurt is still relatively high ($a_w$=approximately 0.98). The water activity of the high solids yogurt is reduced substantially through the addition of low molecular weight soluble solids 108 to form a reduced water activity yogurt 65. The added soluble solids include the following: Glycerin, Crystalline Fructose, Honey, Milk Permeate and Starch. The addition of the soluble solids reduces the equilibrium $a_w$ of the yogurt to approximately 0.83-0.84. The pH remains 4.4-4.5. Note that glycerin (glycerine or glycerol) is actually a liquid at room temperature. Glycerin is miscible with water (i.e. soluble in all proportions). Glycerin also has a low molecular weight, which means that a lower mass of glycerin can be added to a solution to increase the mole fraction of solutes by a given amount relative to a molecule with a higher molecular weight. This is useful for reducing the water activity of a solution. However, glycerin can have a bitter off taste. Accordingly, blending glycerin with other components (e.g. sugars or sorbitol) can help reduce the bitterness. Also note that the starch is not soluble. The starch is added to provide the desired texture to the yogurt after mixing. The milk permeate adds additional soluble milk solids, and, because it has a salty taste, it reduces the sweetness of the Reduced Water Activity Yogurt.

The solids, including soluble solids 108, and the chilled high solids yogurt 107 are mixed thoroughly for about 1 minute. In the laboratory, the solids are added to the chilled high solids yogurt and the mixing is accomplished using an immersion blender. In a pilot plant or in a production plant, the mixing can be accomplished with a high shear mixer, a Hobart style mixer, a horizontal mixer, any similar mixer, or another suitable mixer. The resulting reduced water activity yogurt 65 comprises ingredients with the following weight percentages: high solids yogurt 106, 60.35%; glycerin, 20.41%; crystalline fructose, 6.99%; honey, 6.99%; milk permeate, 2.26%; starch, MiraThik 468, 3.00%. At this point the Reduced Water Activity Yogurt can be used as a filling, topping or layer for baked bars or for bakery items such as muffins. Or, additional materials can be added to it to provide additional functionality.

Figure 11:
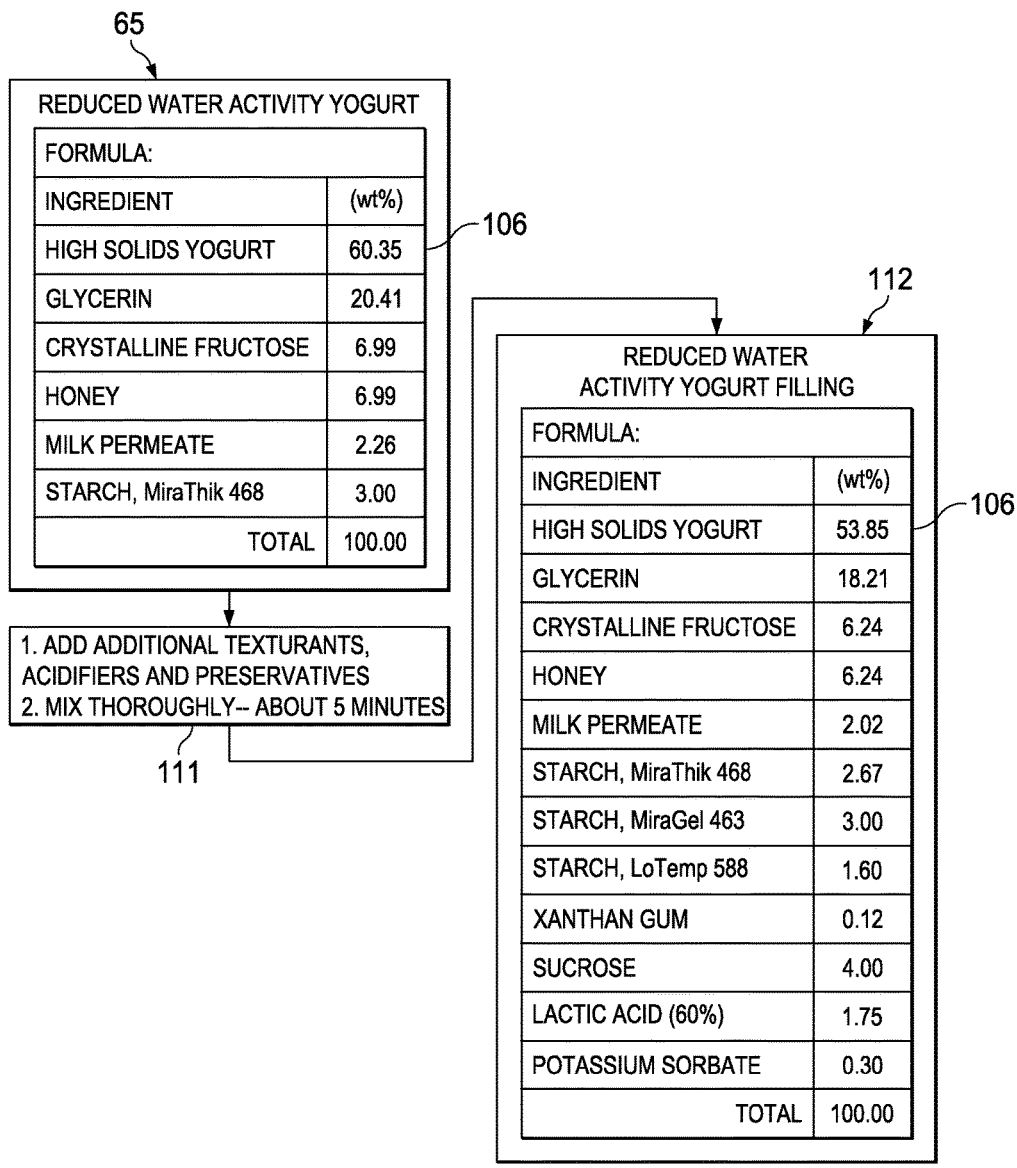
FIG. 11 is a flow chart representation depicting the overall process of one embodiment of the invention using a reduced water activity yogurt component to obtain a product in the form of a reduced water activity yogurt filling.

Another embodiment of the invention will now be described with reference to FIG. 11. As shown in FIG. 11, additional ingredients 111 (e.g. solids) are added to the chilled Reduced Water Activity Yogurt 65 to result in a bake-stable filling, layer or topping that has the desired tartness and microstability. In one embodiment, starches, xanthan gum, sucrose, lactic acid and potassium sorbate are added. This results in a Reduced Water Activity Yogurt filling 112 which has bake-stability (e.g. does not boil out of a filled bar during baking), which has a more tart flavor and which does not support microbiological growth at room temperature. The addition of these texturants, acidifiers and preservatives does not appreciably affect the $a_w$ of the Reduced Water Activity Yogurt, but it does lower the pH of the material to 3.9-4.0. The addition of appropriate starches and hydrocolloids provides the bake-stability by preventing boil-out during baking. The addition of lactic acid enhances the tart flavor. The addition of potassium sorbate prevents microbial growth. As shown in FIG. 11, the original high solids yogurt 106, which was used as the starting material, makes up 53.85% by weight of the Reduced Water Activity Yogurt Filling 112.

Figure 12A:
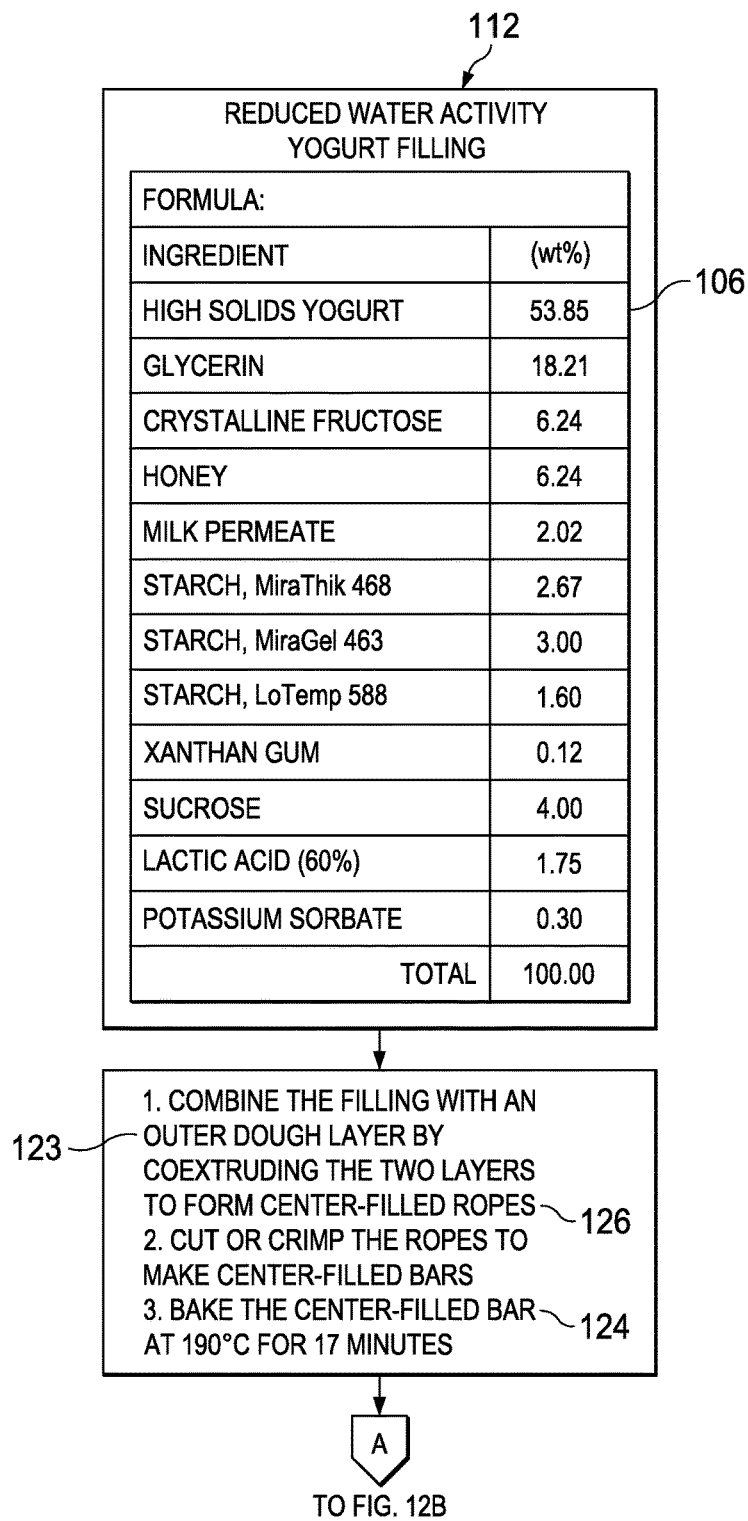
FIG. 12A is a flow chart representation depicting part of the overall process of one embodiment of the invention in which a reduced water activity yogurt component is coextruded with an outer dough layer to form a coextruded center-filled baked bar.

Another embodiment of the invention will now be described with reference to FIGS. 12A and 12B. The Reduced Water Activity Yogurt Filling 112, for example, is combined with an outer dough layer 123 as shown in FIGS. 12A and 12B. This can be done in a coextrusion process where the inner yogurt layer and the outer cereal layer are simultaneously forced through a die to form coextruded center-filled ropes 126. The Reduced Water Activity Yogurt Filling 112 and the outer dough layer can be combined in any proportion. In one embodiment, the proportion is 45 wt % yogurt filling to 55 wt % outer dough. These ropes are then cut or crimped to make distinct, individual center-filled bars 124 wherein the outer dough layer 123 partially, substantially or completely surrounds a center comprising Reduced Water Activity Yogurt Filling 112. In one embodiment, the bars are sprayed with water and sprinkled with oat flakes or other materials such as granola prior to baking. In one embodiment, the bars are left without any topping.

The formed, coextruded center filled bars 124 are then baked in an oven. The typical baking conditions are 190° C. for 17 minutes, but the baking conditions can be modified as appropriate. As shown in FIGS. 12A and 12B, before baking, the original high solids yogurt 106 makes up 24.23 wt % of the coextruded bars. After baking, which removes the added water from the product, the original high solids yogurt makes up 26.10 wt % of the bars. This process results in a Coextruded Center Filled Baked Bar 125 with a typical formulation as shown in FIGS. 12A and 12B.

The baking process lowers the $a_w$ of the product to approximately 0.80. With the incorporation of potassium sorbate (as shown in FIGS. 12A and 12B) to prevent the growth of yeasts and molds, it is microbiologically stable at room temperature. In one embodiment, the Center-Filled Baked Bar 125 comprises at least 0.30 wt % Potassium Sorbate.

Figure 13A:
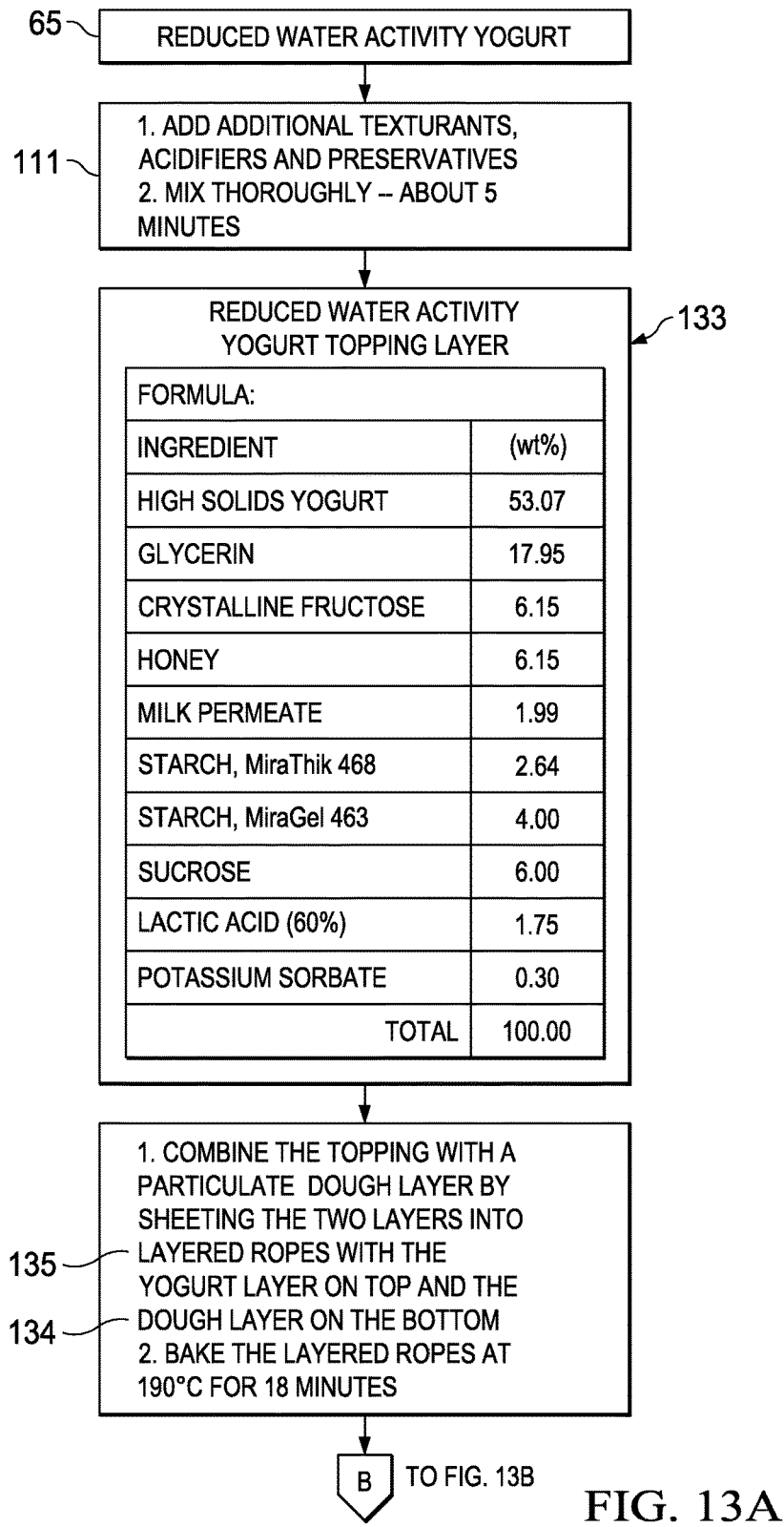
FIG. 13A is a flow chart representation depicting part of the overall process of one embodiment of the invention in which a reduced water activity yogurt component is used as a topping or layer for a layered baked bar.

Another embodiment of the invention will now be described with reference to FIGS. 13A and 13B. As shown in FIGS. 13A and 13B, the Reduced Water Activity Yogurt 65 can also be used as a layer or topping for a baked bar. If it is used as a topping for a baked bar, appropriate additional ingredients 111 for that application (e.g. texturants, acidifiers and preservatives) can be added as shown in the example in FIGS. 13A and 13B. In this application, starches, sucrose, lactic acid and potassium sorbate can be added. This results in a Reduced Water Activity Yogurt Topping/Layer 133 which does not flow off the top of or out of the center of a layered bar during baking, which has a more tart flavor, and which does not support microbiological growth at room temperature. The addition of these texturants, acidifiers and preservatives does not appreciably affect the $a_w$ of the Reduced Water Activity Yogurt 65, but it does lower the pH of the material to 3.9-4.0. The addition of these additional ingredients results in a Reduced Water Activity Yogurt Topping/Layer 133 which has bake-stability, which has a more tart flavor and which does not support microbiological growth at room temperature. The addition of appropriate starches provides bake-stability by preventing flow of the layer during baking. The addition of lactic acid enhances the tart flavor. The addition of potassium sorbate prevents microbial growth. As shown for example in FIGS. 13A and 13B, the original high solids yogurt 106, which was used as the starting material, can make up 53.07 wt % of the Reduced Water Activity Yogurt Topping/Layer 133.

This Reduced Water Activity Yogurt Topping/Layer 133 is then combined with a lower particulate, dough layer 134. This is done in a coextrusion process where the upper Reduced Water Activity Yogurt Topping/Layer 133 and the lower dough layer 134 are simultaneously forced through a die to form a layered rope 135 with the yogurt layer on top and the particulate dough layer on the bottom. The Reduced Water Activity Yogurt Topping/Layer 133 and the particulate dough layer can be combined in any proportion. In one embodiment the proportion is 48 wt % upper yogurt layer 133 to 52 wt % lower particulate dough layer 134, as shown in FIGS. 13A and 13B.

The layered ropes 135 are then baked in an oven. The typical baking conditions are 190° C. for 18 minutes, but the baking conditions can be modified as appropriate. After baking, the layered ropes 135 are cut into finished layered baked bars 136 of the appropriate length. Before baking, the original high solids yogurt 106 makes up 25.47 wt % of the coextruded layered ropes 135. After baking, which removes the added water from the combined layered ropes 135, the original high solids yogurt 106 makes up 28.44 wt % of the finished layered baked bars 136.

This process results in a Layered Baked Bar 136 with a typical formulation as shown in FIGS. 13A and 13B. The baking process has the effect of lowering the $a_w$ of the product to approximately 0.80. With the incorporation of potassium sorbate (as shown) to prevent the growth of yeasts and molds, it is microbiologically stable at room temperature.

Figure 14A:
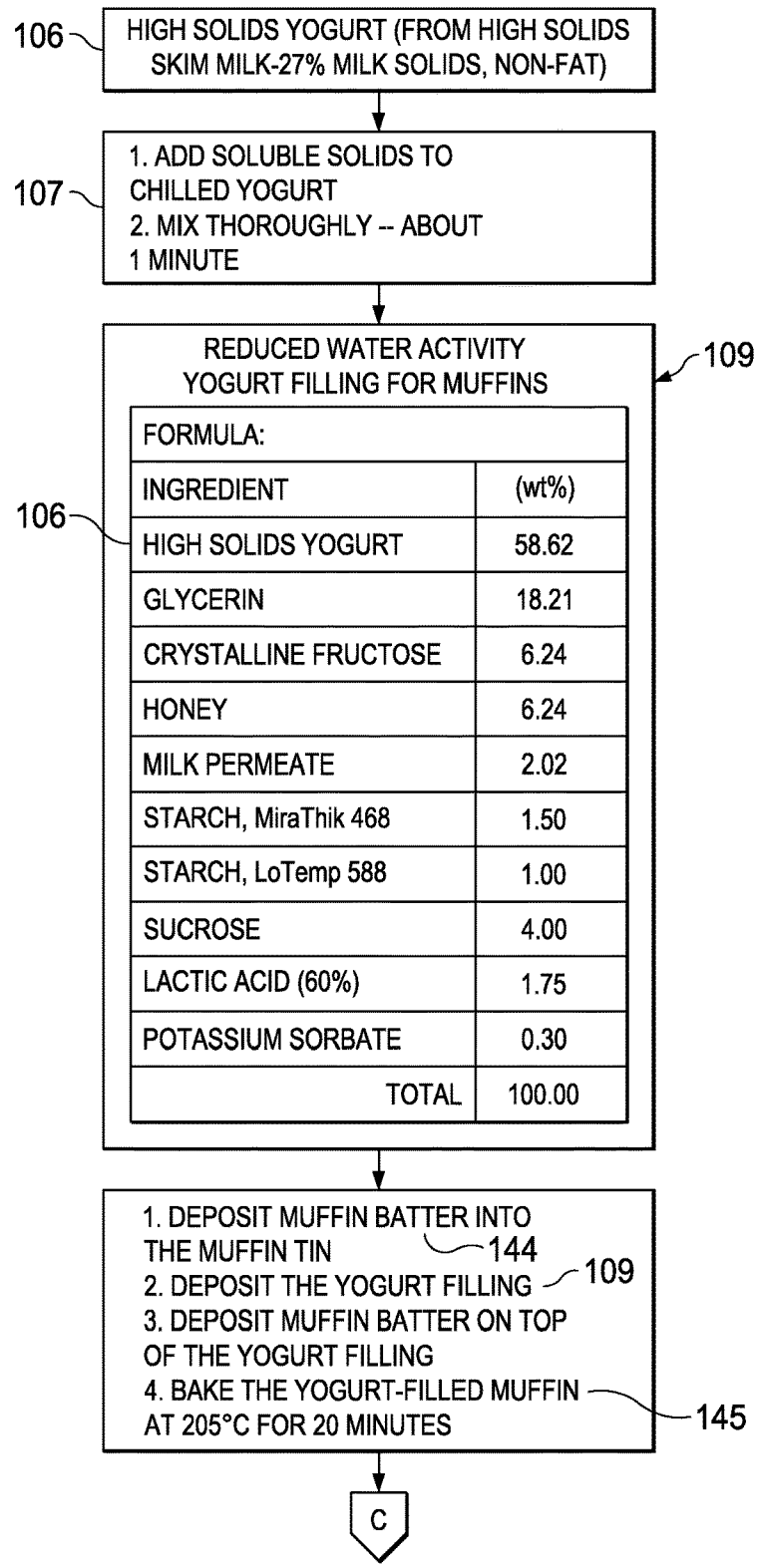
FIG. 14A is a flow chart representation depicting part of the overall process of one embodiment of the invention in which a reduced water activity yogurt filling is used in a yogurt-filled muffin.

Another embodiment of the invention will now be described with reference to FIGS. 14A and 14B. The High Solids Yogurt 106 from high solids skim milk (27% MSNF) is used to make a reduced water activity filling 109 for fresh baked goods such as muffins.

When used as a filling for muffins, the amount of added texturants can be reduced so that the Reduced Water Activity Yogurt Filling 109 has a viscosity similar to muffin batter. For this application, the soluble solids 107 are added to chilled high solids yogurt 106 in one step. Added solids include the following: Glycerin, Crystalline Fructose, Honey, Milk Permeate, Starches, Xanthan Gum, Sucrose, Lactic Acid and Potassium Sorbate.

The solids (including soluble solids 107) are added to the chilled high solids yogurt 106 and the mixing is accomplished in the laboratory with an immersion blender or a Hobart style mixer. In a pilot plant or in a production plant, the mixing can be accomplished with a high shear mixer, a Hobart style mixer, a horizontal mixer or any other suitable mixer.

The addition of the soluble solids 107 reduces the equilibrium $a_w$ of the yogurt to approximately 0.83-0.84. The pH also drops from 4.4-4.5 to approximately 3.9-4.0 because of the addition of the lactic acid. The milk permeate adds additional soluble milk solids, and, as in the previous examples, it reduces the sweetness of the Reduced Water Activity Yogurt Filling 109 for Muffins. As shown in FIGS. 14A and 14B, the original high solids yogurt 106, which was used as the starting material, makes up 58.62 wt % of the Reduced Water Activity Yogurt Filling 109. This Reduced Water Activity Yogurt Filling 109 for Muffins is then combined with a muffin batter 144. This is done by first depositing the muffin batter 144 into a muffin tin, then depositing the Reduced Water Activity Filling 109 for Muffins, followed by an additional deposit of muffin batter 144 on top. This results in a yogurt-filled muffin 145. Reduced Water Activity Yogurt Filling 109 for Muffins and the muffin batter 144 can be combined in any proportion. In one embodiment the proportion is 30 wt % yogurt filling 109 and 70 wt % muffin batter 144, as shown in FIGS. 14A and 14B. This process results in a yogurt-filed muffin 145 with a Reduced Water Activity Yogurt Filling 109. A formulation for the yogurt-filled muffin 145 is shown in FIGS. 14A and 14B.

In one embodiment, the yogurt-filled muffin 145 is baked at 205° C. for 20 minutes to form a Baked Yogurt-Filled Muffin 146. One formulation for the Baked Yogurt-Filled Muffin 146 is shown in FIGS. 14A and 14B. The muffin baking process has the effect of lowering the equilibrium $a_w$ of the product to approximately 0.90. With the incorporation of potassium sorbate (as shown), the muffin is microbiologically stable for frozen distribution. In one embodiment, the muffin is then thawed before placing it on the shelf for sale. In one embodiment, after being thawed, the product (e.g. the muffin) has a shelf life of up to about 2 weeks. In other embodiments the product (e.g. the muffin) has a shelf life of up to about 12 weeks.

In other embodiments, a product comprising a reduced water activity yogurt has a shelf life of up to about 1 week, up to about 2 weeks, up to about 3 weeks, up to about 4 weeks, up to about 6 weeks, up to about 8 weeks, up to about 10 weeks, up to 12 about weeks, up to about 16 weeks, up to about 20 weeks, up to about 24 weeks, up to about 28 weeks, up to about 34 weeks, up to about 40 weeks, up to about 46 weeks, or up to about 52 weeks inclusive. In other embodiments, a product comprising a reduced water activity yogurt has a shelf life of at least about 1 week, at least about 2 weeks, at least about 3 weeks, at least about 4 weeks, at least about 6 weeks, at least about 8 weeks, at least about 10 weeks, at least 12 about weeks, at least about 16 weeks, at least about 20 weeks, at least about 24 weeks, at least about 28 weeks, at least about 34 weeks, at least about 40 weeks, at least about 46 weeks, or at least about 52 weeks inclusive. In other embodiments, a product comprising a reduced water activity yogurt has a shelf life with a range of about 1-2 weeks, about 2-3 weeks, about 3-4 weeks, about 4-6 weeks, about 6-8 weeks, about 8-10 weeks, about 10-12 weeks, about 12-16 weeks, about 16-20 weeks, about 20-24 weeks, about 24-28 weeks, about 28-34 weeks, about 34-40 weeks, about 40-46 weeks, about 46-52 weeks, inclusive, or any range with end points selected from the endpoints of these ranges. In another embodiment, a product comprising a reduced water activity yogurt, for example a yogurt-filled or yogurt-topped bar, has a shelf life of up to about 26 weeks or up to about 52 weeks. In another embodiment, a product comprising a reduced water activity yogurt, for example a reduced water activity yogurt, has a shelf life of up to about 30 days, about 60 days, or about 90 days.

Figure 15:
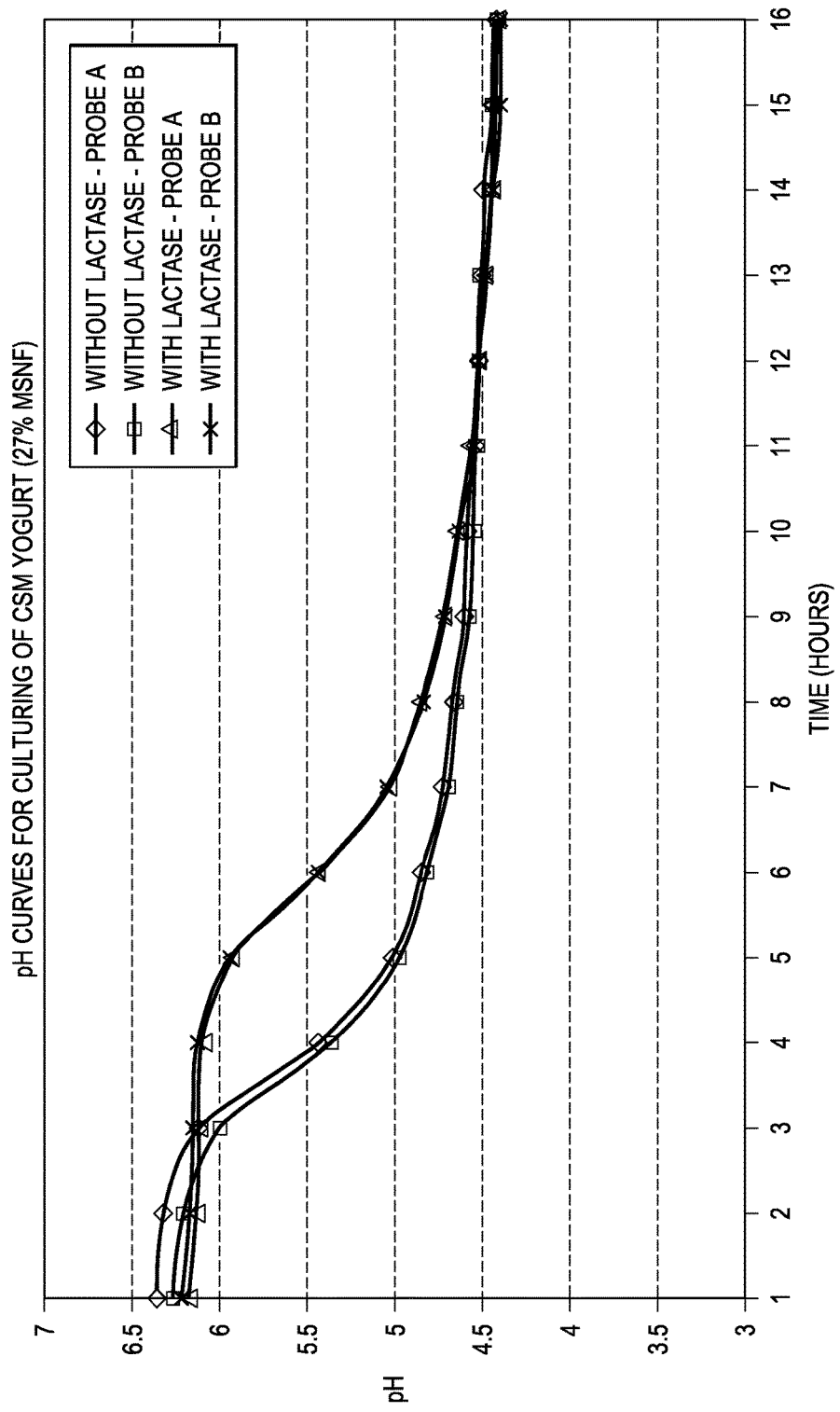
FIG. 15 is a graphic representation depicting how the pH of a condensed skim milk yogurt changes over time during culturing and how the presence or absence of lactase affects a curve of yogurt pH plotted over time.

FIG. 15 shows pH curves for culturing a high solids yogurt (i.e. CSM Yogurt) with or without lactase as read by two probes (i.e. probe A and probe B). The pH curves show how pH changes over time (i.e. hours) when yogurt with and without lactase is cultured. For example, all the pH curves show that the rate of decrease in pH starts out relatively slow, speeds up, and then becomes slow again. For a high solids yogurt comprising lactase as compared to yogurt that does not comprise lactase, it takes longer for the rate of decrease in pH to speed up and longer for the pH to reach approximately 4.6. However, both yogurts with and without lactase appear to reach a pH of 4.5 at approximately the same time (e.g. 11 or 12 hours). After this time period, both yogurts with and without lactase appear to slowly decrease in pH at approximately the same rate.

Figure 16:
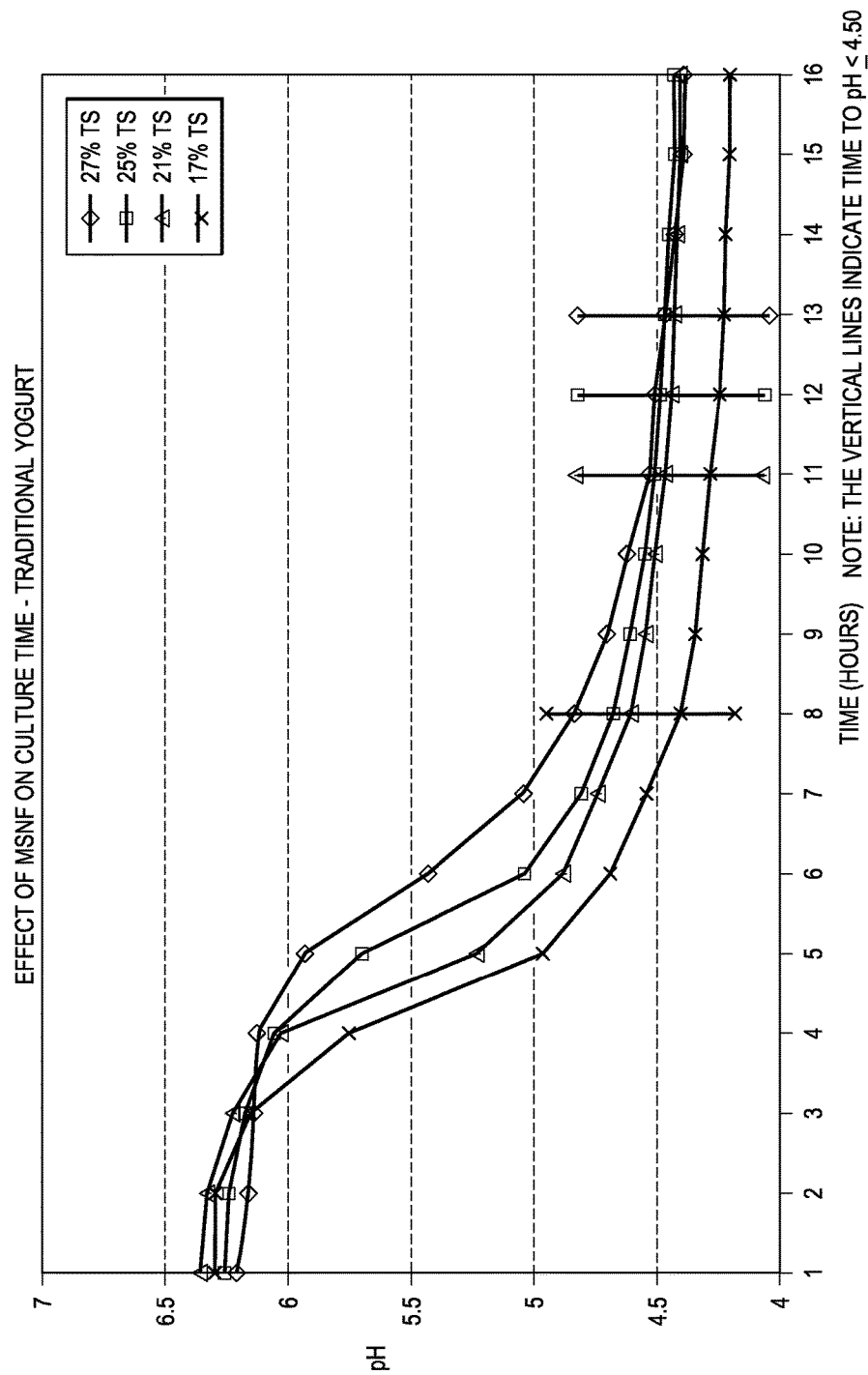
FIG. 16 is a graphic representation depicting how milk solids, non-fat (MSNF) content affects the time it takes a traditional yogurt to reach a desired pH, for example, less than or equal to about 4.50.

FIG. 16 shows the effect of the level of Milk Solids, Non-Fat (MSNF) on the culture time of a high solids traditional (e.g. as opposed to Greek) yogurt. For example, FIG. 16 shows pH curves for culturing a traditional high solids yogurt. The pH curves show how pH changes over time (i.e. hours) when the yogurt base (e.g. the starting material that will be made into yogurt) has varying levels of MSNF. In FIGS. 16-19, Total Solids or MSNF of the yogurt base is denoted in the legend with the abbreviation "TS", for example "17% TS", "21% TS", "25% TS", and "27% TS" correspond to 17%, 21%, 25% and 27% Milk Solids, Non-Fat (MSNF) by weight, respectively. Generally speaking, it appears that the higher the level of MSNF in the yogurt base, the longer it takes for the yogurt to reach a pH of about 4.50 or lower. For example, it took about 8 hours for the 17% MSNF traditional yogurt, about 11 hours for the 21% MSNF traditional yogurt, about 12 hours for the 25% MSNF traditional yogurt, and about 13 hours for the 27% MSNF traditional yogurt to reach a pH of about 4.50 or less. As used herein an X % MSNF yogurt refers to a yogurt made from a yogurt base with X % MSNF.

Figure 17:
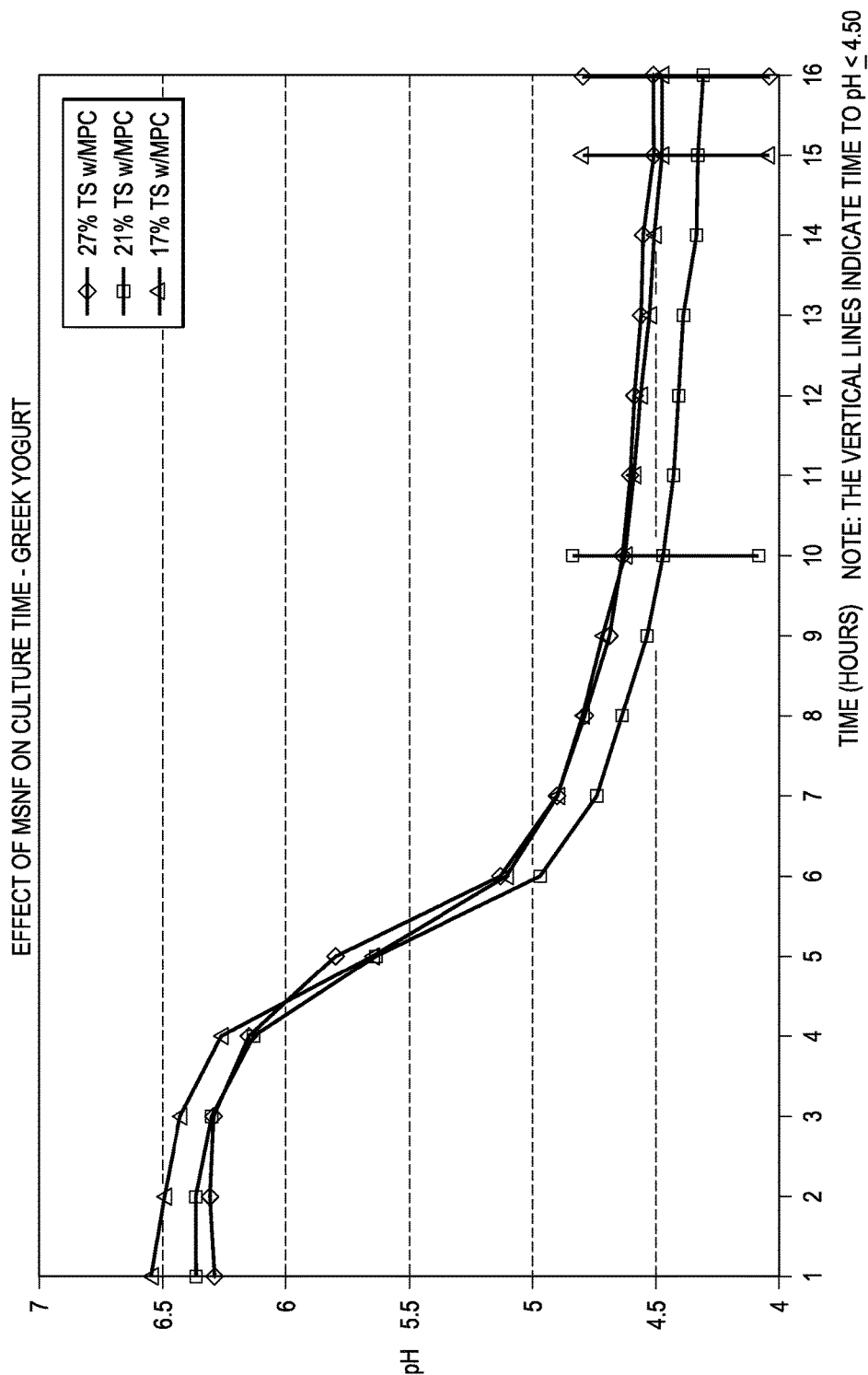
FIG. 17 is a graphic representation depicting how milk solids, non-fat (MSNF) content affects the time it takes a yogurt with added milk protein concentrate (MPC), for example a Greek yogurt, to reach a desired pH, for example, less than or equal to about 4.50.

FIG. 17 shows the effect of the level of Milk Solids, Non-Fat (MSNF) in a yogurt base on the culture time of a high solids Greek yogurt. For the examples in FIG. 17, milk protein concentrate (MPC) was added to traditional yogurt to result in a higher protein content that is consistent with Greek style yogurt. FIG. 17 shows pH curves for culturing a Greek high solids yogurt. The pH curves show how pH changes over time (i.e. hours) when yogurt base has varying levels of MSNF. Generally speaking, it appears that the higher the level of MSNF, the longer it takes for the yogurt to reach a pH of about 4.50 or lower, as shown in FIG. 16. However, some exceptions were evident in FIG. 17. For example, it took about 15 hours for the 17% MSNF Greek yogurt, about 10 hours for the 21% MSNF Greek yogurt, and about 16 hours for the 25% MSNF Greek yogurt to reach a pH of about 4.50 or less.

Figure 18:
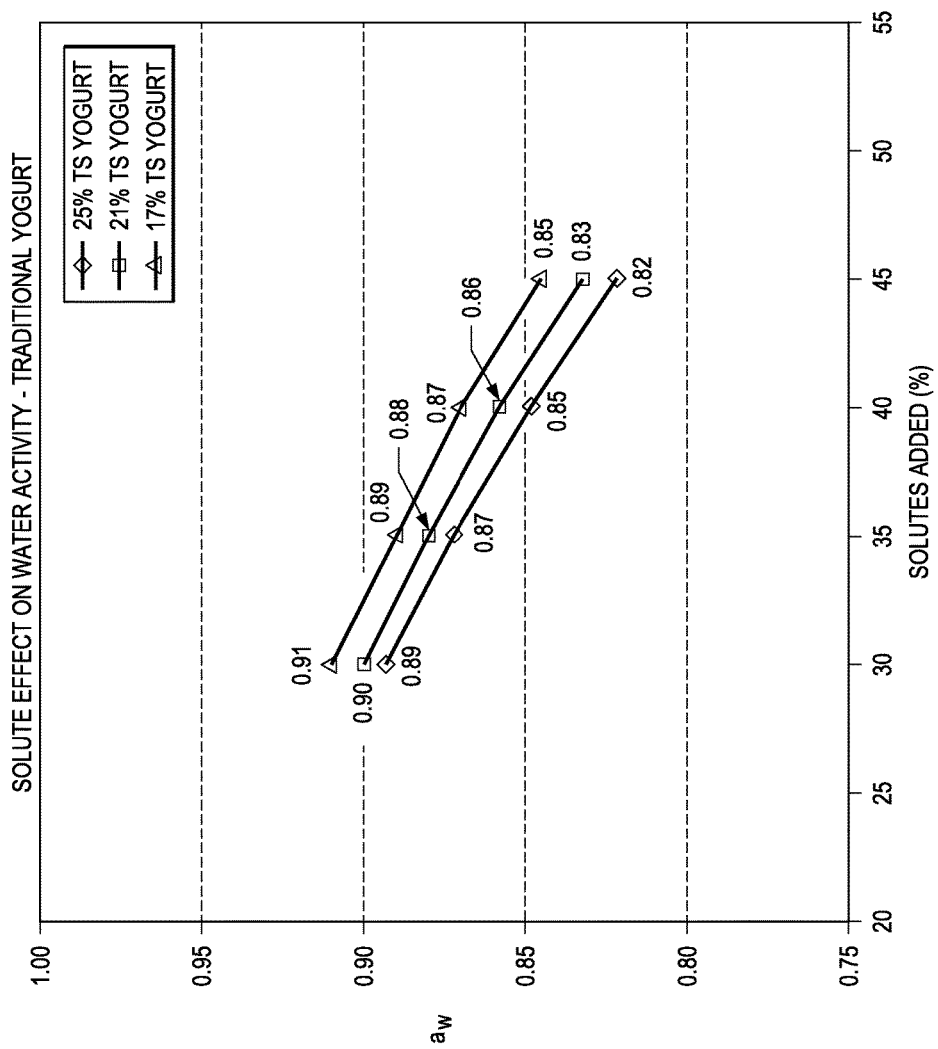
FIG. 18 is a graphic representation depicting how the weight percentage of added solutes in a traditional yogurt affects the water activity of the yogurt.

FIG. 18 shows the effect of solute addition on the water activity ($a_w$) of a high solids traditional yogurt (i.e. without any added protein). FIG. 18 shows the $a_w$ for a yogurt over the amount of solutes added to the yogurt as a percentage of the yogurt's total weight. For example, the 25% MSNF yogurt reaches an $a_w$ of about 0.82 when enough solutes have been added to the yogurt for the solutes to make up about 45 wt % of the yogurt's total weight. For comparison, when added solutes make up about 45 wt % of 21% MSNF yogurt, the yogurt has a reduced water activity of about 0.83 and when added solutes make up about 45 wt % of 17% MSNF yogurt, the yogurt has a reduced water activity of about 0.85.

Formulas and $a_w$ data for FIG. 18 are shown in Table 4. Note that the $a_w$ data shown in FIG. 18 are rounded to 2 decimal places and all percentages are shown as weight percentages. Table 4 shows the ingredient formulas for the solutes added to a 25%, 21%, and 17% MSNF traditional yogurt. For example, in one experiment, starting with a 25% MSNF traditional yogurt, solutes were added to the yogurt until the solutes comprised approximately 30 wt % of the total weight of the yogurt. For this experiment, the formula for the high solids yogurt with added solutes was 70 wt % yogurt, 16.71 wt % glycerin, 5.72 wt % crystalline fructose, 5.72 wt % honey, and 1.85 wt % milk permeate. The solutes comprised about 55.7 wt % glycerin, about 19.1 wt % crystalline fructose, about 19.1 wt % honey, and about 6.1 wt % milk permeate on a total-solute-weight basis. The yogurt formula resulted in a water activity ($a_w$) of 0.893.

TABLE 4

| 25% MSNF Traditional Yogurt | | | | |
|---|---|---|---|---|
| Ingredient | 30% Solutes Formula (%) | 35% Solutes Formula (%) | 40% Solutes Formula (%) | 45% Solutes Formula (%) |
| Yogurt, 25% MSNF | 70.00 | 65.00 | 60.00 | 55.00 |
| Glycerin | 16.71 | 19.50 | 22.28 | 25.07 |
| Crystalline Fructose | 5.72 | 6.67 | 7.63 | 8.58 |
| Honey | 5.72 | 6.67 | 7.63 | 8.58 |
| Milk Permeate | 1.85 | 2.16 | 2.46 | 2.77 |
| Total (%) | 100.00 | 100.00 | 100.00 | 100.00 |
| $a_w$ | 0.893 | 0.872 | 0.848 | 0.822 |
| 21% MSNF Traditional Yogurt | | | | |
| Ingredient | 30% Solutes Formula (%) | 35% Solutes Formula (%) | 40% Solutes Formula (%) | 45% Solutes Formula (%) |
| Yogurt, 21% Milk Solids | 70.00 | 65.00 | 60.00 | 55.00 |
| Glycerin | 16.71 | 19.50 | 22.28 | 25.07 |
| Crystalline Fructose | 5.72 | 6.67 | 7.63 | 8.58 |
| Honey | 5.72 | 6.67 | 7.63 | 8.58 |
| Milk Permeate | 1.85 | 2.16 | 2.46 | 2.77 |
| Total (%) | 100.00 | 100.00 | 100.00 | 100.00 |
| $a_w$ | 0.900 | 0.880 | 0.858 | 0.832 |
| 17% MSNF Traditional Yogurt | | | | |
| Ingredient | 30% Solutes Formula (%) | 35% Solutes Formula (%) | 40% Solutes Formula (%) | 45% Solutes Formula (%) |
| Yogurt, 17% MSNF | 70.00 | 65.00 | 60.00 | 55.00 |
| Glycerin | 16.71 | 19.50 | 22.28 | 25.07 |
| Crystalline Fructose | 5.72 | 6.67 | 7.63 | 8.58 |
| Honey | 5.72 | 6.67 | 7.63 | 8.58 |
| Milk Permeate | 1.85 | 2.16 | 2.46 | 2.77 |
| Total (%) | 100.00 | 100.00 | 100.00 | 100.00 |
| $a_w$ | 0.910 | 0.890 | 0.870 | 0.845 |

Figure 19:
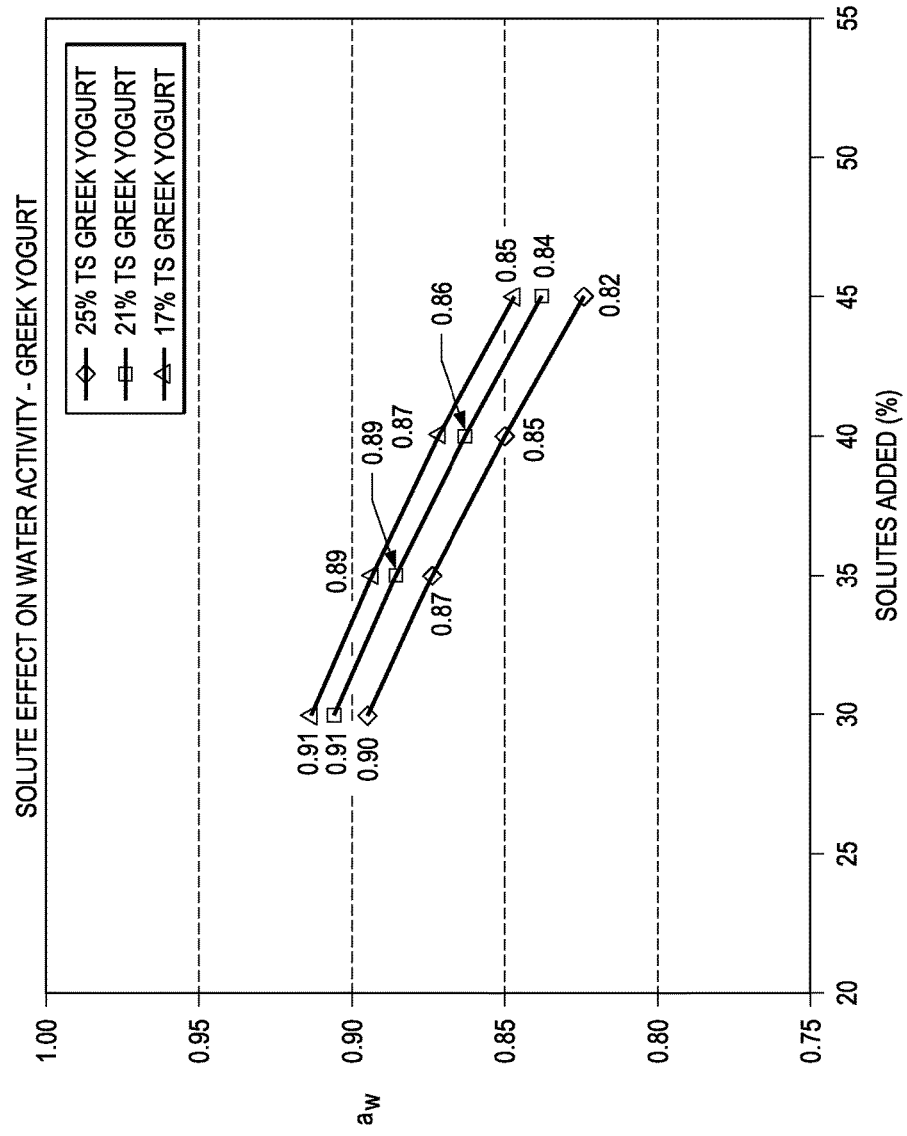
FIG. 19 is a graphic representation depicting how the weight percentage of added solutes in a Greek yogurt affects the water activity of the yogurt.

FIG. 19 shows the effect of solute addition on the water activity ($a_w$) of a high solids Greek yogurt. For the examples in FIG. 19, milk protein concentrate (MPC) was added to traditional yogurt to result in a higher protein content that is consistent with Greek style yogurt. According to one definition, Greek yogurt has a lower carbohydrate to protein ratio than regular yogurt. This can be accomplished, for example, by adding protein (e.g. MPC) or removing liquid, which also removes lactose that is in solution in the liquid. In some embodiments, protein can be added without removing carbohydrates to provide what is called fortified Greek yogurt. FIG. 19 shows the $a_w$ for a yogurt over the amount of solutes added to the yogurt as a percentage of the yogurt's total weight. For example, the 25% MSNF yogurt reaches an $a_w$ of about 0.82 when enough solutes have been added to the yogurt for the solutes to make up about 45 wt % of the yogurt's total weight. For comparison, when added solutes make up about 45 wt % of the 21% MSNF yogurt, the yogurt has a reduced water activity of about 0.84 and when added solutes make up about 45 wt % of the 17% MSNF yogurt, the yogurt has a reduced water activity of about 0.85.

Formulas and $a_w$ data for FIG. 19 are shown in Table 5. Note that the $a_w$ data shown in FIG. 19 are rounded to 2 decimal places and all percentages are shown as weight percentages. Table 5 shows the ingredient formulas for the solutes added to a 25%, 21%, and 17% MSNF Greek yogurt. For example, in one experiment, starting with a 25% MSNF Greek yogurt, solutes were added to the Greek yogurt until the solutes comprised approximately 30 wt % of the total weight of the yogurt. For this experiment, the formula for the high solids Greek yogurt with added solutes was 70 wt % yogurt, 16.71 wt % glycerin, 5.72 wt % crystalline fructose, 5.72 wt % honey, and 1.85 wt % milk permeate. The resulting yogurt formula had a water activity ($a_w$) of 0.895.

MSNF yogurt with added solutes equal to approximately 45% of the total weight of the yogurt, the yogurt to which lactase was added during culturing has a water activity of approximately 0.811, while the yogurt without added lactase has a water activity of approximately 0.816. As another example, for a 27% MSNF traditional yogurt with about 35% added solutes by weight, the yogurt had a water activity of 0.877 if lactase was not added during culturing, but a water activity of 0.860 if lactase was added during culturing.

Figure 20:
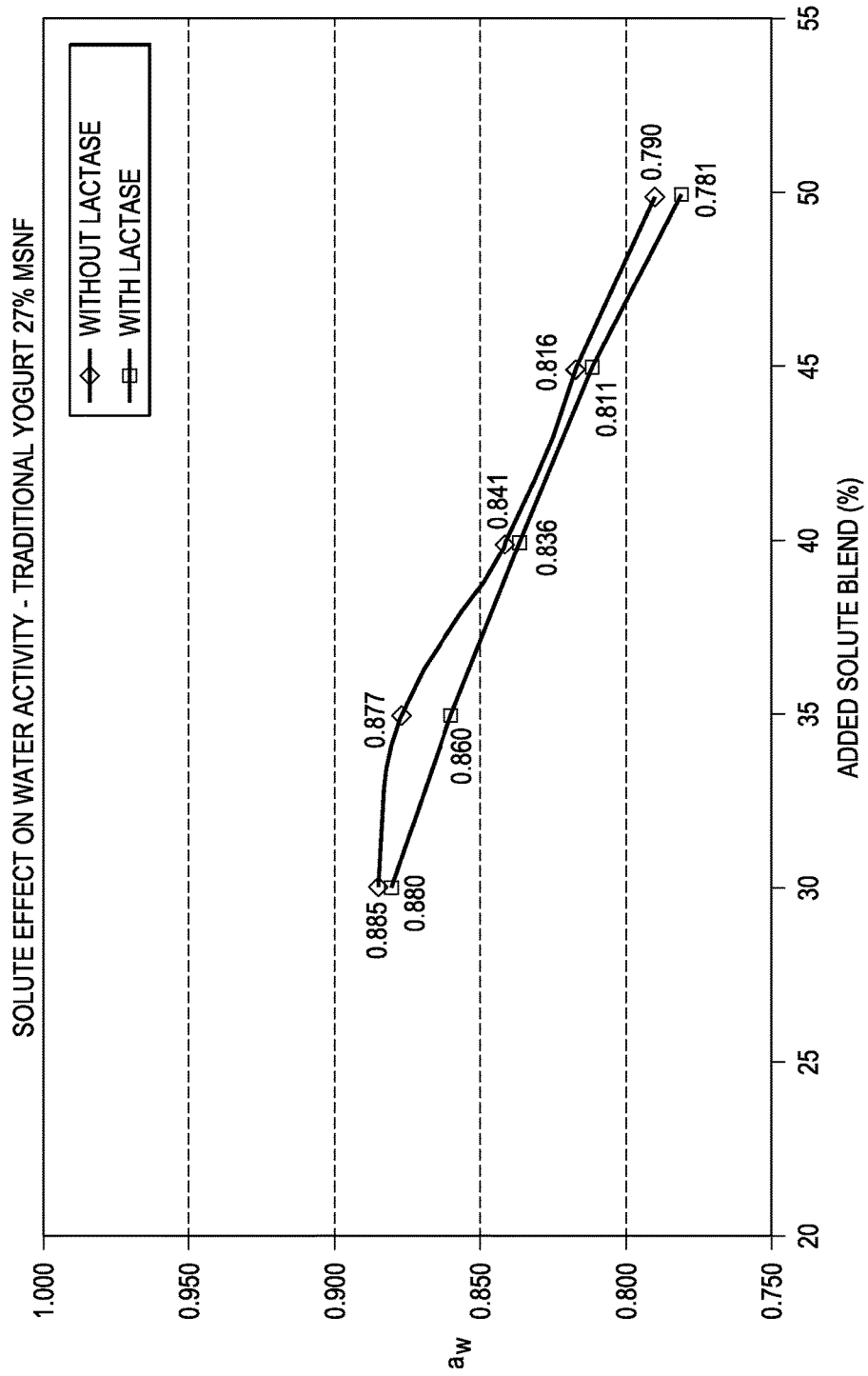
FIG. 20 is a graphic representation depicting how the addition of lactase during culturing results in a small reduction in water activity.

Formulas and $a_w$ data for FIG. 20 are shown in Table 6. Note that all percentages are shown as weight percentages. Table 6 shows the ingredient formulas for the solutes added to a 27% MSNF traditional yogurt. For one set of experiments, the yogurt had lactase added during culturing. For another set of experiments no lactase was added. For

TABLE 5

| 25% MSNF Greek Yogurt | | | | |
|---|---|---|---|---|
| Ingredient | 30% Solutes Formula (%) | 35% Solutes Formula (%) | 40% Solutes Formula (%) | 45% Solutes Formula (%) |
| Greek Yogurt, 25% MSNF | 70.00 | 65.00 | 60.00 | 55.00 |
| Glycerin | 16.71 | 19.50 | 22.28 | 25.07 |
| Crystalline Fructose | 5.72 | 6.67 | 7.63 | 8.58 |
| Honey | 5.72 | 6.67 | 7.63 | 8.58 |
| Milk Permeate | 1.85 | 2.16 | 2.46 | 2.77 |
| Total (%) | 100.00 | 100.00 | 100.00 | 100.00 |
| $a_w$ | 0.895 | 0.874 | 0.850 | 0.824 |
| 21% MSNF Greek Yogurt | | | | |
| Ingredient | 30% Solutes Formula (%) | 35% Solutes Formula (%) | 40% Solutes Formula (%) | 45% Solutes Formula (%) |
| Greek Yogurt, 21% Milk Solids | 70.00 | 65.00 | 60.00 | 55.00 |
| Glycerin | 16.71 | 19.50 | 22.28 | 25.07 |
| Crystalline Fructose | 5.72 | 6.67 | 7.63 | 8.58 |
| Honey | 5.72 | 6.67 | 7.63 | 8.58 |
| Milk Permeate | 1.85 | 2.16 | 2.46 | 2.77 |
| Total (%) | 100.00 | 100.00 | 100.00 | 100.00 |
| $a_w$ | 0.906 | 0.886 | 0.863 | 0.838 |
| 17% MSNF Greek Yogurt | | | | |
| Ingredient | 30% Solutes Formula (%) | 35% Solutes Formula (%) | 40% Solutes Formula (%) | 45% Solutes Formula (%) |
| Greek Yogurt, 17% Milk Solids | 70.00 | 65.00 | 60.00 | 55.00 |
| Glycerin | 16.71 | 19.50 | 22.28 | 25.07 |
| Crystalline Fructose | 5.72 | 6.67 | 7.63 | 8.58 |
| Honey | 5.72 | 6.67 | 7.63 | 8.58 |
| Milk Permeate | 1.85 | 2.16 | 2.46 | 2.77 |
| Total (%) | 100.00 | 100.00 | 100.00 | 100.00 |
| $a_w$ | 0.914 | 0.894 | 0.872 | 0.847 |

FIG. 20 shows how the addition of lactase during culturing has a small effect in helping to reduce the water activity of a yogurt. The graph in FIG. 20 plots water activity over the amount of solutes added to a 27% MSNF yogurt as a percentage of the total weight of the yogurt. The upper curve shows water activity over the weight percentage of added solutes for a yogurt to which no lactase was added during culturing. The lower curve shows water activity over the weight percentage of added solutes for a yogurt to which lactase was added during culturing. For example, for a 27% example, in one experiment, no lactase was added to the yogurt during culturing, but solutes were added to the traditional yogurt until the solutes comprised approximately 30 wt % of the total weight of the yogurt. For this experiment, the formula for the high solids yogurt with added solutes was 70 wt % Yogurt, 16.71 wt % glycerin, 5.72 wt % crystalline fructose, 5.72 wt % honey, and 1.85 wt % milk permeate. The yogurt formula resulted in a water activity ($a_w$) of 0.885.

TABLE 6

Without Lactase Added

| Ingredient | 30% Solutes Formula (%) | 35% Solutes Formula (%) | 40% Solutes Formula (%) | 45% Solutes Formula (%) | 50% Solutes Formula (%) |
|---|---|---|---|---|---|
| Yogurt (without lactase enzyme) | 70.00 | 65.00 | 60.00 | 55.00 | 50.00 |
| Glycerin | 16.71 | 19.50 | 22.28 | 25.07 | 27.84 |
| Crystalline Fructose | 5.72 | 6.67 | 7.63 | 8.58 | 9.54 |
| Honey | 5.72 | 6.67 | 7.63 | 8.58 | 9.54 |
| Milk Permeate | 1.85 | 2.16 | 2.46 | 2.77 | 3.08 |
| Total (%) | 100.00 | 100.00 | 100.00 | 100.00 | 100.00 |
| $a_w$ | 0.885 | 0.877 | 0.841 | 0.816 | 0.790 |

With Lactase Added

| Ingredient | 30% Solutes Formula (%) | 35% Solutes Formula (%) | 40% Solutes Formula (%) | 45% Solutes Formula (%) | 50% Solutes Formula (%) |
|---|---|---|---|---|---|
| Yogurt (with lactase enzyme) | 70.00 | 65.00 | 60.00 | 55.00 | 50.00 |
| Glycerin | 16.71 | 19.50 | 22.28 | 25.07 | 27.84 |
| Crystalline Fructose | 5.72 | 6.67 | 7.63 | 8.58 | 9.54 |
| Honey | 5.72 | 6.67 | 7.63 | 8.58 | 9.54 |
| Milk Permeate | 1.85 | 2.16 | 2.46 | 2.77 | 3.08 |
| Total (%) | 100.00 | 100.00 | 100.00 | 100.00 | 100.00 |
| $a_w$ | 0.880 | 0.860 | 0.836 | 0.811 | 0.781 |

For use in determining the reduction in water activity that can be achieved with a given solute, it can be useful to know the molecular weight of the solutes. Tables 7-10 provide the approximate compositions and molecular weights of several illustrative solutes. For example, some of these solutes can be used in the formulations depicted in FIGS. 18-20. The percentages shown in Tables 7-10 are weight percentages.

TABLE 7

Glycerin Composition

| | wt % | M.W. (g/mole) |
|---|---|---|
| Water | 0.1 | 18 |
| Glycerin | 99.9 | 92 |

TABLE 8

Fructose Composition

| | wt % | M.W. (g/mole) |
|---|---|---|
| Water | 0.5 | 18 |
| Fructose | 99.5 | 180 |

TABLE 9

Honey Composition

| | wt % | M.W. (g/mole) |
|---|---|---|
| Water | 17.1 | 18 |
| Sucrose | 0.9 | 342 |
| Glucose | 35.8 | 180 |
| Fructose | 40.9 | 180 |
| Maltose | 1.4 | 342 |
| Galactose | 3.1 | 180 |
| Protein | 0.3 | 49,000 |

TABLE 9-continued

Honey Composition

| | wt % | M.W. (g/mole) |
|---|---|---|
| Ash | 0.2 | various |
| Fiber | 0.2 | unknown |

TABLE 10

Milk Permeate Composition

| | wt % | M.W. (g/mole) |
|---|---|---|
| Water | 1.5 | 18 |
| Lactose | 85.0 | 342 |
| Protein | 3.2 | various |
| Ash | 9.3 | various |

TABLE 11

Titratable Acidity Values for High Solids Yogurt at a pH of 4.5 and Made from a Yogurt Precursor with Varying Concentrations of Milk Solids

| | Traditional Yogurt | Greek Yogurt |
|---|---|---|
| 17 wt % Milk Solids | 1.50 | 1.70 |
| 21 wt % Milk Solids | 1.71 | 1.89 |
| 25 wt % Milk Solids | 1.80 | 2.12 |
| 27 wt % Milk Solids | 1.90 | — |

Figure 30:
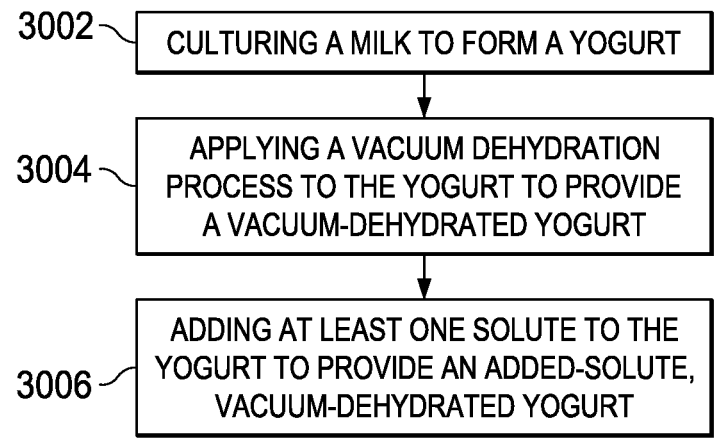
FIG. 30 is a schematic flow chart illustrating a method for making a food product that comprises a yogurt.

One embodiment of the invention will now be described with reference to FIG. 30, which is a schematic flow chart illustrating a method for making a food product that comprises a yogurt. As illustrated, first, a culturing step 3002 comprises culturing a milk to form the yogurt comprising cultured milk. In some embodiments, the milk used to make the yogurt comprises about 17 to about 30% milk solids, non-fat by weight, and, for example, can be used to make a traditional (as opposed to Greek) high solids yogurt. Further, in some embodiments the milk comprises a solute content equal to about 12-21% (e.g., for traditional yogurt), 14-19%, 16-17%, 4-12% (e.g., for Greek yogurt), 6-10%, or 5-9% by weight; equal to greater than about 4, 5, 6, 7, 8, 9, 10, 11, 12, 13, 14, 15, 16, 17, 18, 19, or 20% by weight; and/or equal to less than about 5, 6, 7, 8, 9, 10, 11, 12, 13, 14, 15, 16, 17, 18, 19, 20, or 21% by weight, as applicable. Additionally, in some embodiments, the milk further comprises lactose, and the method further comprises adding lactase to hydrolyze the lactose. Examples of adding lactase to hydrolyze lactose are described herein.

Figure 21:
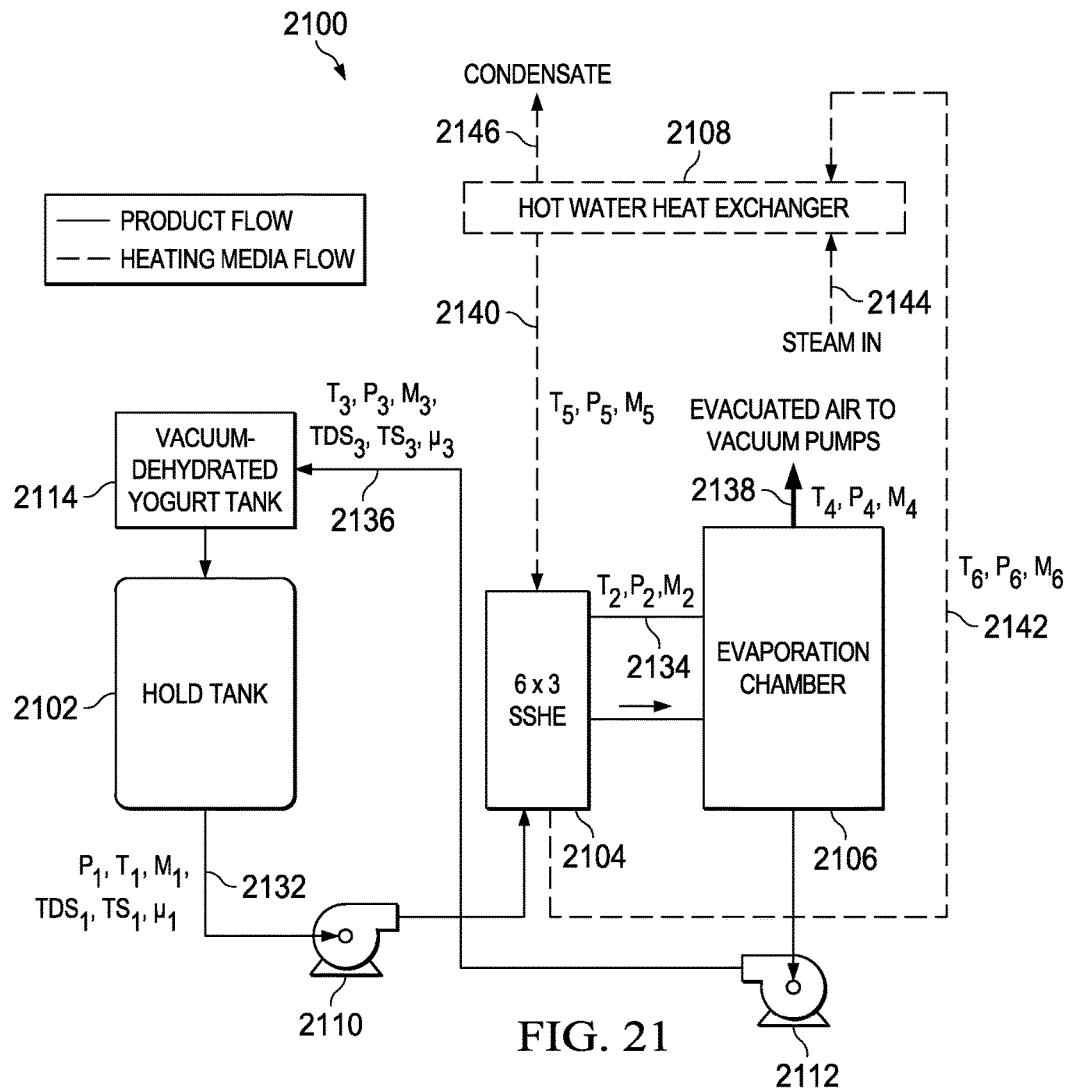
FIG. 21 is a schematic process flow diagram illustrating a method of vacuum-dehydration using a Convap process with a falling-film tubular evaporator.
Figure 22:
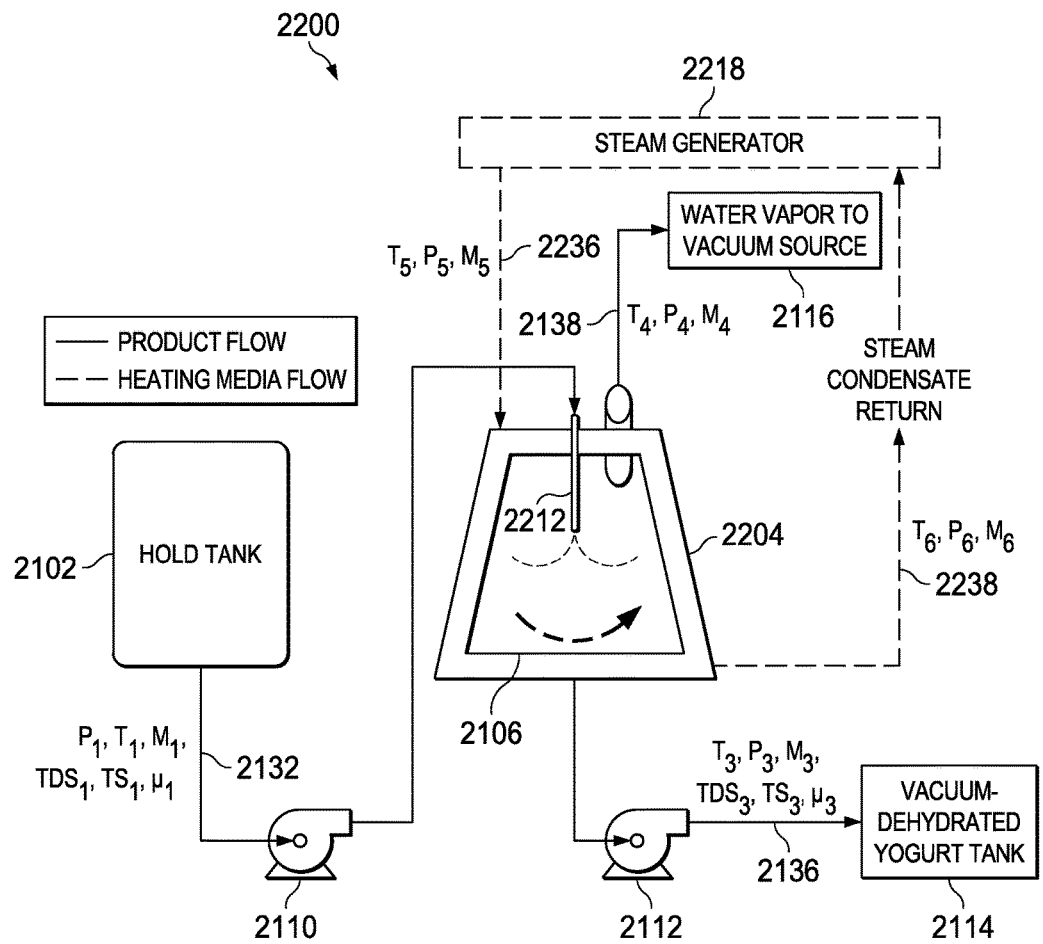
FIG. 22 is a schematic process flow diagram illustrating a method of vacuum-dehydration using a centrifugal evaporator.
Figure 23:
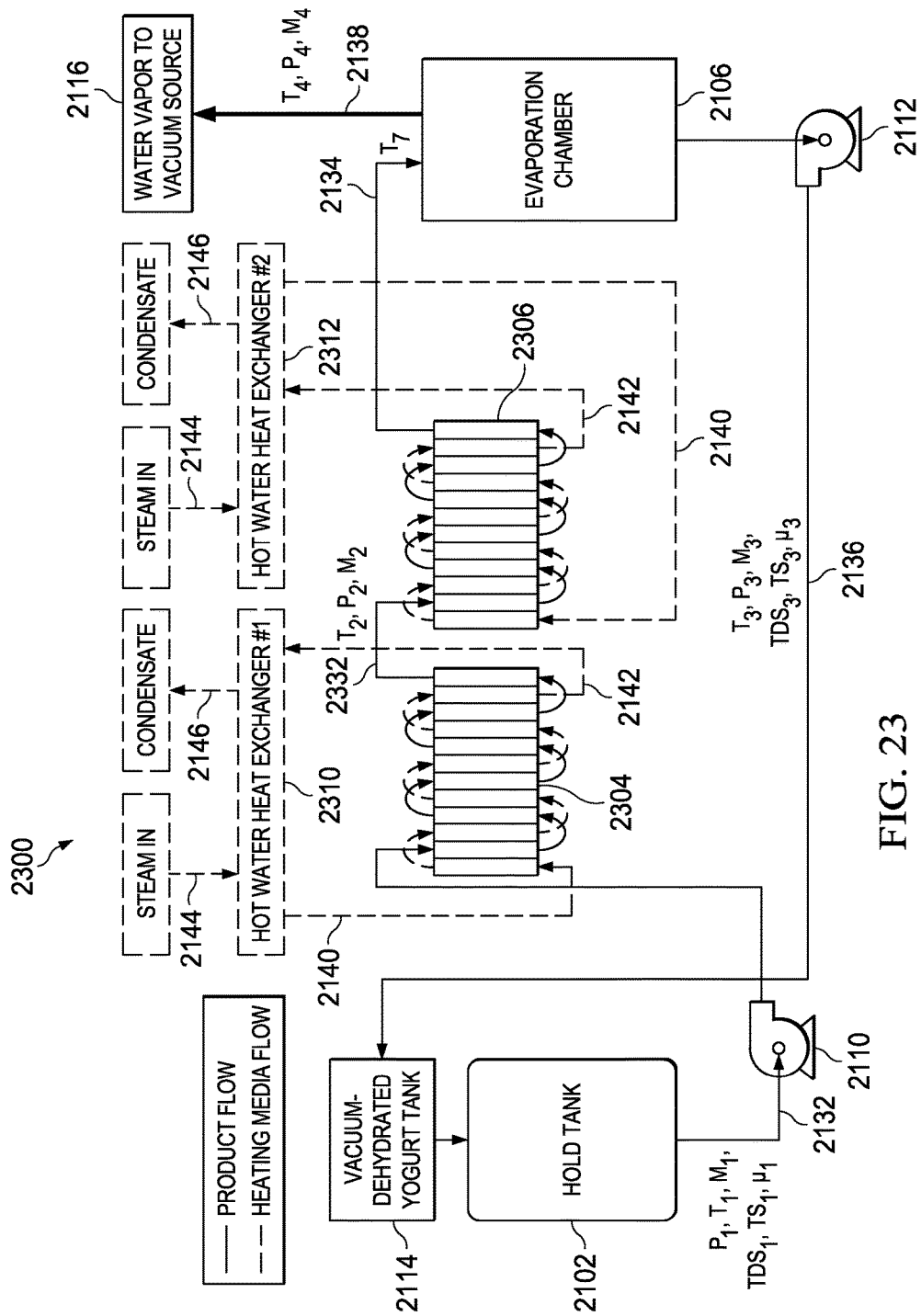
FIG. 23 is a schematic process flow diagram illustrating a method of vacuum-dehydration using a rising-and-falling-film plate evaporator.
Figure 24:
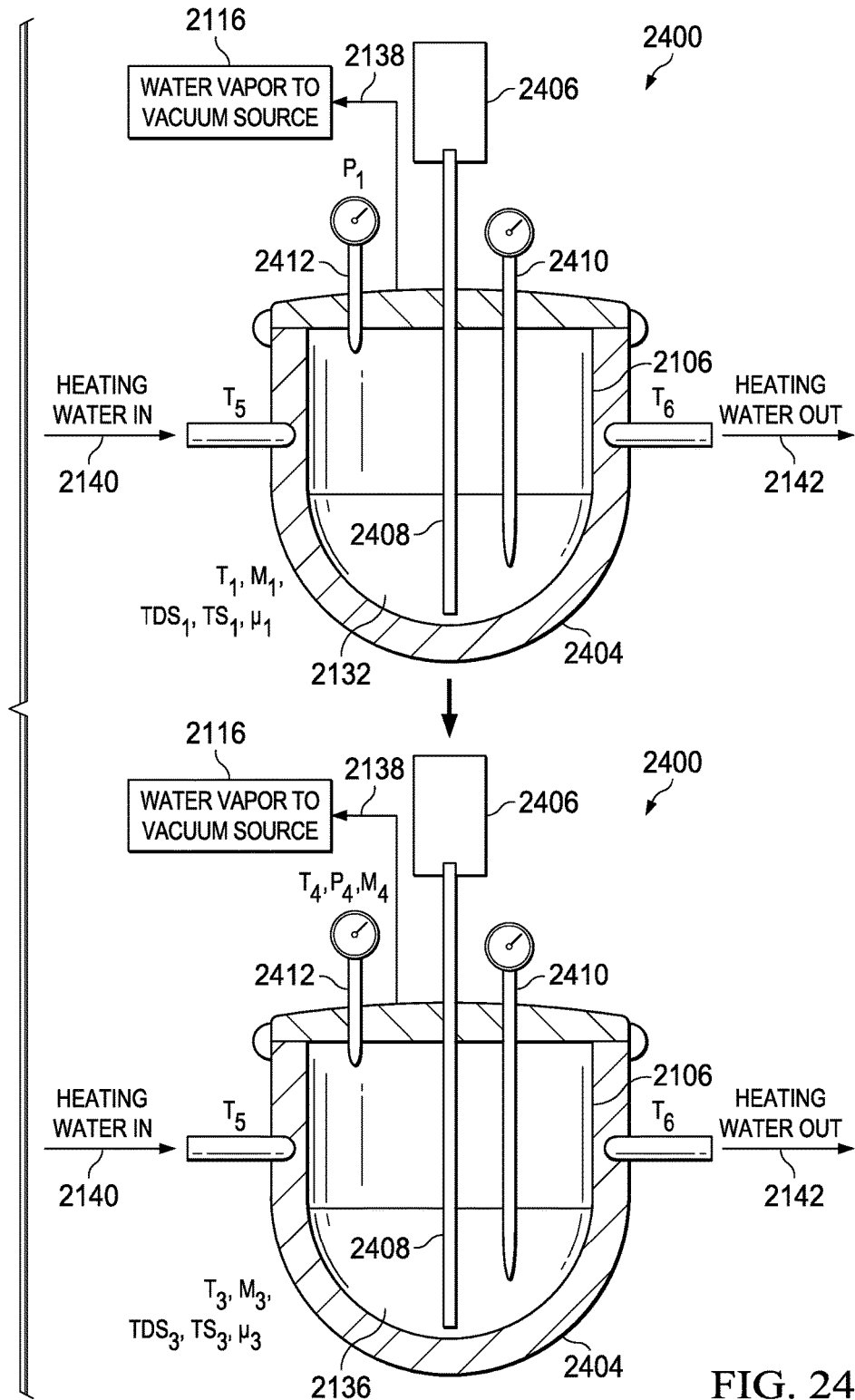
FIG. 24 is a schematic process flow diagram illustrating a method of vacuum-dehydration using a kettle evaporator.

Second, an optional vacuum dehydrating step comprises applying a vacuum dehydration process to the yogurt to provide a vacuum-dehydrated yogurt 2136. In some embodiments, the vacuum dehydration process is selected from the group consisting of thin-film evaporation under vacuum, falling-film evaporation under vacuum, scraped-surface evaporation under vacuum, and any combination thereof. Furthermore, in some embodiments, the vacuum dehydration process comprises evaporation using at least one effect or evaporator selected from the group consisting of a wiped-film evaporator, a scraped-surface evaporator, a thin-film evaporator, a falling-and-rising-film plate evaporator (e.g., as illustrated in FIG. 23), a falling-film plate evaporator, a rising-film plate evaporator, a falling-and-rising-film tubular evaporator, a falling-film tubular evaporator (e.g., as illustrated in FIG. 21), a rising-film tubular evaporator, a centrifugal evaporator (e.g., as illustrated in FIG. 22), a vacuum kettle (e.g., as illustrated in FIG. 24), an agitated vacuum kettle, and any combination thereof.

Third, an optional solute-adding step 3006 comprises adding at least one solute to the yogurt to provide an added-solute, vacuum-dehydrated yogurt 2136. Examples of the at least one solute are described herein and the at least one solute can be added individually or in any combination.

Figure 31:
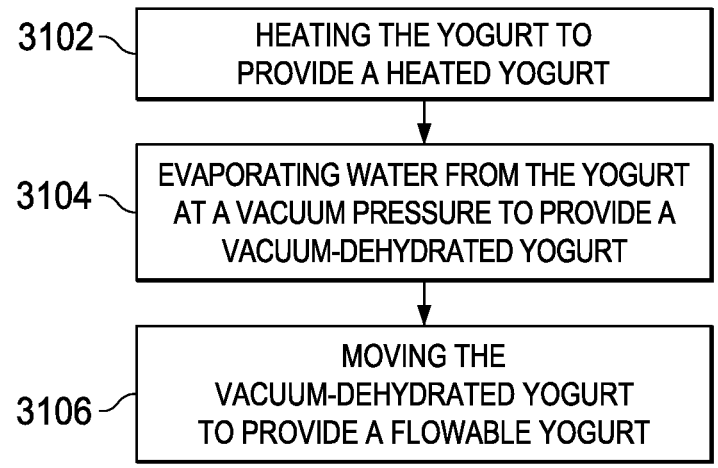
FIG. 31 is a schematic flow chart illustrating a method for a vacuum-dehydration process.

One embodiment of the invention will now be described with reference to FIG. 31, which illustrates substeps for a vacuum-dehydration step 3004. For example, in some embodiments the vacuum-dehydration step 3004 comprises at least one, some combination of, or all of the following substeps.

First, an optional yogurt-heating step 3102 comprises heating the yogurt to provide a heated yogurt 2134. For example, heating can be accomplished as a result of a temperature differential between the yogurt and a heater, the overall heat transfer rate of the heater, and the surface area of the heater in contact with the yogurt. In some embodiments, the heating step comprises heating the yogurt to provide less than an energy input or power input that would denature milk proteins. For example, in some embodiments, no more than 1, 5, 10, 15, 20, 30, 40, 50, 60 wt. % of the milk proteins are denatured.

Denaturation of proteins can lead to undesirable product characteristics. For example, denaturation of protein leads to protein aggregation, cross-linking, and precipitation. These interactions can cause graininess, precipitation, phase separation, and very high viscosity in the finished products.

Denaturation of proteins can depend, for example, on total energy input to the proteins, the rate of energy input, the time over which the energy input occurs, and the temperature to which the proteins are heated. For example, at some temperatures below a threshold denaturation temperature, no appreciable denaturation occurs. However, in some embodiments, denaturation can occur at about 150° F. for milk proteins (e.g., at reduced pH as in yogurt). Moreover, at about 150° F., denaturation takes longer than it takes at about 200° F. In some embodiments, the yogurt is heated to no more than about 185° F., 180° F., 175° F., 170° F., 165° F., or 160° F. for no more than about 30 seconds, 20 seconds, 15 seconds, 10 seconds, 5 seconds, 4 seconds, 3 seconds, 2 seconds, or 1 second to avoid denaturing at least some or all milk proteins. Additionally, in some embodiments, the temperature of the yogurt is limited because it is the boiling point of water in the yogurt at the pressure (e.g., vacuum pressure) of the yogurt.

In some embodiments the boiling point of a yogurt (without additional solutes and before dehydration) is equal to about the boiling point of pure water, although more exact values can be calculated using knowledge of how colligative properties affect boiling point for water-based solutions at a given pressure. For reference, the Table below provides the boiling point temperatures of pure water at various pressures.

TABLE 12

Pressure Versus Boiling Point Temperatures for Pure Water

| Vacuum (Inches Hg) | Atmospheres | PSIA (Lbs./int) | Boiling Point (° F.) |
|---|---|---|---|
| 29 | 0.03 | 0.45 | 76.4 |
| 28 | 0.06 | 0.94 | 99.6 |
| 27 | 0.10 | 1.43 | 114.0 |
| 25 | 0.16 | 2.42 | 133.2 |
| 24 | 0.20 | 2.91 | 140.2 |
| 23 | 0.23 | 3.40 | 146.4 |
| 22 | 0.26 | 3.89 | 151.8 |
| 21 | 0.30 | 4.38 | 156.6 |
| 20.5 | 0.31 | 4.63 | 159.0 |
| 20 | 0.33 | 4.87 | 161.1 |
| 0 | 1.00 | 14.70 | 212.0 |

As can be seen, as can be seen for pure water a significant level of vacuum is required during evaporation to keep the boiling point below the 160° F. In some embodiments, yogurt requires the same or more vacuum as pure water because colligative properties increase the boiling point of the yogurt beyond that of pure water. In some embodiments, an evaporator is used that can handle the physical requirements of the yogurt, provide the necessary low pressure, and handle and/or convey yogurt with elevated viscosities at desired total solids, dissolved solids, and/or milk solids, non-fat contents. Examples of evaporators that are used in some embodiments include falling and rising film plate-type and tubular-type evaporators, wiped-film evaporators, thin-film evaporators, centrifugal evaporators, among others.

With reference again to FIG. 31, a second, optional water-evaporating step 3104 comprises evaporating water from the yogurt at a vacuum pressure to provide a vacuum-dehydrated yogurt 2136. In some embodiments, the yogurt is at a vacuum pressure of at least 20, 21, 22, 23, 24, 25, 26, 27, 28, 29 inches Mercury (e.g., "in. Hg", or "inches Hg"). In some embodiments, the yogurt is at a vacuum pressure of up to full vacuum (e.g., 29.92 in. Hg).

Third, an optional yogurt-moving step 3106 comprises moving the vacuum-dehydrated yogurt 2136 (e.g., to provide a flowable yogurt). For example, the yogurt can be continuously or intermittently moving. The yogurt can also move by gravity, by mechanical intervention or any combination thereof. Further, some embodiments comprise moving the yogurt during heating and/or moving the yogurt during evaporation (e.g., by using a wiped-film evaporator).

In some embodiments, the vacuum-dehydration process comprises heating the yogurt before the yogurt moves to an evaporation chamber 2106. For example, in some embodiments, heating (e.g., in a heat exchanger) occurs before evaporation (e.g., in an evaporation chamber 2106). An example is a Convap evaporation process.

Furthermore, in some embodiments the vacuum-dehydration process occurs (e.g., completely, significantly, or at least partially) in an evaporation chamber 2106. For example, in some embodiments, heating and evaporation take place simultaneously. As an illustration, in some embodiments, heating and evaporation overlap, begin at about the same time, and/or end at about the same time.

In some embodiments, the vacuum-dehydrated yogurt 2136 (e.g., exiting an evaporation chamber 2106 in the vacuum dehydration process) has a milk solids, non-fat concentration of at least and/or no more than a concentration or concentrations selected from the group consisting of about 4, 5, 6, 7, 8, 9, 10, 11, 12, 13, 14, 15, 16, 17, 18, 19, 20, 21, 22, 23, 24, 25, 26, 27, 28, 29, 30 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, and 71 wt. %, as applicable. For example, in some embodiments, the vacuum-dehydrated yogurt 2136 has a milk solids, non-fat concentration of at least 21 wt. % and no more about 50 wt. % (e.g., between about 21-50 wt. %). As another example, in some embodiments, the vacuum-dehydrated yogurt has a milk solids, non-fat concentration of at least 25 wt. % As another example, in some embodiments, the yogurt has a milk-solids, non-fat concentration of about 21-61 wt. %. In some embodiments, the vacuum-dehydrated yogurt 2136 has a solute content of at least and/or no more than about 2, 3, 4, 5, 6, 7, 8, 9, 10, 11, 12, 13, 14, 15, 16, 17, 18, 19, 20, 21, 22, 23, 24, 25, 26, 27, 28, 29, 30 31, 32, 33, 34, 35, 36, 37, 38, 39, 40, 41, 42, 43, 44, 45, 46, 47, 48, 49, and 50 wt. %, as applicable. For example, in some embodiments, the vacuum-dehydrated yogurt 2136 has a solute content of at least 15 wt. % and no more about 35 wt. % (e.g., between about 15-35 wt. %). As another example, in some embodiments, the yogurt has a solute concentration of about 4-46 wt. %

Providing higher milk solids and/or solute content after culturing a yogurt can be useful, for example, to avoid increased solute content before or during culturing, because higher solute contents during culturing, for example, of at least about 11, 12, 13, 14, 15, 16, 17, or 18 wt. % can significantly and negatively impact culturing. For example, culturing at high solute contents can inhibit yogurt cultures and/or reduce their activity. Furthermore, the culturing can result in significantly slower yogurt formation. Additionally, obtaining a desired degree of culturing and/or a desired pH can necessitate extending the culturing time.

Although, providing higher milk solids and/or solute content can provide advantages, it can also result in a more viscous yogurt that is more difficult to convey. For example, in some embodiments, vacuum-dehydrated yogurt 2136 can set-up and/or become difficult or impossible to move under the force of gravity or feed to a pump.

Accordingly, in some embodiments, the dehydrated yogurt exiting the evaporation chamber 2106 can be agitated. For example, agitation can be accomplished with a mechanical agitator. Examples of mechanical agitators include a mixer and a screw conveyor. In one embodiment a screw conveyor can be used to move yogurt to a pump inlet and to prevent cavitation while feeding the yogurt to the pump.

In some embodiments, the yogurt (e.g., vacuum-dehydrated yogurt 2136) is shear-thinning and agitating the yogurt decreases the viscosity of the yogurt. Additionally, in some embodiment, vacuum-dehydration processes that do not move (e.g., agitate) the vacuum-dehydrated yogurt 2136 are limited to about 40 wt. % total solids (e.g., milk solids) content by process considerations (e.g., inability to pump the vacuum-dehydrated yogurt 2136). However, in some embodiments, greater than about 40 wt. % total solids (e.g., 40-60 wt. % total solids, or any range or value therein) content can be achieved in the yogurt when the yogurt is moved (e.g., agitated) after vacuum-dehydration.

Accordingly, some embodiments comprise heating the yogurt in the evaporation chamber 2106. Examples can include a wiped-film evaporator, falling- and/or rising-film evaporator, centrifugal evaporator, or kettle evaporator. Meanwhile, in some embodiments, heating the yogurt does not occur in the evaporation chamber 2106. An example, is a Convap evaporation process.

In some embodiments, the vacuum dehydration process provides removed water at a water removal flow rate of up to 3,000 lbs/hr per effect (e.g., per evaporator) and the vacuum-dehydrated yogurt 2136 at a flow rate corresponding to the water removal rate and a selected concentration level. In some embodiments, the vacuum dehydration process provides removed water at a water removal flow rate of at least 1,000, 2,000, or 3,000 lbs/hr per effect (e.g., per evaporator). For example, in some embodiments it is useful to have a vacuum dehydration process that is scalable and/or capable of production at commercial useful rates. Accordingly, it can be useful for the vacuum dehydration process to be capable of economically supplying enough product to meet market demand in a state (e.g., California, Florida, New York, Texas, etc.), region (New England, Northeast, Gulf of Mexico States, West Coast, Plains, etc.), or country (e.g., the United States, United Kingdom, Colombia, Mexico, etc.).

In some embodiments, the yogurt is provided with a smooth texture, for example, even though the yogurt is dehydrated (e.g., vacuum-dehydrated). For example, if the yogurt were completely dehydrated to a powder, it would be recognized as not smooth. However, when processed under certain conditions (e.g., higher temperatures, or lower temperatures for longer periods of time) even non-powdered yogurts can lose their smooth texture. For example, in some embodiments, the invention can provide a relatively smooth yogurt (compared to non-vacuum dehydrated yogurt) with a total solids content of 71 wt. %.

In some embodiments, by using a high solids milk to provide a high solids yogurt, adding lactase to hydrolyze lactose in a milk, adding solutes to a yogurt, dehydrating a yogurt (e.g., vacuum-dehydrating a yogurt), or any combination thereof, as applicable, the yogurt is provided with a water activity equal to no more than and/or a water activity equal to at least a water activity or water activities selected from the group of water activities consisting of about 0.98, 0.97, 0.96, 0.95, 0.94, 0.93, 0.92, 0.91 0.90, 0.89, 0.88, 0.87, 0.86, 0.85, 0.84, 0.83, 0.82, 0.81, 0.80, 0.79, 0.78, 0.76, 0.75, 0.74, 0.73, 0.72, 0.71, 0.70, 0.69, 0.68, 0.67, 0.66, 0.65, 0.64, 0.63, 0.62, 0.61, 0.60, 0.59, 0.58, 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31, 0.30, 0.29, 0.28, 0.27, 0.26, 0.25, 0.24, 0.23, 0.22, 0.21, 0.20.

For example, the water activity can be greater than about 0.20 and less than about 0.98 to provide a yogurt with a water activity equal to about 0.20 to about 0.90. As another example, in some embodiments, the at least one solute is added to the yogurt to reduce a water activity of the yogurt to about 0.40 to about 0.85. For example, glycerin is a solute that is miscible in water and can be added to a yogurt to provide lower water activities.

Furthermore, in some embodiments, the yogurt has a pH less than or equal to about 4.6. Examples of providing a yogurt with a selected pH are discussed herein.

Moreover, in some embodiments a food product comprising the yogurt is microbiologically stable. For example, in some embodiments, the food product comprises an additional component selected from the group consisting of starch-based components and protein-based components, yet the food product is still microbiologically stable. Additionally, in some embodiments, the food product does not comprise a moisture barrier between the additional component and the yogurt. Nonetheless, the food product is microbiologically stable.

In one embodiment, a food product comprises a yogurt, and the yogurt comprises a cultured milk made from a milk comprising about 17-30% milk solids, non-fat. In one embodiment, the cultured milk comprises milk solids, non-fat, from the milk and derivative solids at a combined concentration of 17-30 wt. %. Furthermore, in one embodiment, the derivative solids are selected from the group consisting of glucose derived from the milk solids from the milk, galactose derived from the milk solids from the milk, and lactic acid derived from the milk solids from the milk.

Moreover, in some embodiments, the yogurt (e.g., dehydrated yogurt and/or solute-added yogurt) comprises a water activity equal to about 0.20 to about 0.98. As another example, in some embodiments, the yogurt has a water activity equal to no more than about 0.86, 0.85, 0.83, 0.65, or 0.60. For example, in some embodiments, the water activity provides for more shelf-life and/or microbiological stability. Further, in some embodiments the yogurt comprises a water activity greater than 0.2, 0.4, 0.5, 0.55, 0.60, 0.65, 0.70, 0.75, or 0.80 for a texture, flavor, and viscosity that more closely resemble traditional yogurt. For example, higher water activities are associated with a lower solute content. Accordingly, in light of this disclosure, a skilled person will recognize that it can be desirable to provide a yogurt product within a range of water activities for a particular application.

In some embodiments, the yogurt comprises an added solute (e.g., glycerin), and the concentration of added solute is at least and/or no more than a concentration or concentrations of about 2, 3, 4, 5, 6, 7, 8, 9, 10, 11, 12, 13, 14, 15, 16, 17, 18, 19, 20, 21, 22, 23, 24, 25, 26, 27, 28, 29, 30 31, 32, 33, 34, 35, 36, 37, 38, 39, 40, 41, 42, 43, 44, 45, 46, 47, 48, 49, 50, 51, 52, 53, 54, 55, 56, 57, 58, 59, and 60 wt. %, as applicable. For example, in one embodiment at least one solute is added to a yogurt until the combined composition of yogurt and the at least one solute comprises at least 25 wt. % and no more than about 50 wt. % added solute content. Although, in some embodiments, solutes (e.g., glycerin) can be added essentially without limitation due to solubility issues. For example, in some embodiments a solute can be added in a concentration from 2-90 wt. % or any range or value therein. However, in some embodiments, solutes are only added up to about 60 wt. % to avoid losing desirable characteristics associated with yogurt.

In some embodiments, a "yogurt" can be provided to pertinent regulations (e.g., U.S. FDA regulations as provided in the Code of Federal Regulations). For example some definitions of "yogurt" do not permit the yogurt to comprise added humectants. Accordingly, in some embodiments, a yogurt is a cultured milk prior to any dehydration or added solutes. Accordingly, the yogurt can have a relatively high water activity of about 0.98. Furthermore, a "dehydrated yogurt" can be such a yogurt that has been dehydrated (e.g., using vacuum-dehydration). In some embodiments, the dehydrated yogurt does not comprise any added solutes and has a water activity of about 0.83-0.98 or any value or range therein. Additionally, in some embodiments, the yogurt or dehydrated yogurt can comprise added solutes to provide a water activity of about 0.20-0.98 or any value or range therein. In some embodiments, a "food product" or "yogurt product" comprises a "yogurt" or a "dehydrated yogurt." The yogurt and the dehydrated yogurt can be provided with or without added solutes.

In some embodiments, the yogurt comprises a preservative (e.g., potassium sorbate) which can also be a solute.

In some embodiments, the yogurt is flowable. For example, in some embodiments, the yogurt is free-flowing under gravity, or free-flowing when agitated. In some embodiments, the yogurt is free-flowing under gravity up to a measured viscosity of about 40,000 cPs. In some embodiments, yogurt at a measured viscosity of at least 40,000-60,000 cPs uses shear-thinning (e.g., agitation) in the process equipment to provide a flowable yogurt. For purposes of the viscosities mentioned in this paragraph, the measured viscosity was measured using a Brookfield RVT viscosity meter after rotating a spindle in the sample for 30 seconds at 20 rpm and measuring the viscosity as disclosed herein.

In some embodiment, the yogurt is a vacuum-dehydrated yogurt 2136, and the vacuum-dehydrated yogurt 2136 has less denatured milk proteins than a non-vacuum-dehydrated yogurt 2136 that has been dehydrated at a non-vacuum pressure, at a higher temperature than the vacuum-dehydrated yogurt 2136, and for the same time as the vacuum-dehydrated yogurt 2136, and where the vacuum dehydrated, yogurt is otherwise made by an equivalent process as the vacuum-dehydrated yogurt 2136. Furthermore, in some embodiments, the vacuum-dehydrated yogurt 2136 can have less denatured milk proteins, less grittiness, less graininess, and/or less cooked flavor when compared to the non-vacuum-dehydrated yogurt 2136.

Moreover, in some embodiments, the yogurt comprises milk proteins (e.g., from the milk, from any milk-derived ingredients allowable in yogurt per applicable regulations such as the CFR, or from any source) and no more than about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt. % of the milk proteins are denatured. In one embodiment, essentially no milk proteins are denatured (e.g., due to dehydration).

In some embodiments, the food product comprises a yogurt, said yogurt comprises a cultured milk made from a milk, and the yogurt has a water activity of not more than about 0.86. Additionally, in some embodiments, the cultured milk (e.g., dehydrated cultured milk, or vacuum-dehydrated cultured milk) comprises about 25-71% milk solids, non-fat by weight or a solute content of about 4-46% or 13.75-39.05% by weight, wherein the solutes are milk solids selected from the group consisting of milk solids from the milk, glucose derived from the milk solids from the milk, galactose derived from the milk solids from the milk, lactic acid derived from the milk solids from the milk, and lactase. In some embodiments, the yogurt has not been vacuum-dehydrated and does not include added solutes and the yogurt has a milk solids, non-fat content of about 21-27% by weight, or any range or value therein. In some embodiments, the yogurt has been vacuum-dehydrated but does not include added solutes and the yogurt has a milk solids, non-fat content of about 25-71% by weight, or any range or value therein. In some embodiments, the yogurt has not been vacuum-dehydrated and does not included added solutes and the yogurt has a solute content of about 11-18 wt. %, or any value or range therein. In some embodiments, the yogurt has been dehydrated (e.g., vacuum-dehydrated) but does not include added solutes and the dehydrated yogurt has a solute content of about 4-46 wt. %, or any value or range therein.

One embodiment of the invention will now be described with reference to FIG. 21, which illustrates a method for vacuum-dehydration comprising a Convap process 2100. The Convap system was manufactured by Alfa Laval, Inc. of Newburyport, Mass., US. In some embodiments, and as illustrated, the Convap process comprises a falling-film tubular evaporator. As illustrated, the Convap system is an integrated unit that combines a Contherm scraped-surface heat exchanger for preheating of yogurt, with a falling-film tubular evaporator that concentrates the yogurt under vacuum.

As illustrated, the Convap system comprises several steps. First, yogurt is fed to a tank (e.g. hold tank 2102). Second, a yogurt feed stream 2132 from the tank is fed to a feed pump 2110. Third, the yogurt flows from the feed pump 2110 to the lower end of a heat exchanger (e.g. scraped surface heat exchanger 2104) to provide heated yogurt 2134. In the illustrated example, a heating medium (e.g., heating fluid) flows in the annular space between a heat transfer wall and an insulated jacket. As a result of heat transfer to the yogurt in the heat exchanger water vapor evaporates from the yogurt. Mechanical agitation (e.g., provided by revolving blades) of the yogurt can be used to create convection conditions for efficient heat transfer. Furthermore, the revolving blades can also be scraping blades that continuously remove the yogurt from the cylinder-shaped inner surface of the heat transfer wall of the heat exchanger. Moreover, a Convap rotor, driven by a motor on the upper end of the unit, can rotate the revolving blades to spin heavier liquid yogurt droplets toward the inner surface of the heat transfer wall. For example, this can provide a continuous re-wetting of the heat transfer surface, decrease flash, prevent protein denaturation, and prevent product burn-on. Fourth, the heated yogurt 2134 moves (e.g., flows) from the heat exchanger to an evaporation chamber 2106 where water vapor can separate from the yogurt to provide a vacuum-dehydrated yogurt 2136 and water vapor. As illustrated, no heating occurs in the evaporation chamber 2106 and the only enthalpy available for evaporation is the sensible heat gained by the yogurt in the exchanger. In some embodiments, the sensible heat is used to vaporize water in the yogurt as the heated yogurt decreases in pressure and temperature from the heat transfer wall in the exchanger to the evaporation chamber. For example in the evaporation chamber, the yogurt is at a specified vacuum pressure and boiling point temperature, with the boiling point temperature of the yogurt being about equal to the boiling point of water at the same pressure. Fifth, the vacuum-dehydrated yogurt 2136 moves to a concentrate pump 2112. Sixth, the vacuum-dehydrated yogurt 2136 moves from the concentrate pump 2112 to a vacuum-dehydrated-yogurt tank 2114.

In the illustrated example, the yogurt in the heat exchanger and evaporation chamber is under vacuum and vaporization of water vapor from the yogurt can occur in the scraped-surface heat exchanger. Furthermore, as illustrated, the heat exchanger is in fluid communication with the evaporation chamber 2106 through a vapor dome.

As illustrated, the water vapor 2138 (e.g., from the evaporation chamber 2106) flows to a vacuum source 2116 (e.g., vacuum pumps). For example, in some embodiments, evacuated air from the evaporation chamber 2106 comprises the water vapor 2138 from the yogurt, and the evacuated air flows to the vacuum source 2116.

Furthermore, as illustrated, the scraped surface heat exchanger 2104 is heated by a heating fluid (e.g., hot water). As illustrated, regenerated hot water 2140 flows from a hot water heat exchanger 2108 to the scraped surface heat exchanger 2104 to heat the yogurt, thereby providing heated yogurt 2134 and spent hot water 2142. The spent hot water 2142 flows to a hot water heat exchanger 2108 to be reheated and provide regenerated hot water 2140.

In turn, feed steam 2144 is fed to the hot water heat exchanger 2108 to heat the spent hot water 2142, thereby providing regenerated hot water 2140 and steam condensate 2146.

Several process variables were measured during experiments using a Convap process for vacuum-dehydration of yogurt. The measured process variables are summarized in the following Tables. As can be seen in the tables, both traditional and Greek yogurts were dehydrated in several trials. Furthermore, each trial involved dehydrating the first listed yogurt (e.g., Traditional) to a selected total solids content. For example, Trial #1 tested the dehydration of a Traditional Yogurt (CSM+Water) Run 1 made from a yogurt base (e.g., milk) that was, in turn, made from concentrated skim milk (CSM) and water. After culturing, the Traditional Yogurt had a total solids content of about 26.84 wt. %.

Trial #1 included two dehydration runs. In Run 1 a Convap vacuum-dehydration process (e.g., as illustrated in FIG. 21) was used to dehydrate the Traditional Yogurt (CSM+Water) Run 1 to a total solids content of about 42.49 wt. % as measured and included in the first column of analytical data. This total solids included the measured amounts of fat, protein, and ash by wt. %. Carbohydrate content in wt. % is calculated as the total solids minus the fat, protein, and ash content. The carbohydrate to protein ratio ("CHO:Pro") is calculated by dividing the calculated carbohydrate content by the protein content. In some embodiments, a Greek Yogurt has a carbohydrate to protein ratio of about 0.24-1.30 (e.g., 0.24-0.90) or any range or value therein. For example, in some embodiments, a Greek Yogurt has a carbohydrate to protein ratio of about 0.59-0.82, or 0.69-0.72. In some embodiments, a traditional Yogurt has a carbohydrate to protein ratio of about 1.0-1.8 (e.g., 1.40-1.80) or any range or value therein. For example, in some embodiments, a traditional yogurt has a carbohydrate to protein ratio of about 1.45-1.70.

With reference to FIG. 21, the Figure includes several process variables whose measurements are provided in the tables below. For example, for the yogurt fed to the feed pump 2110, the Tables include the Pressure (e.g., $P_1$) as vacuum in inches of Mercury, Temperature (e.g., $T_1$) in ° F., mass flow rate (e.g. $m_1$) in pounds per hour, Total Dissolved Solids (e.g., $TDS_1$) in wt. %, Total Solids (e.g., $TS_1$) in wt. %, and viscosity ($\mu_1$) in Centipoise. This stream corresponds to the Traditional yogurt (CSM+Water) Run 1.

The yogurt is dehydrated to about 42.49 wt. % total solids in Convap Traditional Yogurt Run 1, which can be seen with reference to the vacuum-dehydrated yogurt 2136 stream on FIG. 21. The illustrated process variables include the Pressure (e.g., $P_3$) as vacuum in inches of Mercury, Temperature (e.g., $T_3$) in ° F., mass flow rate (e.g. $m_3$) in pounds per hour, Total Dissolved Solids (e.g., $TDS_3$) in wt. %, Total Solids (e.g., $TS_3$) in wt. %, and viscosity ($\mu_3$) in Centipoise. The pertinent table does not show the feed stream values for Convap Traditional Yogurt Run 1 because they correspond to the Traditional Yogurt (CSM+Water) Run 1 values, except as noted in the Table. For purposes of the Tables, the Total dissolved solids is estimated as the carbohydrate content of the yogurt, although, some milk proteins are also soluble as described herein.

Similarly, the Traditional yogurt (CSM+Water) Run 1 is dehydrated to about 57.52 wt. % total solids to provide Convap Traditional Yogurt Run 2. The pertinent table does not show the feed stream values for Convap Traditional Yogurt Run 2 because they correspond to the Traditional Yogurt (CSM+Water) Run 1 values, except as noted in the Table.

As can be seen, some measured variables appear in FIG. 21, but are omitted in the pertinent tables because, for example, they were not measured or were inapplicable.

Similar data is provided for the other trials and runs using the Convap vacuum-dehydration process 2100.

Also, as used in the Tables, UF is an abbreviation for ultra-filtered milk. For example, ultra-filtered milk can be produced by filtering milk to concentrate it and remove some of the components in native milk (e.g., some of the water, lactose, and/or minerals). NFDM is an abbreviation for Non Fat Dry Milk, which is nonfat liquid milk that is concentrated until it is a powder. For example, the process can reduce the moisture content from about 91 wt. % in fluid nonfat milk to about 4 wt. % moisture in the NFDM.

TABLE 13

Dehydration via Alfa Laval CONVAP

| Trial Name | Trial date | Total Solids Vac. Oven (%) | Fat (%) | Protein (%) | Ash (%) | Carbs by difference | CHO:Pro |
|---|---|---|---|---|---|---|---|
| Traditional Yogurt | | | | | | | |
| Trial #1 | Traditional Yogurt (CSM + Water) Run 1 | 26.84%* | 0.12% | 9.28% | 2.09% | 15.35% | 1.65 |
| | Convap Traditional Yogurt Run 1 | 42.49% | 0.18% | 14.76% | 3.42% | 24.13% | 1.63 |
| | Convap Traditional Yogurt Run 2 | 57.52% | 0.07% | 19.61% | 4.54% | 33.30% | 1.70 |
| Trial #7 | Traditional Yogurt (CSM + Water) Run 2 | 27.23% | 0.19% | 9.73% | 2.25% | 15.06% | 1.55 |
| | Convap Traditional Yogurt Run 3 Sample 5 | 60.67% | 0.47% | 21.94% | 4.80% | 33.46% | 1.53 |
| Greek Yogurt | | | | | | | |
| Trial #6a | Greek Yogurt (UF + NFDM) Run 1 | 24.04% | 0.32% | 12.69% | 1.96% | 9.07% | 0.71 |
| | Convap Greek Yogurt Run 1 | 47.20% | — | — | 3.64% | — | — |
| Trial #6b | Greek Yogurt (UF + NFDM) Run 1 | 24.04% | 0.32% | 12.69% | 1.96% | 9.07% | 0.71 |
| | Convap Greek Yogurt Run 2 | 48.98% | — | — | 3.90% | — | — |

*Total Solids via METTLER HR 83 Halogen = 28.55 wt. %

TABLE 14

| Trial Name | Trial date | P1 (in Hg) | T1 (° F.) | TS1 (%) | TDS1 (%) | μ1 (cps) | m1 (lbs/hr) |
|---|---|---|---|---|---|---|---|
| Traditional Yogurt | | | | | | | |
| Trial #1 | Traditional Yogurt (CSM + Water) Run 1 | 0.0 | 38 | 26.84% | 15.35% | 16,500 | — |
| | Convap Traditional Yogurt Run 1 | 0.0 | 96 | — | — | 4,400 | 276 |
| | Convap Traditional Yogurt Run 2 | 0.0 | 120 | — | — | — | 276 |
| Trial #7 | Traditional Yogurt (CSM + Water) Run 2 | 0.0 | 52 | 27.23% | 15.06% | 4890 | — |
| | Convap Traditional Yogurt Run 3 Sample 5 | 0.0 | 110 | — | — | — | 552 |
| Greek Yogurt | | | | | | | |
| Trial #6a | Greek Yogurt (UF + NFDM) Run 1 | 0.0 | 61 | 24.04% | 9.07% | 400 | — |
| | Convap Greek Yogurt Run 1 | 0.0 | 111 | — | — | — | 552 |
| Trial #6b | Greek Yogurt (UF + NFDM) Run 1 | 0.0 | 71 | 24.04% | 9.07% | 450 | — |
| | Convap Greek Yogurt Run 2 | 0.0 | 110 | — | — | — | 552 |

TABLE 15

| Trial Name | Trial date | P2 (in Hg) | T2 (° F.) | m2 (lbs/hr) |
|---|---|---|---|---|
| Traditional Yogurt | | | | |
| Trial #1 | Traditional Yogurt (CSM + Water) Run 1 | — | — | — |
| | Convap Traditional Yogurt Run 1 | 0.0 | NA | 276 |
| | Convap Traditional Yogurt Run 2 | 0.0 | NA | 276 |
| Trial #7 | Traditional Yogurt (CSM + Water) Run 2 | — | — | — |
| | Convap Traditional Yogurt Run 3 Sample 5 | 0.0 | 157 | 552 |
| Greek Yogurt | | | | |
| Trial #6a | Greek Yogurt (UF + NFDM) Run 1 | — | — | — |
| | Convap Greek Yogurt Run 1 | 0.0 | 155 | 552 |
| Trial #6b | Greek Yogurt (UF + NFDM) Run 1 | — | — | — |
| | Convap Greek Yogurt Run 2 | 0.0 | 157 | 552 |

TABLE 16

| Trial Name | Trial date | P3 (in Hg) | T3 (° F.) | TS3 (%) | TDS3 (%) | μ3 (cps) | m3 (lbs/hr) |
|---|---|---|---|---|---|---|---|
| Traditional Yogurt | | | | | | | |
| Trial #1 | Traditional Yogurt (CSM + Water) Run 1 | — | — | — | — | — | — |
| | Convap Traditional Yogurt Run 1 | 25.5 | 137 | 42.49% | 24.13% | 22,100 | — |
| | Convap Traditional Yogurt Run 2 | 27.8 | 103 | 57.52% | 33.30% | 29,200 | 256 |
| Trial #7 | Traditional Yogurt (CSM + Water) Run 2 | — | — | — | — | — | — |
| | Convap Traditional Yogurt Run 3 Sample 5 | 27.0 | 115 | 60.67% | 33.46% | 65,000 | 528 |
| Greek Yogurt | | | | | | | |
| Trial #6a | Greek Yogurt (UF + NFDM) Run 1 | — | — | — | — | — | — |
| | Convap Greek Yogurt Run 1 | 27.3 | 117 | 47.20% | — | 40,100 | 524 |
| Trial #6b | Greek Yogurt (UF + NFDM) Run 1 | — | — | — | — | — | — |
| | Convap Greek Yogurt Run 2 | 27.2 | 114 | 48.98% | — | 70,000 | 520 |

TABLE 17

| Trial Name | Trial date | P4 (in Hg) | T4 (° F.) | m4 (lbs/hr) |
|---|---|---|---|---|
| Traditional Yogurt | | | | |
| Trial #1 | Traditional Yogurt (CSM + Water) Run 1 | — | — | — |
| | Convap Traditional Yogurt Run | 125.5 | 137 | — |
| | Convap Traditional Yogurt Run 2 | — | 103 | 20 |
| Trial #7 | Traditional Yogurt (CSM + Water) Run 2 | — | — | — |
| | Convap Traditional Yogurt Run 3 Sample 5 | 27.0 | 115 | 24 |
| Greek Yogurt | | | | |
| Trial #6a | Greek Yogurt (UF + NFDM) Run 1 | — | — | — |
| | Convap Greek Yogurt Run 1 | 27.3 | 117 | 28 |
| Trial #6b | Greek Yogurt (UF + NFDM) Run 1 | — | — | — |
| | Convap Greek Yogurt Run 2 | 27.2 | 114 | 32 |

TABLE 18

| Trial Name | Trial date | P5 (in Hg) | T5 (° F.) | m5 (lbs/hr) | P6 (in Hg) | T6 (° F.) | m6 (lbs/hr) |
|---|---|---|---|---|---|---|---|
| Traditional Yogurt | | | | | | | |
| Trial #1 | Traditional Yogurt (CSM + Water) Run 1 | | | | | | |
| | Convap Traditional Yogurt Run 1 | * | 230 | NA | * | 230 | NA |
| | Convap Traditional Yogurt Run 2 | — | 185 | NA | — | NA | NA |
| Trial #7 | Traditional Yogurt (CSM + Water) Run 2 | — | — | — | — | — | — |
| | Convap Traditional Yogurt Run 3 Sample 5 | — | 164.5 | 25,000 | — | 163.1 | 25,000 |

TABLE 18-continued

| Trial Name | Trial date | P5 (in Hg) | T5 (° F.) | m5 (lbs/hr) | P6 (in Hg) | T6 (° F.) | m6 (lbs/hr) |
|---|---|---|---|---|---|---|---|
| Greek Yogurt | | | | | | | |
| Trial #6a | Greek Yogurt (UF + NFDM) Run 1 | — | — | — | — | — | — |
| | Convap Greek Yogurt Run 1 | — | 164.9 | 25,000 | — | 163.2 | 25,000 |
| Trial #6b | Greek Yogurt (UF + NFDM) Run 1 | — | — | — | — | — | — |
| | Convap Greek Yogurt Run 2 | — | 165.1 | 25,000 | — | 163.3 | 25,000 |

* Steam at 6 PSIG

One embodiment of the invention will now be described with reference to FIG. 22, which illustrates a method for vacuum-dehydration comprising a Centritherm® centrifugal evaporator process 2200. As illustrated, the evaporator is a single-effect, centrifugal evaporator that operates under vacuum and uses steam as the heating medium. As illustrated, the centrifugal evaporator process comprises several steps. First, yogurt is fed to a tank (e.g. hold tank 2102). Second, a yogurt feed stream 2132 from the tank is fed to a feed pump 2110. Third, the yogurt flows from the feed pump 2110 to a centrifugal evaporator (e.g., Centritherm® evaporator available from Flavourtech, Inc. at Griffith, New South Wales, Australia to provide a vacuum-dehydrated yogurt 2136. Fourth, the vacuum-dehydrated yogurt 2136 moves to a concentrate pump 2112. Fifth, the vacuum-dehydrated yogurt 2136 moves from the concentrate pump 2112 to a vacuum-dehydrated-yogurt tank 2114.

As illustrated the centrifugal evaporator (e.g., centrifugal, thin-film evaporator) comprises an evaporation chamber 2106, an injection nozzle 2212, and a heating mechanism (e.g., a steam chamber 2204 disposed at least partially around the evaporation chamber 2106 and/or sharing a wall with the evaporation chamber 2106). As illustrated, the yogurt flows from the feed pump 2110 to the injection nozzle 2212, which sprays the yogurt onto the evaporation chamber 2106. For example, the injection nozzle can be used to distribute the yogurt in a film over a rotating heating surface of the evaporation chamber 2106. Additionally, centrifugal force can be used to spread the product over the entire heating surface in a thin film or layer (e.g., about 1 mm, 0.5-2 mm, or no more than about 2 mm). The yogurt then flows under the force of gravity to the bottom of the evaporation chamber 2106 while water vapor is removed from the yogurt to provide a vacuum-dehydrated yogurt 2136. In some embodiments, the yogurt passes across the heating surface (e.g., from a point of initial contact with the heating surface to the bottom of the evaporation chamber) in about 1 second, about 0.5-2 seconds, or no more than about 2 seconds. In some embodiments, the vacuum-dehydrated, concentrated yogurt accumulates at the outer edge of the cone-shaped heating surface of the evaporation chamber 2106 and exits the evaporator through a stationary paring tube.

As illustrated, the evaporation chamber 2106 comprises a rotating, heated inner surface and the injection nozzle 2212 sprays the yogurt on the rotating, heated inner surface of the evaporation chamber 2106. In some embodiments, the inner surface of the evaporation chamber 2106 is heated by steam in the steam chamber 2204, which is adjacent to the inner surface. As illustrated, the heated inner surface of the evaporation chamber 2106 is the underside of a hollow rotating generally cone-shaped structure, which is positioned inside a second cone-shaped structure to provide a steam chamber 2204 between the two cone-shaped structures. Steam can flow from a conduit into the steam chamber 2204 to heat the inner surface of the evaporation chamber 2106. In some embodiments, as the steam condenses to form steam condensate, the condensate is immediately projected to the upper wall of the steam chamber 2204. Furthermore, in some embodiments, similar to the yogurt, the steam condensate exits the steam chamber through a channel and is removed from the evaporator via a paring tube.

As illustrated, the water vapor 2138 from the yogurt flows to a vacuum source 2116 (e.g., vacuum pumps). For example, the water vapor can rise through the center of the evaporation chamber and enter an exhaust pipe. In some embodiments, the exhaust pipe leads to an external condenser where the water vapor is condensed.

Furthermore, as illustrated, the heating mechanism (e.g. steam chamber 2204) is heated by a heating fluid (e.g., regenerated steam 2236). As illustrated, regenerated steam 2236 flows from a steam generator 2218 to the steam chamber 2204 to heat the yogurt, thereby providing heated yogurt 2134 and steam condensate return stream 2238. The steam condensate return stream 2238 flows to the steam generator 2218 to be reheated and provide regenerated steam 2236.

Several process variables were measured during experiments using a centrifugal evaporator process 2200. These are illustrated in the following Tables analogously to the variables that were described with reference to FIG. 21.

TABLE 19

Dehydration via Centritherm

| | | Analytical Data | | | | | |
|---|---|---|---|---|---|---|---|
| Trial Name | Trial date | Total Solids via Vac. Oven (%) | Fat (%) | Protein (%) | Ash (%) | Carbs by difference | CHO:Pro |
| Traditional Yogurt | | | | | | | |
| | Traditional Yogurt (CSM + Water) Run 2 | 27.23% | 0.19% | 9.73% | 2.25% | 15.06% | 1.55 |
| | Centritherm Traditional Yogurt Run 1 | 47.82% | — | — | — | — | — |

TABLE 19-continued

Dehydration via Centritherm

| | | Analytical Data | | | | | |
|---|---|---|---|---|---|---|---|
| Trial Name | Trial date | Total Solids via Vac. Oven (%) | Fat (%) | Protein (%) | Ash (%) | Carbs by difference | CHO:Pro |
| Greek Yogurt | | | | | | | |
| | Greek Yogurt (UF + NFDM) Run 2 | 25.20% | 0.34% | 13.31% | 2.03% | 9.52% | 0.72 |
| | Centritherm Greek Yogurt Run 1 | 33.39% | — | — | — | — | — |

TABLE 20

| Trial Name | Trial date | P1 (in Hg) | T1 (° F.) | TS1 (%) | TDS1 (%) | μ1 (cps) | m1 (lbs/hr) |
|---|---|---|---|---|---|---|---|
| Traditional Yogurt | | | | | | | |
| | Traditional Yogurt (CSM + Water) Run 2 | — | 96 | 27.23% | 15.06% | 4,270 | — |
| | Centritherm Traditional Yogurt Run 1 | 0.0 | 96 | — | — | 4,270 | 122 |
| Greek Yogurt | | | | | | | |
| | Greek Yogurt (UF + NFDM) Run 2 | — | 50 | 25.20% | 9.52% | 400 | — |
| | Centritherm Greek Yogurt Run 1 | 0.0 | 50 | — | — | 400 | 122 |

TABLE 21

| Trial Name | Trial date | P2 (in Hg) | T2 (° F.) | m2 (lbs/hr) |
|---|---|---|---|---|
| Traditional Yogurt | | | | |
| | Traditional Yogurt (CSM + Water) Run 2 | — | — | — |
| | Centritherm Traditional Yogurt Run 1 | — | — | — |
| Greek Yogurt | | | | |
| | Greek Yogurt (UF + NFDM) Run 2 | — | — | — |
| | Centritherm Greek Yogurt Run 1 | — | — | — |

TABLE 22

| Trial Name | Trial date | P3 (in Hg) | T3 (° F.) | TS3 (%) | TDS3 (%) | μ3 (cps) | m3 (lbs/hr) |
|---|---|---|---|---|---|---|---|
| Traditional Yogurt | | | | | | | |
| | Traditional Yogurt (CSM + Water) Run 2 | — | — | — | — | — | — |
| | Centritherm Traditional Yogurt Run 1 | 27.6 | 104 | 47.82% | — | 20,200 | 78 |
| Greek Yogurt | | | | | | | |
| | Greek Yogurt (UF + NFDM) Run 2 | — | — | — | — | — | — |
| | Centritherm Greek Yogurt Run 1 | 27.4 | 107 | 33.39% | — | 6,650 | 89 |

TABLE 23

| Trial Name | Trial date | P4 (in Hg) | T4 (° F.) | m4 (lbs/hr) |
|---|---|---|---|---|
| Traditional Yogurt | Traditional Yogurt | — | — | — |
| | (CSM + Water) Run 2 Centritherm | 27.6 | 104 | 44 |
| | Traditional Yogurt Run 1 | | | |
| Greek Yogurt | | | | |
| | Greek Yogurt (UF + NFDM) Run 2 | — | — | — |
| | Centritherm Greek Yogurt Run 1 | 27.4 | 107 | 33 |

TABLE 24

| Trial Name | Trial date | P5* (in Hg) | T5 (° F.) | m5 (lbs/hr) | P6* (in Hg) | T6 (° F.) | m6 (lbs/hr) |
|---|---|---|---|---|---|---|---|
| Traditional Yogurt | | | | | | | |
| | Traditional Yogurt (CSM + Water) Run 2 | — | — | — | — | — | — |
| | Centritherm Traditional Yogurt Run 1 | 8 | 196 | — | 8 | 196 | — |
| Greek Yogurt | | | | | | | |
| | Greek Yogurt (UF + NFDM) Run 2 | — | — | — | — | — | — |
| | Centritherm Greek Yogurt Run 1 | 7.4 | 198 | — | 7.4 | 198 | — |

*reduced pressure steam

One embodiment of the invention will now be described with reference to FIG. 23, which illustrates a method for vacuum-dehydration comprising a rising-and-falling-film plate-evaporator process 2300 (e.g., an APV, JR rising-and-falling-film plate-evaporator process). The illustrated plate-evaporator process comprises several steps. First, yogurt is fed to a tank (e.g. hold tank 2102). Second, a yogurt feed stream 2132 from the tank is fed to a feed pump 2110, which is a positive displacement pump. Third, the yogurt flows from the feed pump 2110 to a first heat exchanger (e.g. plate preheater 2304, which is a plate-and-frame heat exchanger) to provide a preheated yogurt 2332 2134. Fourth, the preheated yogurt 2332 2134 moves (e.g., flows) from the first heat exchanger to a second heat exchanger (e.g., plate evaporator 2306, which is a plate-and-frame effect unit under vacuum) to provide a heated yogurt 2134. In some embodiments, the product both rises and falls across the plates in the effect and is heated to cause boiling. Fifth, the heated yogurt 2134 flows to an evaporation chamber 2106 to provide a vacuum-dehydrated yogurt 2136 and water vapor. In some embodiments, the concentrated product falls by gravity into the lower leg of the separation chamber. Sixth, the vacuum-dehydrated yogurt 2136 moves to a concentrate pump 2112 (which can be a positive displacement pump). Seventh, the vacuum-dehydrated yogurt 2136 moves from the concentrate pump 2112 to a vacuum-dehydrated-yogurt tank 2114 or any other container outside the evaporator (e.g., evaporation chamber).

As illustrated, the water vapor 2138 from the yogurt flows to a vacuum source 2116 (e.g., vacuum pumps). For example, in one embodiment, the steam vapor separates from the product and flows to a cold condenser where it condenses to water. In some embodiments, the vacuum source provides a vacuum in the evaporation chamber of at least about 24 in. Hg, or about 24-26 in. Hg. For example, the vacuum source can be a water-ring vacuum pump.

Furthermore, as illustrated, the plate preheater 2304 is heated by a heating fluid (e.g., hot water). For example, regenerated hot water 2140 flows from a first hot water heat exchanger 2310 2108 to the plate preheater 2304 to heat the yogurt, thereby providing preheated yogurt 2332 2134 and spent hot water 2142. The spent hot water 2142 flows to the first hot water heat exchanger 2310 2108 to be reheated and provide regenerated hot water 2140. In turn, feed steam 2144 is fed to the first hot water heat exchanger 2310 2108 to heat the spent hot water 2142, thereby providing regenerated hot water 2140 and steam condensate 2146.

A similar process is used to heat the plate evaporator 2306. As illustrated, the plate evaporator 2306 is heated by a heating fluid (e.g., hot water). For example, regenerated hot water 2140 flows from a second hot water heat exchanger 2312 2108 to the plate evaporator 2306 to heat the preheated yogurt 2332 2134, thereby providing heated yogurt 2134 and spent hot water 2142. The spent hot water 2142 flows to the second hot water heat exchanger 2312 2108 to be reheated and provide regenerated hot water 2140. In turn, feed steam 2144 is fed to the second hot water heat exchanger 2312 2108 to heat the spent hot water 2142, thereby providing regenerated hot water 2140 and steam condensate 2146.

Several process variables were measured during experiments using a plate evaporator 2306 process. These are illustrated in the following Tables analogously to the variables that were described with reference to FIG. 21. Additionally, the Tables include data for total solids (wt. %) measured via METTLER HR 83 Halogen moisture analyzer Also, as used in the Tables, WPI is an abbreviation for whey protein isolate.

TABLE 25

Dehydration via APV Plate Evaporator

| Trial Name | Trial date | Total Solids via METTLER HR 83 Halogen (%) |
|---|---|---|
| Traditional Yogurt | | |
| Traditional Yogurt (CSM + Water) Run 1 | | 28.55% |
| APV Plate Evaporator Traditional Yogurt Run 1 | | 39.49% |
| Greek Yogurt | | |
| Greek Yogurt (CSM + MPC + WPI) Run 1 | | 25.22% |
| APV Plate Evaporator Greek Yogurt Run 1 | | 29.21% |

TABLE 26

| | | Analytical Data | | | | | |
|---|---|---|---|---|---|---|---|
| Trial Name | Trial date | Total Solids Vac Oven (%) | Fat (%) | Protein (%) | Ash (%) | Carbs by difference | CHO:Pro |
| Traditional Yogurt | | | | | | | |
| Traditional Yogurt (CSM + Water) Run 1 | | 226.84% | 0.12% | 9.28% | 2.09% | 15.35% | 1.65 |
| APV Plate Evaporator Traditional Yogurt Run 1 Vacuum-Dehydrated | | — | — | — | — | — | — |
| Greek Yogurt | | | | | | | |
| Greek Yogurt (CSM + MPC + WPI) Run 1 | | 24.50% | 0.12% | 13.40% | 1.75% | 9.23% | 0.69 |
| APV Plate Evaporator Greek Yogurt Run 1 Vacuum-Dehydrated | | — | — | — | — | — | — |

TABLE 27

| Trial Name | Trial date | P1 (in Hg) | T1 (° F.) | TS1 (%) | TDS1 (%) | μ1 (cps) | m1 (lbs/hr) |
|---|---|---|---|---|---|---|---|
| Traditional Yogurt | | | | | | | |
| Traditional Yogurt (CSM + Water) Run 1 | | 0.0 | 45 | 28.55%* | — | 12,200 | — |
| APV Plate Evaporator Traditional Yogurt Run 1 Vacuum-Dehydrate | | 0.0 | 83 | — | — | — | — |
| Greek Yogurt | | | | | | | |
| Greek Yogurt (CSM + MPC + WPI) Run 1 | | — | 44 | 25.22%* | — | 10,800 | — |
| APV Plate Evaporator Greek Yogurt Run 1 Vacuum-Dehydrated | | 0.0 | 83 | — | — | 5,400 | — |

*Measured using METTLER HR 83 Halogen

TABLE 28

| Trial Name | Trial date | P2 (in Hg) | T2 (° F.) | m2 (lbs/hr) |
|---|---|---|---|---|
| Traditional Yogurt | | | | |
| Traditional Yogurt (CSM + Water) Run 1 | | — | — | — |
| APV Plate Evaporator Traditional Yogurt Run 1 Vacuum-Dehydrated | | 0.0 | 140 | — |
| Greek Yogurt | | | | |
| Greek Yogurt (CSM + MPC + WPI) Run 1 | | — | — | — |
| APV Plate Evaporator Greek Yogurt Run 1 Vacuum-Dehydrated | | 0.0 | 140 | — |

TABLE 29

| Trial Name | Trial date | P3 (in Hg) | T3 (° F.) | TS3 (%) | TDS3 (%) | µ3 (cps) | m3 (lbs/hr) |
|---|---|---|---|---|---|---|---|
| Traditional Yogurt | | | | | | | |
| | Traditional Yogurt (CSM + Water) Run 1 | — | — | — | — | — | — |
| | APV Plate Evaporator Traditional Yogurt Run 1 Vacuum-Dehydrated | 26 | 120 | 39.49%* | — | 15,700 | — |
| Greek Yogurt | | | | | | | |
| | Greek Yogurt (CSM + MPC + WPI) Run 1 | — | — | — | — | — | — |
| | APV Plate Evaporator Greek Yogurt Run 1 Vacuum-Dehydrated | 26 | 119 | 29.21% | — | — | — |

*Measured using METTLER HR 83 Halogen

TABLE 30

| Trial Name | Trial date | P4 (in Hg) | T4 (° F.) | m4 (lbs/hr) |
|---|---|---|---|---|
| Traditional Yogurt | | | | |
| | Traditional Yogurt (CSM + Water) Run 1 | — | — | — |
| | APV Plate Evaporator Traditional Yogurt Run 1 Vacuum-Dehydrated | 26 | 120 | — |
| Greek Yogurt | | | | |
| | Greek Yogurt (CSM + MPC + WPI) Run 1 | — | — | — |
| | APV Plate Evaporator Greek Yogurt Run 1 Vacuum-Dehydrated | 26 | 119 | — |

TABLE 31

| Trial Name | Trial date | P5 (in Hg) | T5 (° F.) | m5 (lbs/hr) | P6 (in Hg) | T6 (° F.) | m6 (lbs/hr) | T7 (° F.) |
|---|---|---|---|---|---|---|---|---|
| Traditional Yogurt | | | | | | | | |
| | Traditional Yogurt (CSM + Water) Run 1 | — | — | — | — | — | — | — |
| | APV Plate Evaporator Traditional Yogurt Run 1 Vacuum-Dehydrated | — | — | — | — | — | — | 150 |
| Greek Yogurt | | | | | | | | |
| | Greek Yogurt (CSM + MPC + WPI) Run 1 | — | — | — | — | — | — | — |
| | APV Plate Evaporator Greek Yogurt Run 1 Vacuum-Dehydrated | — | — | — | — | — | — | 150 |

One embodiment of the invention will now be described with reference to FIG. 24, which illustrates a method for vacuum-dehydration comprising a kettle evaporator process 2400. As illustrated, the vacuum kettle evaporator comprises a jacketed kettle with a hinged lid that is open for charging and discharging product and is closed with a rubber seal and manual clamps during operation. The kettle evaporator process comprises several steps. First, yogurt feed 2132 is fed to an evaporation chamber 2106 in the form of a kettle 2402. Second, the yogurt is heated under vacuum in the evaporation chamber 2106 to provide a vacuum-dehydrated yogurt 2136 and water vapor 2138.

As illustrated, the water vapor 2138 from the yogurt flows to a vacuum source 2116 (e.g., vacuum pumps). For example, in some embodiments, evacuated air from the evaporation chamber 2106 comprises the water vapor 2138 from the yogurt and the evacuated air flows to the vacuum source 2116. As illustrated, the vacuum source is a water-ring vacuum pump which produces approximately 27 in. Hg vacuum in the evaporation chamber 2106 (e.g., kettle). Under vacuum, water vapor evaporates from the yogurt and it flows via piping to a cold water condenser.

Additionally, in some embodiments, an agitator 2408 is used to move the yogurt, for example, to prevent the yogurt from setting up. In some embodiments, the agitator 2408 is actuated by an agitator motor 2406. The illustrated agitator was a single speed agitator with fingers that sweep the interior surface of the kettle.

Furthermore, as illustrated, the evaporation chamber 2106 is heated by a heating fluid (e.g., hot water or steam). As illustrated, supplied hot water (e.g., regenerated hot water 2140) flows to a hot water jacket 2404 in contact with the exterior of the evaporation chamber 2106. As illustrated, a Strahman steam/water mixing valve was used to control the hot water flow rate to the water jacket. Accordingly, the supplied hot water heats the yogurt, thereby providing heated yogurt 2134 and a discharged hot water (e.g., spent hot water 2142). Several process variables were measured during experiments using a vacuum kettle evaporator process 2400. For example, a vacuum pressure probe 2412 was used to measure the vacuum in the evaporation chamber 2106, and a temperature probe 2410 was used to measure the temperature of the yogurt in the evaporation chamber 2106. Several measured variables are illustrated in the following Tables analogously to the variables that were described with reference to FIG. 21. Additionally, the Tables include data for total solids (wt. %) measured via METTLER HR 83 Halogen moisture analyzer. Furthermore, as illustrated in the Tables below, a traditional yogurt at about 28.55 wt. % total solids content was first vacuum-dehydrated to about 39.49 wt. % and then vacuum-dehydrated in a kettle to about 54.88 wt. %.

TABLE 32

| Dehydration via Vacuum Kettle | | | |
|---|---|---|---|
| Trial Name | | Trial date | Total Solids via METTLER HR 83 Halogen (%) |
| Traditional Yogurt | | | |
| | Traditional Yogurt (CSM + water) Run 1 | | 28.55% |

TABLE 32-continued

| Dehydration via Vacuum Kettle | | | |
|---|---|---|---|
| Trial Name | | Trial date | Total Solids via METTLER HR 83 Halogen (%) |
| | APV Plate Evaporator Traditional Yogurt Run 1 | | 39.49% |
| | Vacuum-Dehydrated Vacuum Kettle Traditional Yogurt Run 1 | | 54.88% |
| | Traditional Yogurt (CSM + Water) Run 2 | | — |
| | Convap Traditional Yogurt Run 3 Sample 5 | | — |
| | Vacuum Kettle Traditional Yogurt Run 2 | | — |
| Greek Yogurt | | | |
| | Greek Yogurt (UF + NFDM) Run 1 | | — |
| | Convap Greek Yogurt Run 2 | | — |
| | Vacuum Kettle Greek Yogurt Run 1 | | — |

TABLE 33

| Analytical Data | | | | | | | |
|---|---|---|---|---|---|---|---|
| Trial Name | Trial date | Total Solids via Vac. Oven (%) | Fat (%) | Protein (%) | Ash (%) | Carbs by difference | CHO:Pro |
| Traditional Yogurt | | | | | | | |
| | Traditional Yogurt (CSM + water) Run 1 | 26.84% | 0.12% | 9.28% | 2.09% | 15.35% | 1.65 |
| | APV Plate Evaporator Traditional Yogurt Run 1 | — | — | — | — | — | — |
| | Vacuum Kettle Traditional Yogurt Run 1 | 56.41% | 0.06% | 19.80% | 4.35% | 32.20% | 1.63 |
| | Traditional Yogurt (CSM + Water) Run 2 | 27.23% | 0.19% | 9.73% | 2.25% | 15.06% | 1.55 |
| | Convap Traditional Yogurt Run 3 Sample 5 | 60.67% | 0.47% | 21.94% | 4.80% | 33.46% | 1.53 |
| | Vacuum Kettle Traditional Yogurt Run 2 | 71.49% | 0.37% | 25.15% | 5.22% | 40.75% | 1.62 |
| Greek Yogurt | | | | | | | |
| | Greek Yogurt (UF + NFDM) Run 1 | 24.04% | 0.32% | 12.69% | 1.96% | 9.07% | 0.71 |
| | Convap Greek Yogurt Run 2 | 48.98% | — | — | 3.90% | — | — |
| | Vacuum Kettle Greek Yogurt Run 1 | 57.85% | 0.59% | 29.17% | 4.38% | 23.71% | 0.81 |

TABLE 34

| Trial Name | Trial date | P1 (in Hg) | T1 (° F.) | TS1 (%) | TDS1 (%) | μ1 (cps) | m1 (lbs/hr) |
|---|---|---|---|---|---|---|---|
| Traditional Yogurt | | | | | | | |
| | Traditional Yogurt (CSM + water) Run 1 | — | — | 26.84% | 15.35% | — | — |
| | APV Plate Evaporator Traditional Yogurt Run 1 | 0.0 | 83 | — | — | — | — |

TABLE 34-continued

| Trial Name | Trial date | P1 (in Hg) | T1 (° F.) | TS1 (%) | TDS1 (%) | μ1 (cps) | m1 (lbs/hr) |
|---|---|---|---|---|---|---|---|
| | Vacuum Kettle Traditional Yogurt Run 1 | 0.0 | 119 | — | — | 15,700 | 49.9* |
| | Traditional Yogurt (CSM + Water) Run 2 | — | — | 27.23% | 15.06% | 6,600 | — |
| | Convap Traditional Yogurt Run 3 Sample 5 | 0.0 | 110 | — | — | — | 552 |
| | Vacuum Kettle Traditional Yogurt Run 2 | 0.0 | 115 | — | — | 65,000 | — |
| Greek Yogurt | | | | | | | |
| | Greek Yogurt (UF + NFDM) Run 1 | — | — | 24.04% | 9.07% | — | — |
| | Convap Greek Yogurt Run 2 | 0.0 | 110 | — | — | — | 552 |
| | Vacuum Kettle Greek Yogurt Run 1 | 0.0 | 118 | — | — | 70,000 | 30.2* |

*starting mass (m1) and final run product mass (m3) are in lbs and are not process mass flow rates in lb/hr, as the vacuum kettle process is a batch process

TABLE 35

| Trial Name | Trial date | P2 (in Hg) | T2 (° F.) | m2 (lbs/hr) |
|---|---|---|---|---|
| Traditional Yogurt | | | | |
| | Traditional Yogurt (CSM + water) Run 1 | — | — | — |
| | APV Plate Evaporator Traditional Yogurt Run 1 | 0.0 | 140 | — |
| | Vacuum Kettle Traditional Yogurt Run 1 | — | — | — |
| | Traditional Yogurt (CSM + Water) Run 2 | — | — | — |
| | Convap Traditional Yogurt Run 3 Sample 5 | 0.0 | 157 | 552 |
| | Vacuum Kettle Traditional Yogurt Run 2 | — | — | — |
| Greek Yogurt | | | | |
| | Greek Yogurt (UF + NFDM) Run 1 | — | — | — |
| | Convap Greek Yogurt Run 2 | 0.0 | 157 | 552 |
| | Vacuum Kettle Greek Yogurt Run 1 | — | — | — |

TABLE 36

| Trial Name | Trial date | P3 (in Hg) | T3 (° F.) | TS3 (%) | TDS3 (%) | μ3 (cps) | m3 (lbs/hr) |
|---|---|---|---|---|---|---|---|
| Traditional Yogurt | | | | | | | |
| | Traditional Yogurt (CSM + water) Run 1 | — | — | — | — | — | — |
| | APV Plate Evaporator Traditional Yogurt Run 1 | 26 | 120 | 39.49% | — | 15,700 | — |
| | Vacuum Kettle Traditional Yogurt Run 1 | N/A | 98 | 56.41% | 32.20% | — | 35.9* |
| | Traditional Yogurt (CSM + Water) Run 2 | — | — | — | — | — | — |
| | Convap Traditional Yogurt Run 3 Sample 5 | 27.0 | 115 | 60.67% | 33.46% | 65,000 | 528 |
| | Vacuum Kettle Traditional Yogurt Run 2 | 28.0 | 95.0 | 71.49% | 40.75% | — | — |
| Greek Yogurt | | | | | | | |
| | Greek Yogurt (UF + NFDM) Run 1 | — | — | — | — | — | — |
| | Convap Greek Yogurt Run 2 | 27.2 | 114 | 48.98% | — | 70,000 | 520 |
| | Vacuum Kettle Greek Yogurt Run 1 | 27.5 | 111 | 57.85% | 23.71% | — | 25.6* |

*starting mass (m1) and final run product mass (m3) are in lbs and are not process mass flow rates in lb/hr, as the vacuum kettle process is a batch process

TABLE 37

| Trial Name | Trial date | P4 (in Hg) | T4 (° F.) | m4 (lbs/hr) |
|---|---|---|---|---|
| Traditional Yogurt | | | | |
| | Traditional Yogurt (CSM + water) Run 1 | — | — | — |
| | APV Plate Evaporator Traditional Yogurt Run 1 | 26 | 119 | — |
| | Vacuum Kettle Traditional Yogurt Run 1 | 26 | — | 8 |
| | Traditional Yogurt (CSM + Water) Run 2 | — | — | — |
| | Convap Traditional Yogurt Run 3 Sample 5 | 27.0 | 115 | 24 |
| | Vacuum Kettle Traditional Yogurt Run 2 | 28.0 | 95 | — |
| Greek Yogurt | | | | |
| | Greek Yogurt (UF + NFDM) Run 1 | — | — | — |
| | Convap Greek Yogurt Run 2 | 27.2 | 114 | 32 |
| | Vacuum Kettle Greek Yogurt Run 1 | 27.5 | 111 | 2.3 |

TABLE 38

| Trial Name | Trial date | P5 (in Hg) | T5 (° F.) | m5 (lbs/hr) | P6 (in Hg) | T6 (° F.) | m6 (lbs/hr) | T7 (° F.) |
|---|---|---|---|---|---|---|---|---|
| Traditional Yogurt | | | | | | | | |
| | Traditional Yogurt (CSM + water) Run 1 | — | — | — | — | — | — | — |
| | APV Plate Evaporator Traditional Yogurt Run 1 | — | — | — | — | — | — | 150 |
| | Vacuum Kettle Traditional Yogurt Run 1 | — | 140 | — | — | 135 | — | — |
| | Traditional Yogurt (CSM + Water) Run 2 | — | — | — | — | — | — | — |
| | Convap Traditional Yogurt Run 3 Sample 5 | — | 164.5 | 25,000 | — | 163.1 | 25,000 | — |
| | Vacuum Kettle Traditional Yogurt Run 2 | — | 140 | — | — | 137 | — | — |
| Greek Yogurt | | | | | | | | |
| | Greek Yogurt (UF + NFDM) Run 1 | — | — | — | — | — | — | — |
| | Convap Greek Yogurt Run 2 | — | 165.1 | 25,000 | — | 163.3 | 25,000 | — |
| | Vacuum Kettle Greek Yogurt Run 1 | — | 145 | — | — | 142 | — | — |

One embodiment, will now be described with reference to FIG. 25, which depicts the effect of added solutes on the water activity of traditional yogurts that have been vacuum dehydrated. A first yogurt was vacuum-dehydrated to about 42.5 wt. % total solids. For example, when solutes are added to the first yogurt until the combined composition of yogurt and added solutes comprises about 25 wt. % added solutes, the combined composition had a water activity of about 0.848.

Data illustrated in FIG. 25 for the 42.5 wt. % total solids yogurt is also included in Table below.

TABLE 39

| Yogurt (42.5% TS) (%) | Added Solutes (%) | TOTAL Composition (%) | $a_w$ |
|---|---|---|---|
| 75 | 25 | 100 | 0.848 |
| 65 | 35 | 100 | 0.808 |
| 55 | 45 | 100 | 0.751 |

A second yogurt was vacuum-dehydrated to about 57.5 wt. % MSNF. The second yogurt also comprised about 57.5 wt. % total solids. For example, when solutes are added to the second yogurt until the combined composition of yogurt and added solutes comprises about 25 wt. % added solutes, the combined composition had a water activity of about 0.792.

Data illustrated in FIG. 25 for the 57.5 wt. % total solids yogurt is also included in Table below.

TABLE 40

| Yogurt (57.5% TS) (%) | Added Solutes (%) | TOTAL Composition (%) | $a_w$ |
|---|---|---|---|
| 75 | 25 | 100 | 0.792 |
| 65 | 35 | 100 | 0.739 |
| 55 | 45 | 100 | 0.677 |

Figure 25:
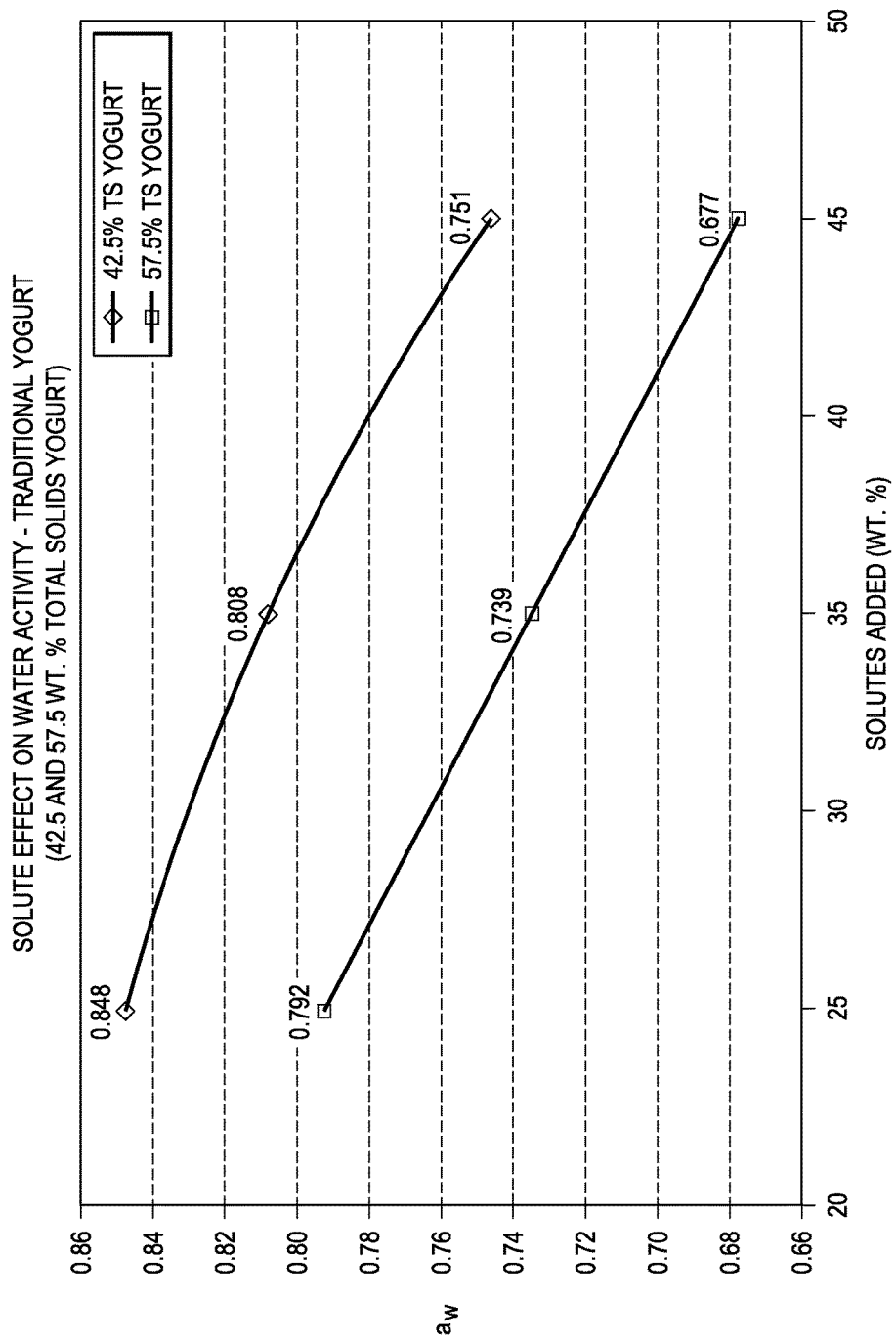
FIG. 25 is a graph illustrating the effect on water activity of added solutes as a mass percentage of a composition comprising the added solutes and a traditional yogurt that has been vacuum dehydrated to a given total solids content.

The yogurt used to produce the data illustrated in FIG. 25 was a traditional yogurt (e.g., not Greek) made using CSM and water. The yogurts were dehydrated using a Convap dehydration process until they had about 42.5 wt. % total solids and about 57.5 wt. % total solids. To obtain the data shown in FIG. 25, solutes (in a Glycerin:Fructose:Honey:Milk Permeate ratio of about 9.0:3.1:3.1:1.0 by weight) were added to the traditional yogurt and Greek yogurt to provide a composition (e.g., yogurt composition, or filling composition) comprising the yogurt and the added solutes. As shown in the Tables below, solutes were added to the yogurt until the composition of yogurt and added solutes comprised about 25 wt. %, 35 wt. % or 45 wt. % added solutes. The resulting water activity was measured for three samples of the composition at each added solute content. The average water activity for the three samples at each added solute content is reported in FIG. 25. Additionally, the viscosity of the composition was measured using a Brookfield RVT viscosity meter at the specified temperature after 30 seconds of spindle rotation at 20 RPM. This data is depicted in the Tables below.

TABLE 41

Traditional Yogurt with 42.5 wt. % Total Milk Solids

|  | 25% Solutes | | 35% Solutes | | 45% Solutes | |
| --- | --- | --- | --- | --- | --- | --- |
| Ingredient | Formula (%) | Weight (in grams) | Formula (%) | Weight (in grams) | Formula (%) | Weight (in grams) |
| Yogurt, 42.5 wt. % Milk Solids | 75 | 375 | 65 | 325 | 55 | 275 |
| Glycerin | 13.93 | 69.65 | 19.5 | 97.5 | 25.07 | 125.35 |
| Crystalline Fructose | 4.765 | 23.825 | 6.67 | 33.35 | 8.58 | 42.9 |
| Honey | 4.765 | 23.825 | 6.67 | 33.35 | 8.58 | 42.9 |
| Milk Permeate | 1.54 | 7.7 | 2.16 | 10.8 | 2.77 | 13.85 |
| Total | 100 | 500 | 100 | 500 | 100 | 500 |
| Water Activity $a_w$ 1 | | 0.8537 | | 0.8077 | | 0.7534 |
| $a_w$ 2 | | 0.8481 | | 0.8085 | | 0.7498 |
| $a_w$ 3 | | 0.8415 | | 0.8084 | | 0.7492 |
| Average $a_w$ | | 0.8478 | | 0.8082 | | 0.7508 |
| Standard Deviation | | 0.0061 | | 0.0004 | | 0.0023 |
| Filling Viscosity (cP) | | 2340 | | 2030 | | 1410 |
| Spin time at 20 RPM (sec) | | 30 | | 30 | | 30 |
| Spindle No. | | 04 | | 04 | | 04 |
| Temperature | | 68.3 | | 68.4 | | 68.35* |

*estimated temperature

TABLE 42

Traditional Yogurt with 57.5 wt. % Total Milk Solids

|  | 25% Solutes | | 35% Solutes | | 45% Solutes | |
| --- | --- | --- | --- | --- | --- | --- |
| Ingredient | Formula (%) | Weight (in g) | Formula (%) | Weight (in g) | Formula (%) | Weight (in g) |
| Yogurt, 57.5 wt. % Milk Solids | 75 | 375 | 65 | 325 | 55 | 275 |
| Glycerin | 13.93 | 69.65 | 19.5 | 97.5 | 25.07 | 125.35 |
| Crystalline Fructose | 4.765 | 23.825 | 6.67 | 33.35 | 8.58 | 42.9 |
| Honey | 4.765 | 23.825 | 6.67 | 33.35 | 8.58 | 42.9 |
| Milk Permeate | 1.54 | 7.7 | 2.16 | 10.8 | 2.77 | 13.85 |
| Total | 100 | 500 | 100 | 500 | 100 | 500 |
| Water Activity $a_w$ 1 | | 0.7912 | | 0.7383 | | 0.677 |
| $a_w$ 2 | | 0.7923 | | 0.7391 | | 0.6747 |
| $a_w$ 3 | | 0.7924 | | 0.7409 | | 0.6781 |
| Average $a_w$ | | 0.791966667 | | 0.739433333 | | 0.6766 |
| Standard Deviation | | 0.000665833 | | 0.001331666 | | 0.001734935 |
| Filling Viscosity (cP) | | 5030 | | 4030 | | 3300 |
| Torque (%) | | 50.3 | | 40.3 | | 33 |
| Spin time at 20 RPM (sec) | | 30 | | 30 | | 30 |
| Temperature | | 69.1 | | 68.8 | | 68.95* |

*estimated temperature

One embodiment of the invention will now be described with reference to FIG. 26, which illustrates how viscosity in Centipoise of a traditional yogurt and a Greek yogurt changes with the solids concentration in wt. %. The data was obtained by dehydrating both the traditional yogurt and the Greek yogurt using a Convap dehydration process.

The viscosity was measured using a Brookfield RVT viscosity meter. The viscosity was measured at the specified temperature in ° F. after sheering the sample at a spindle speed of 20 revolutions per minute (RPM) for the specified elapsed time (e.g., 30 seconds of spindle rotation). For example, the Brookfield RVT viscosity meter comprises a spindle that is inserted and suspended in a sample. The spindle is also rotated by a motor in a controlled and programmable fashion. The solids concentration was measured using a Maselli Brix meter. It appears that the Brix meter measured more than soluble solids, but not necessarily total solids. For example, Brix meter solids concentration measurements were within about 4.15 wt. % of the vacuum oven total solids concentration measurements for corresponding samples (e.g. same type of yogurt, temperature, spindle rotation speeds, and viscosity).

Figure 26:
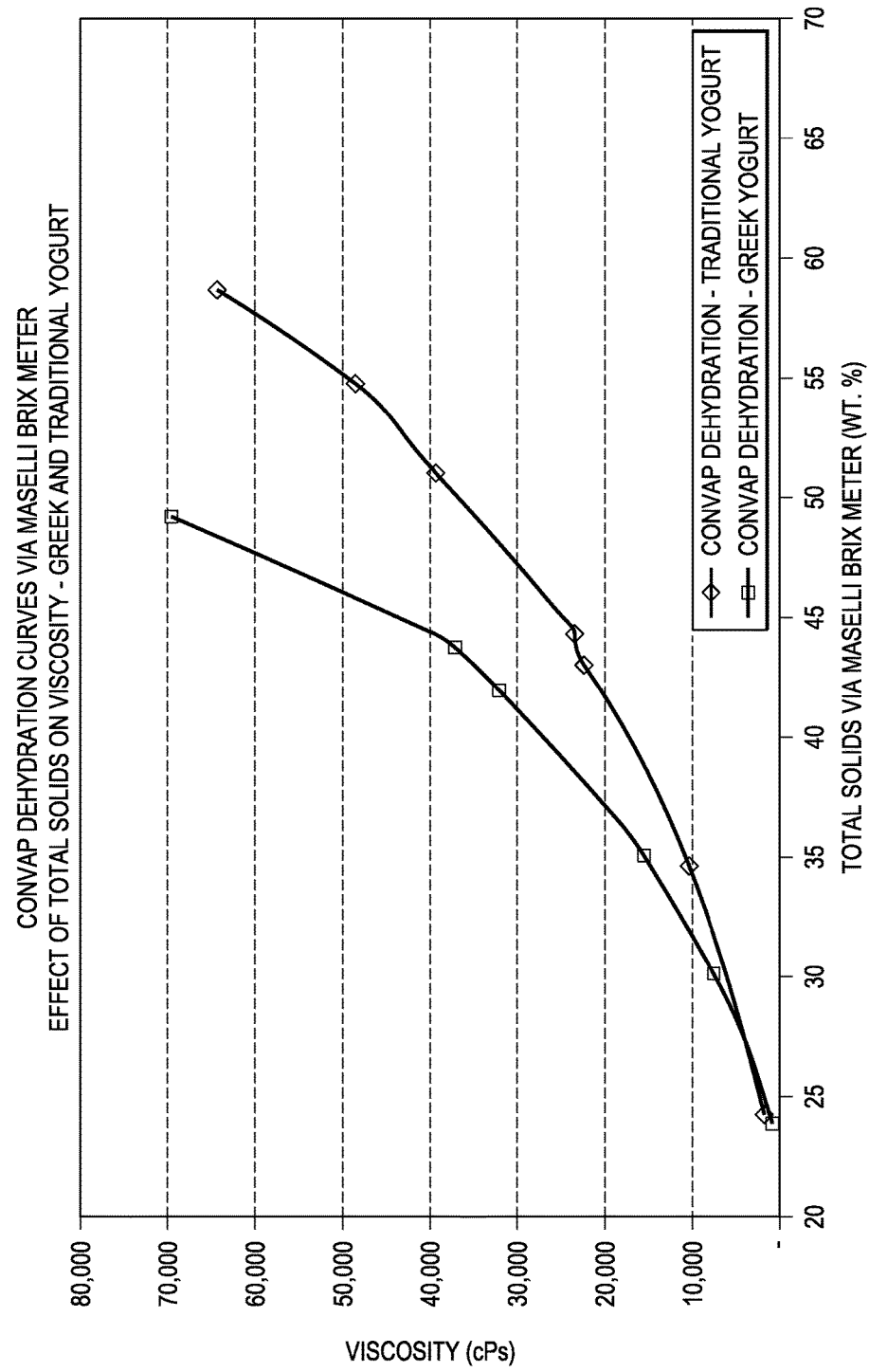
FIG. 26 is a graph illustrating the effect on viscosity of dehydrating a Greek yogurt and a traditional yogurt to a given total solids content as measured by a Maselli Brix meter.

Data illustrated in FIG. 26 showing viscosity versus solids content for traditional and Greek yogurt is also included in the Tables below.

TABLE 43

Convap Dehydration-Traditional Yogurt (CSM + Water) Run 2 — Viscosity Measurement Detail

| Total Solids Via Maselli Brix (%) | Viscosity via Brookfield RVT (cPs) | Spindle # | Temp (° F.) | elapsed time @ 20 RPM (sec) |
|---|---|---|---|---|
| 24.22 | 1,950 | 4 | 104 | 30 |
| 34.60 | 10,700 | 5 | 114 | 30 |
| 42.90 | 22,800 | 6 | 111 | 30 |
| 44.18 | 23,900 | 6 | 110 | 30 |
| 50.75 | 39,700 | 6 | 109 | 30 |
| 54.57 | 49,200 | 7 | 114 | 30 |
| 58.49 | 65,000 | | | |

TABLE 44

Convap Dehydration-Greek Yogurt (UF + NFDM) Run 2 — Viscosity Measurement Detail

| Total Solids Via Maselli Brix (%) | Viscosity via Brookfield RVT (cPs) | Spindle # | Temp (° F.) | Elapsed Time @ 20 RPM (sec) |
|---|---|---|---|---|
| 23.82 | 450 | 4 | 71 | 30 |
| 30.02 | 7,700 | 4 | 110 | 30 |
| 34.96 | 15,900 | 5 | 110 | 30 |
| 41.79 | 32,500 | 6 | 110 | 30 |
| 43.54 | 37,400 | 6 | 110 | 30 |
| 48.98 | 70,000 | 7 | 110 | 30 |

One embodiment of the invention will now be described with reference to FIG. 27, which illustrates how viscosity in Centipoise of a traditional yogurt and a Greek yogurt changes with the solids concentration in wt. %. As illustrated, the viscosity of the Greek yogurt can increase more quickly than traditional yogurt as the total solids content increases. The data was obtained by dehydrating both the traditional yogurt and the Greek yogurt using a Convap dehydration process.

The viscosity was measured using a Brookfield RVT viscosity meter. The viscosity was measured at the specified temperature in ° F. after sheering the sample at a spindle speed of 20 revolutions per minute (RPM) for the specified elapsed time (e.g., 30 seconds of spindle rotation). The solids concentration of the vacuum-dehydrated yogurt was measured by using a vacuum oven. For example, the weight of the yogurt was taken before and after the yogurt was completely dehydrated in the vacuum oven with the difference in weight being attributable to water content.

Figure 27:
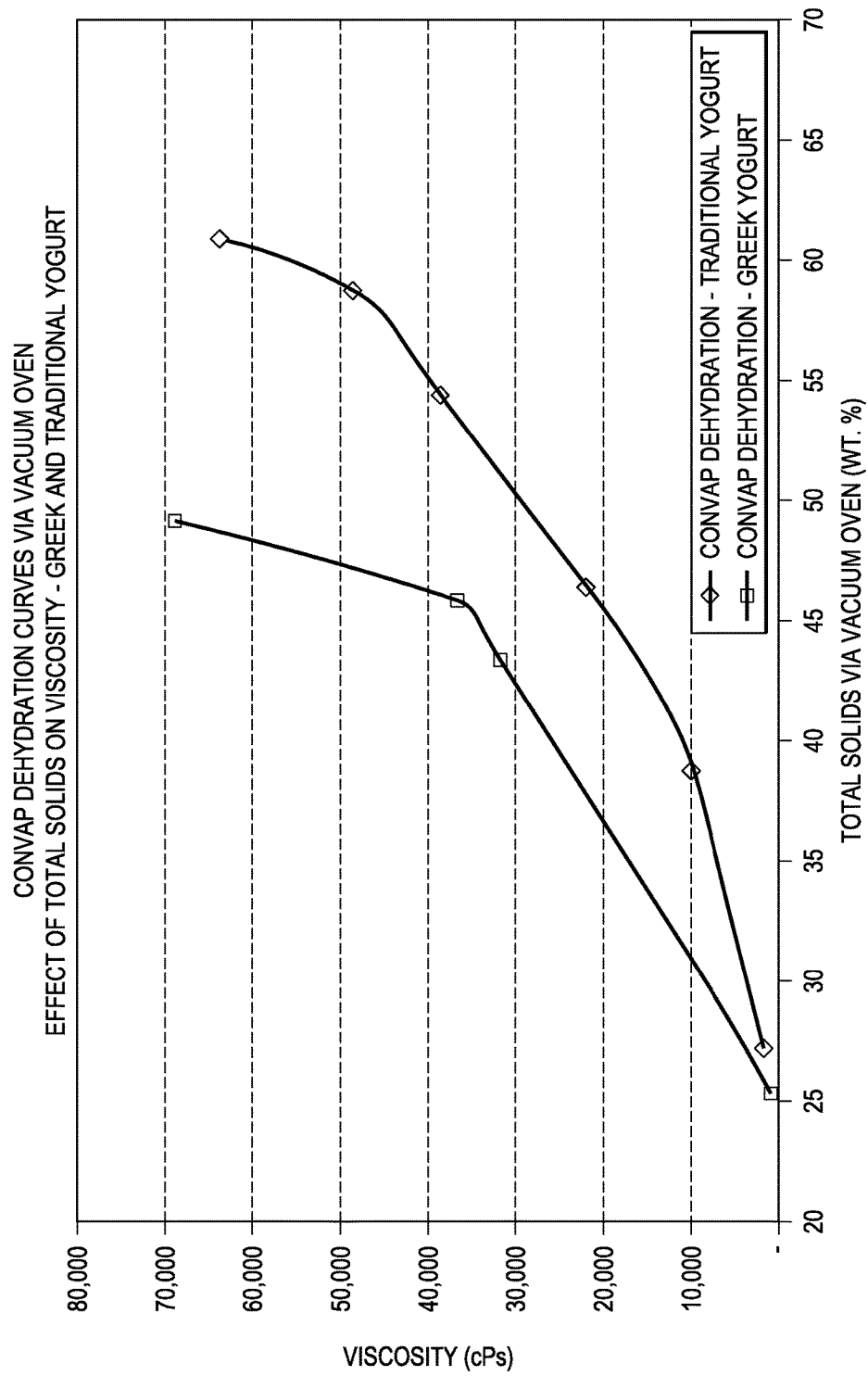
FIG. 27 is a graph illustrating the effect on viscosity of using a Convap process to dehydrate a Greek yogurt and a traditional yogurt to a given total solids content as measured using a vacuum oven.

Data illustrated in FIG. 27 showing viscosity versus solids content for traditional and Greek yogurt is also included in the Tables below.

TABLE 45

Convap Dehydration-Traditional Yogurt (CSM + Water) Run 2 — Viscosity Measurement Detail

| Total Solids Via Vacuum Oven (%) | Viscosity via Brookfield RVT (cPs) | Spindle # | Temp (° F.) | Elapsed Time at 20 RPM (sec) |
|---|---|---|---|---|
| 27.23 | 1,950 | 4 | 104 | 30 |
| 38.75 | 10,700 | 5 | 114 | 30 |
| 46.32 | 22,800 | 6 | 111 | 30 |
| 54.30 | 39,700 | 6 | 110 | 30 |
| 58.63 | 49,200 | 6 | 109 | 30 |
| 60.67 | 65,000 | 7 | 114 | 30 |

TABLE 46

Convap Dehydration-Greek Yogurt (UF + NFDM) Run 2 — Viscosity Measurement Detail

| Total Solids Via Vacuum Oven (%) | Viscosity via Brookfield RVT (cPs) | Spindle # | Temp (° F.) | Elapsed Time at 20 RPM (sec) |
|---|---|---|---|---|
| 25.20 | 450 | 4 | 71 | 30 |
| 43.37 | 32,500 | 6 | 110 | 30 |
| 45.68 | 37,400 | 6 | 110 | 30 |
| 48.98 | 70,000 | 7 | 110 | 30 |

One embodiment of the invention will now be described with reference to FIG. 28, which illustrates how viscosity in Centipoise of a traditional yogurt and a Greek yogurt changes with the solids concentration in wt. %. The data was obtained by dehydrating both the traditional yogurt and the Greek yogurt using a centrifugal evaporator dehydration process (e.g., Centritherm® process).

The viscosity was measured using a Brookfield RVT viscosity meter. The viscosity was measured at the specified temperature in ° F. after sheering the sample at a spindle speed of 20 revolutions per minute (RPM) for the specified elapsed time (e.g., 30 seconds of spindle rotation). The solids concentration of the vacuum-dehydrated yogurt was measured by using a vacuum oven. For example, the weight of the yogurt was taken before and after the yogurt was completely dehydrated in the vacuum oven with the difference in weight being attributable to water content.

Figure 28:
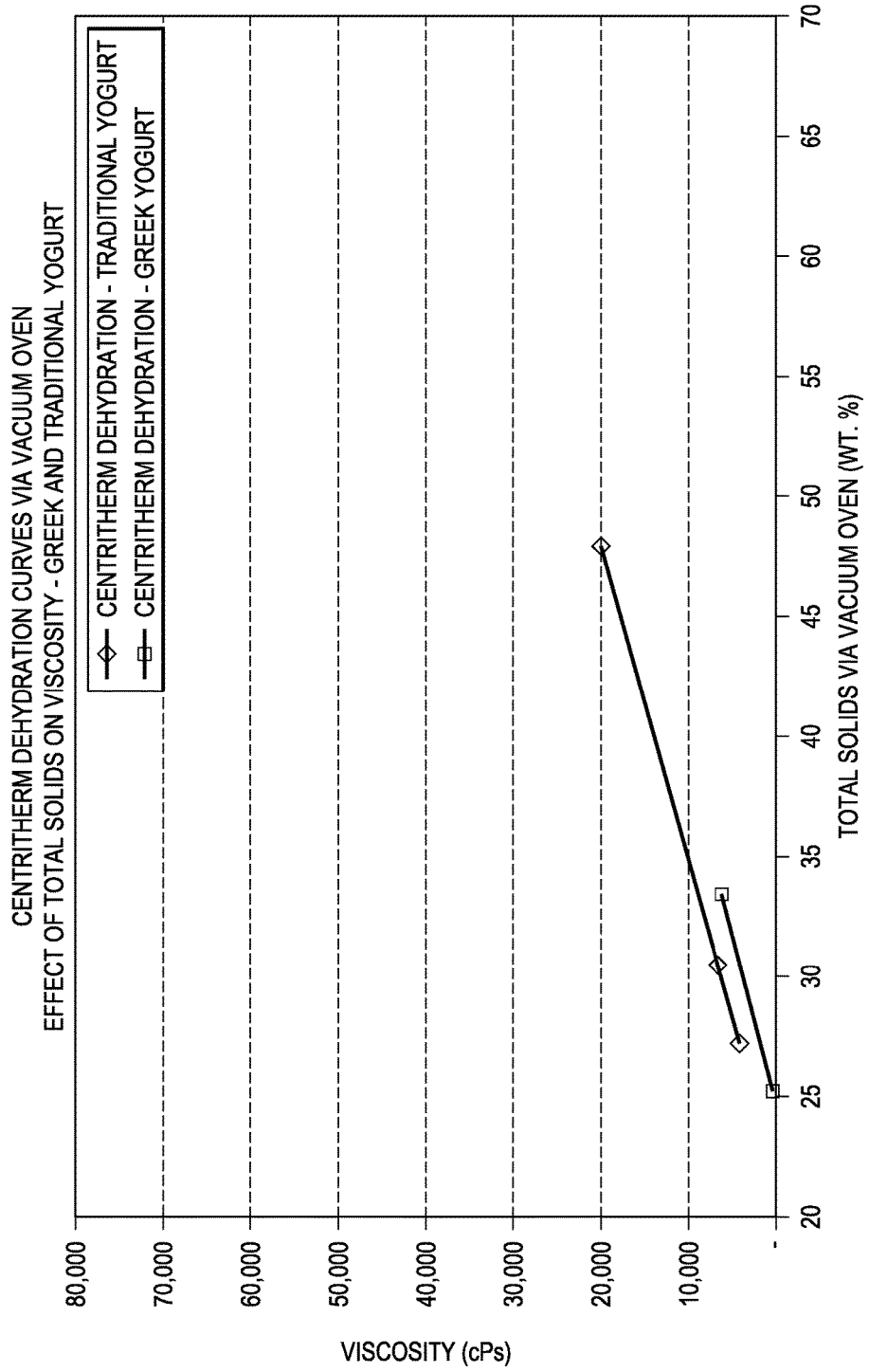
FIG. 28 is a graph illustrating the effect on viscosity of using a Convap process to dehydrate a Greek yogurt and a traditional yogurt to a given total solids content as measured using a vacuum oven.

Data illustrated in FIG. 28 showing viscosity versus solids content for traditional and Greek yogurt is also included in the Tables below.

TABLE 47

Centritherm Dehydration-Traditional Yogurt (CSM + Water) Run 2 — Viscosity Measurement Detail

| Total Solids Via Vacuum Oven (%) | Viscosity via Brookfield RVT (cps) | Spindle # | Temp (° F.) | Elapsed Time @ 20 RPM (sec) |
|---|---|---|---|---|
| 27.23 | 4,270 | 4 | 96 | 30 |
| 30.46 | 6,700 | 4 | 112 | 30 |
| 47.82 | 20,200 | 6 | 105.3 | 30 |

TABLE 48

Centritherm Dehydration-Greek Yogurt (UF + NFDM) Run 2 — Viscosity Measurement Detail

| Total Solids Via Vacuum Oven (%) | Viscosity via Brookfield RVT (cps) | Spindle # | Temp (° F.) | Elapsed Time @ RPM (sec) |
|---|---|---|---|---|
| 25.20 | 400 | 4 | 71 | 30 |
| 33.39 | 6,650 | 6 | 110 | 30 |

One embodiment of the invention will now be described with reference to FIG. 29, which illustrates how water activity of a traditional yogurt changes with the total solids concentration in wt. %. The total dissolved solids content can be approximated to by assuming that essentially all of the total solids is milk solids, non-fat and 62% of the total solids is soluble. The data was obtained by dehydrating traditional yogurt using a Convap dehydration process and a vacuum kettle dehydration process. In a first stage of the experiment, a 27.23 wt. % total solids yogurt was dehydrated using a Convap dehydration process. Then, in a second stage, the resulting vacuum-dehydrated yogurt of the prior stage was further dehydrated using the Convap dehydration process. This process was repeated successively for 5 stages of Convap dehydration. These 5 stages of Convap dehydration were then followed by vacuum kettle dehydration. Vacuum kettle dehydration can be useful for further dehydration when the viscosity of a yogurt becomes so high that even agitating the vacuum-dehydrated yogurt does not enable the yogurt to be successfully fed (e.g., without cavitation) to the inlet of a pump (e.g., concentrate pump). In some embodiments, a flowable (e.g., capable of being pumped) yogurt can have a total solids content of about 60.67 wt. % corresponding to about 65,000 cPs. For example, in some embodiments, a flowable (e.g., capable of being pumped) yogurt can have a total solids content of no more than about 60.67 wt. % corresponding to about 65,000 cPs at 114° F. after rotating a spindle in the sample for 30 seconds at 20 rpm as illustrated in the table below.

Figure 29:
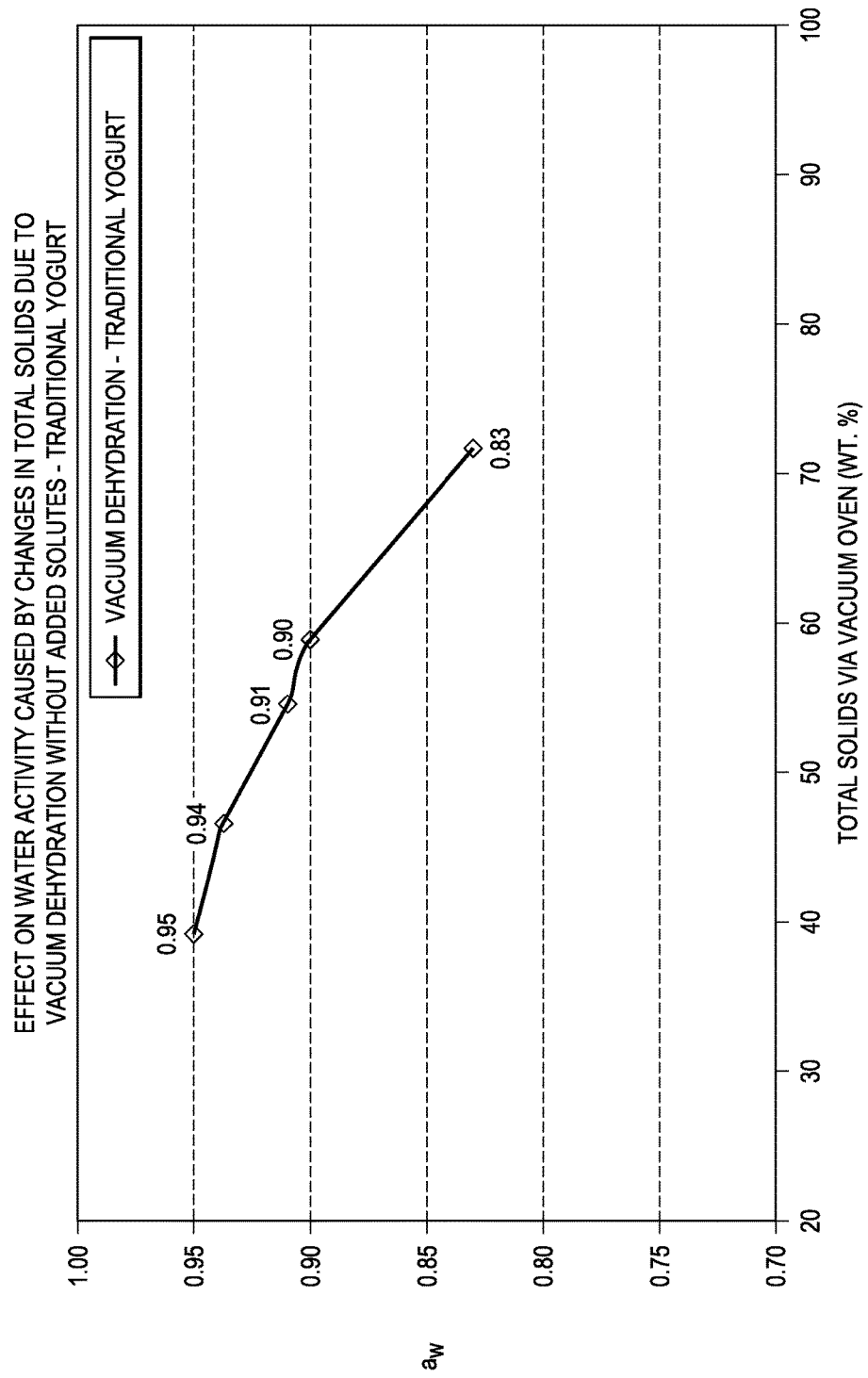
FIG. 29 is a graph illustrating the effect on water activity of vacuum dehydrating a traditional yogurt to a given total solids content as measured using a vacuum oven moisture method.

Data illustrated in FIG. 29 showing water activity and viscosity versus solids content for traditional yogurt is also included in the Table below The viscosity was measured using a Brookfield RVT viscosity meter. The viscosity was measured at the specified temperature in ° F. after sheering the sample at a spindle speed of 20 revolutions per minute (RPM) for the specified elapsed time (e.g., 30 seconds of spindle rotation). The solids concentration of the vacuum-dehydrated yogurt was measured by using a vacuum oven. The water activity was determined by an Aqua Lab Decagon water activity meter.

TABLE 49

| Vacuum Dehydration - Traditional Yogurt | | | Viscosity Measurement | | |
|---|---|---|---|---|---|
| | Total | Viscosity | | Detail | |
| Dehydration Process | Solids via Vacuum Oven (wt. %) | via Brookfield RVT (cps) | Water Activity $a_w$ | Spindle # | Temp (° F.) | Elapsed Time @ 20 RPM (sec) |
| Start | 27.23 | 1,950 | — | 4 | 104 | 30 |
| Convap Traditional Yogurt Run 3 Sample 1 | 38.75 | 10,700 | 0.95 | 5 | 114 | 30 |
| Convap Traditional Yogurt Run 3 Sample 2 | 46.32 | 22,800 | 0.94 | 6 | 111 | 30 |
| Convap Traditional Yogurt Run 3 Sample 3 | 54.30 | 39,700 | 0.91 | 6 | 110 | 30 |
| Convap Traditional Yogurt Run 3 Sample 4 | 58.63 | 49,200 | 0.90 | 6 | 109 | 30 |
| Convap Traditional Yogurt Run 3 Sample 5 | 60.67 | 65,000 | Not Measured | 7 | 114 | 30 |
| Vacuum Kettle Traditional Yogurt Run 2 | 71.50 | Not Measurable | 0.83 | N/A | N/A | N/A |

As illustrated, multiple types of vacuum dehydration can be used in combination, for example, in series, to successively concentrate a yogurt to provide a vacuum-dehydrated yogurt with a desired total solids content, total dissolved solids content, and/or water activity.

Additional Description

In one embodiment the invention is a food product comprising a yogurt, said yogurt comprising: a cultured milk comprising about 17-30% milk solids, non-fat by weight or a solute content of about 12-21% by weight.

In another embodiment the invention is a food product further comprising a water activity of about 0.85 or less. In another embodiment the invention is a food product further comprising a water activity of about 0.60 to 0.

In another embodiment the invention is a food product wherein the cultured milk comprises about 21-27% milk solids, non-fat by weight. In another embodiment the cultured milk comprises a solute content of about 14-19% by weight.

In another embodiment the food product further comprises a bar. In another embodiment the food product further comprises a cookie. In another embodiment the food product further comprises a bakery product. In another embodiment the food product further comprises a muffin. In another embodiment the food product further comprises a breakfast cereal.

In one embodiment the invention is a method for making a food product that comprises a yogurt, comprising the steps of: culturing a milk to form a yogurt, wherein the milk comprises about 17-30% milk solids, non-fat by weight or a solute content of about 12-21% by weight. In another embodiment the invention is a method, further comprising the step of: adding at least one solute to the yogurt. In another embodiment the invention is a method, wherein the milk further comprises lactose and wherein the method further comprises: adding lactase to hydrolyze the lactose. In another embodiment the adding lactase to hydrolyze the lactose in the high solids milk occurs during the culturing step.

In another embodiment the adding step comprises mixing the at least one solute with the yogurt. In another embodiment the mixing further comprises adding the at least one solute using a hot mix process. In another embodiment the mixing further comprises adding the at least one solute using a cold mix process. In another embodiment the invention is a method, further comprising: adding at least one ingredient.

In another embodiment the adding at least one ingredient step comprises mixing the at least one ingredient with the yogurt. In another embodiment the mixing the at least one ingredient further comprises adding at least one ingredient using a hot mix process. In another embodiment the mixing further comprises adding at least one ingredient using a cold mix process.

In another embodiment the invention is a method, wherein the method further comprises dehydrating the yogurt. In another embodiment the dehydrating further comprises applying a hot process with dehydration.

In another embodiment the at least one solute is added to the yogurt to reduce the water activity of the yogurt to about 0.85 or less. In another embodiment the at least one solute is added until the water activity is reduced to about 0.60 to 0.

In another embodiment the invention is a method wherein the food product further comprises a bar. In another embodiment the invention is a method, wherein the food product further comprises a cookie. In another embodiment the invention is a method, wherein the food product further comprises a bakery product. In another embodiment the invention is a method, wherein the food product further comprises a muffin. In another embodiment the invention is a method, wherein the food product further comprises a breakfast cereal.

Additional Embodiments

Additional embodiments of the invention are listed below.
1. A food product comprising a yogurt, said yogurt comprising:
a cultured milk comprising about 17-30% milk solids, non-fat by weight or a solute content of about 12-21% or 4-21% by weight, wherein the solutes are milk solids selected from the group consisting of milk solids from the milk, glucose derived from the milk solids from the milk, galactose derived from the milk solids from the milk, lactic acid derived from the milk solids from the milk, and lactase.
2. The food product of additional embodiment 1, further comprising a water activity of about 0.20 to about 0.98.
3. The food product of additional embodiment 1, further comprising a water activity of about 0.40 to about 0.98.
4. The food product of additional embodiment 2, further comprising a water activity of about 0.40 to about 0.85.
5. The food product of additional embodiment 2, further comprising a water activity of about 0.70 to about 0.85.
6. The food product of additional embodiment 2, further comprising a water activity of about 0.60 to about 0.70.
7. The food product of additional embodiment 2, further comprising a water activity of about 0.40 to about 0.60.
8. The food product of additional embodiment 2, further comprising a water activity of about 0.30 to about 0.50.
9. The food product of additional embodiment 2, further comprising a water activity of about 0.20 to about 0.40.
10. The food product of additional embodiment 2, further comprising a water activity of about 0.20 to about 0.30.
11. The food product of additional embodiment 1, further comprising a water activity in a range, the endpoints of which range comprise any two endpoints selected from endpoints of ranges given in additional embodiment 2 through additional embodiment 10.
12. The food product of additional embodiment 2, wherein the cultured milk comprises about 21-27% milk solids, non-fat by weight.
13. The food product of additional embodiment 2, wherein the cultured milk comprises a solute content of about 14-19% or about 11-18% by weight.
14. The food product of additional embodiment 2, wherein the cultured milk further comprises yogurt cultures which are resistant to a high solute environment.
15. The food product of additional embodiment 14, wherein the yogurt cultures comprise *Streptococcus thermophilus* and *Lactobacillus bulgaricus*.
16. The food product of additional embodiment 2, wherein the yogurt comprises at least one added solute.
17. The food product of additional embodiment 16, wherein the at least one added solute is selected from the group consisting of monosaccharide, disaccharide and soluble polysaccharide sugars; sugar alcohols; corn syrup; high fructose corn syrup; syrups from tapioca, wheat, rice or other grains; invert sugar syrup; honey; agave syrup; fruit juice; fruit juice concentrate; fructooligosaccharides; inulin; polydextrose; corn syrup solids; tapioca, wheat, rice and other grain syrup solids; maltodextrins; glycerin; propylene glycol; erythritol and other polyols; milk permeate; soluble minerals; salts; and lactic acid and other food acids.
18. The food product of additional embodiment 16, wherein the at least one added solute is selected from the group consisting of glycerin, fructose, honey, sucrose, invert sugar syrup, milk permeate and lactic acid.
19. The food product of additional embodiment 2, wherein the yogurt has a pH less than or equal to about 4.6.
20. The food product of additional embodiment 2, wherein the cultured milk comprises lactose that has been at least partially hydrolyzed to glucose and galactose.
21. The food product of additional embodiment 20, wherein the lactose has been substantially hydrolyzed to glucose and galactose.
22. The food product of additional embodiment 16, wherein the food product is microbiologically stable;
comprises an additional component selected from the group consisting of starch-based components and protein-based components; and
does not comprise a moisture barrier between the additional component and the yogurt.
23. The food product of additional embodiment 22, wherein the additional component comprises a grain-based component.
24. The food product of additional embodiment 16, wherein the yogurt has a smooth texture.
25. The food product of additional embodiment 2, further comprising at least one added starch.
26. The food product of additional embodiment 2, further comprising at least one added hydrocolloid.
27. The food product of additional embodiment 2, further comprising at least one added flavoring agent.
28. The food product of additional embodiment 27, wherein the flavoring agent is selected from the group consisting of vanilla, maple, coffee, chocolate, caramel, and dulce de leche.
29. The food product of additional embodiment 2, further comprising at least one added food grade acid.
30. The food product of additional embodiment 2, further comprising at least one added antimycotic.
31. The food product of additional embodiment 30, wherein the at least one added antimycotic is selected from the group consisting of sorbic acid, potassium sorbate, benzoic acid, sodium benzoate, propionic acid and sodium propionate.
32. The food product of additional embodiment 2, further comprising an added fruit piece or an added processed fruit.
33. The food product of additional embodiment 2, further comprising at least one added fruit prep.
34. The food product of additional embodiment 16, wherein the food product further comprises a bar.
35. The food product of additional embodiment 16, wherein the food product further comprises a cookie.
36. The food product of additional embodiment 16, wherein the food product further comprises a bakery product.
37. The food product of additional embodiment 36, wherein the food product further comprises a muffin.
38. The food product of additional embodiment 16, wherein the food product further comprises a breakfast cereal.

39. The food product of additional embodiment 1, wherein the cultured milk is made from a milk with a mammalian source.
40. The food product of additional embodiment 1, wherein the cultured milk is made from a milk with a bovine source.
41. The food product of additional embodiment 15, wherein the food product has a titratable acidity of at least about 0.9%.
42. The food product of additional embodiment 1, wherein the food product has a fat concentration that does not exceed about 0.5 wt %.
43. The food product of additional embodiment 1, wherein the food product has a fat concentration that does not exceed about 1.0 wt %.
44. The food product of additional embodiment 1, wherein the food product has a fat concentration that does not exceed about 2.0 wt %.
45. The food product of additional embodiment 1, wherein the food product has a fat concentration that does not exceed about 3.25 wt %.
46. The food product of additional embodiment 16, wherein the food product comprises about 9.0-30.0 wt % glycerin.
47. The food product of additional embodiment 16, wherein the food product comprises about 13.0-26.0 wt % glycerin.
48. The food product of additional embodiment 16, wherein the food product comprises about 17.0-22.0 wt % glycerin.
49. The food product of additional embodiment 46, wherein the food product comprises a mass of sweetener sufficient to mask the bitterness of the glycerin present in the food product.
50. The food product of additional embodiment 1, wherein the food product comprises a preservative.
51. The food product of additional embodiment 1, wherein the food product comprises a natural preservative.
52. A method for making a food product that comprises a yogurt, comprising the step of:
    culturing a milk to form a yogurt, wherein the milk comprises about 17-30% milk solids, non-fat by weight or a solute content of about 12-21% or 4-21% by weight.
53. The method of additional embodiment 52, further comprising the step of:
    adding at least one solute to the yogurt.
54. The method of additional embodiment 52, wherein the milk further comprises lactose and wherein the method further comprises: adding lactase to hydrolyze the lactose.
55. The method of additional embodiment 54, wherein the adding lactase to hydrolyze the lactose in the milk occurs during the culturing step.
56. The method of additional embodiment 53, wherein the adding at least one solute step comprises mixing the at least one solute with the yogurt.
57. The method of additional embodiment 56, wherein the mixing further comprises adding the at least one solute using a hot mix process.
58. The method of additional embodiment 56, wherein the mixing further comprises adding the at least one solute using a cold mix process.
59. The method of additional embodiment 52, further comprising: adding at least one ingredient.
60. The method of additional embodiment 59, wherein the adding at least one ingredient step comprises mixing the at least one ingredient with the yogurt.
61. The method of additional embodiment 60, wherein the mixing the at least one ingredient further comprises adding at least one ingredient using a hot mix process.
62. The method of additional embodiment 60, wherein the mixing further comprises adding at least one ingredient using a cold mix process.
63. The method of additional embodiment 53, wherein the method further comprises dehydrating the yogurt.
64. The method of additional embodiment 63, wherein the dehydrating further comprises applying a hot process with dehydration.
65. The method of additional embodiment 63, wherein the dehydrating further comprises applying a vacuum dehydration process to the yogurt.
66. The method of additional embodiment 53, wherein the at least one solute comprises glycerin, fructose, honey, sucrose, invert sugar syrup, milk permeate and lactic acid to form a reduced water activity yogurt.
67. The method of additional embodiment 53, further comprising: adding an additional component, selected from the group consisting of starch-based components and protein-based components, to the yogurt.
68. The method of additional embodiment 67, wherein the additional component is a grain-based component.
69. The method of additional embodiment 68, further comprising: forming a food product comprising a grain-based component and the yogurt.
70. The method of additional embodiment 69, wherein the forming a food product further comprises a cold-form process.
71. The method of additional embodiment 69, wherein the forming a food product further comprises a hot-form process.
72. The method of additional embodiment 52, wherein the culturing step further comprises culturing for a time period sufficient to lower the pH of the yogurt to less than or equal to about 4.6.
73. The method of additional embodiment 72, wherein the time period is about 8-16 hours.
74. The method of additional embodiment 52, wherein the culturing step further comprises a culturing temperature sufficient to lower the pH to less than or equal to about 4.6.
75. The method of additional embodiment 74, wherein the culturing temperature is about 43° C. or less.
76. The method of additional embodiment 74, wherein the culturing temperature is about 37 to about 43° C.
77. The method of additional embodiment 52, wherein the yogurt has a water activity of about 0.20 to 0.98.
78. The method of additional embodiment 77, wherein the at least one solute is added to the yogurt to reduce the water activity of the yogurt to about 0.40 to 0.85.
79. The food product of additional embodiment 77, wherein the at least one solute is added until the water activity is reduced to about 0.70 to about 0.85.
80. The food product of additional embodiment 77, wherein the at least one solute is added until the water activity is reduced to about 0.60 to about 0.70.
81. The food product of additional embodiment 77, wherein the at least one solute is added until the water activity is reduced to about 0.40 to about 0.60.
82. The food product of additional embodiment 77, wherein the at least one solute is added until the water activity is reduced to a range, the endpoints of which range comprise any two endpoints selected from endpoints of ranges given in additional embodiment 77 through additional embodiment 81.
83. The method of additional embodiment 52, wherein the milk comprises a solute content of about 12-21% or 4-21% by weight.

84. The method of additional embodiment 83, wherein the milk comprises a solute content of about 15-19% or 11-18% by weight.
85. The method of additional embodiment 52, wherein the milk comprises about 17-30% milk solids, non-fat by weight.
86. The method of additional embodiment 85, wherein the milk comprises about 21-27% milk solids, non-fat by weight.
87. The method of additional embodiment 52, wherein the culturing step further comprises adding to the milk yogurt cultures which are resistant to a solute concentration of about 17 wt % or more in the milk.
88. The method of additional embodiment 87, wherein the yogurt cultures comprise *Streptococcus thermophilus* and *Lactobacillus bulgaricus*.
89. The method of additional embodiment 53, wherein the at least one solute is selected from the group consisting of monosaccharide, disaccharide and soluble polysaccharide sugars; sugar alcohols; corn syrup or high fructose corn syrup; syrups from tapioca, wheat, rice or other grains; invert sugar syrup; honey; agave syrup; fruit juice and fruit juice concentrate; fructooligosaccharides; inulin; polydextrose; corn syrup solids; tapioca, wheat, rice or other grain syrup solids; maltodextrins; glycerin; propylene glycol; erythritol or other polyols; milk permeate; soluble minerals; salts; food acids; lactic acid; citric acid; acetic acid; phosphoric acid; and hydrochloric acid.
90. The method of additional embodiment 53, wherein the yogurt comprises at least one added solute selected from the group consisting of glycerin, fructose, honey, sucrose, invert sugar syrup, milk permeate and lactic acid.
91. The method of additional embodiment 52, wherein the yogurt has a pH less than or equal to about 4.6.
92. The method of additional embodiment 53, wherein the food product is microbiologically stable;
    comprises an additional component selected from starch-based components or protein-based components; and
    does not comprise a moisture barrier between the additional component and the yogurt.
93. The method of additional embodiment 92, wherein the additional component comprises a grain-based component.
94. The method of additional embodiment 53, wherein the food product has an equilibrium water activity of about 0.85 or less.
95. The method of additional embodiment 53, wherein the food product has an equilibrium water activity of about 0.40 to about 0.85.
96. The method of additional embodiment 53, wherein the food product has an equilibrium water activity of about 0.70 to about 0.85.
97. The method of additional embodiment 53, wherein the food product has an equilibrium water activity of about 0.60 to about 0.70.
98. The method of additional embodiment 53, wherein the food product has an equilibrium water activity of about 0.60 or less.
99. The method of additional embodiment 53, wherein the food product has an equilibrium water activity of about 0.40 to about 0.60.
100. The food product of additional embodiment 53, wherein the food product has an equilibrium water activity of about 0.30 to about 0.50.
101. The food product of additional embodiment 53, wherein the food product has an equilibrium water activity of about 0.20 to about 0.40.
102. The food product of additional embodiment 53, wherein the food product has an equilibrium water activity of about 0.20 to about 0.30.
103. The food product of additional embodiment 53, wherein the food product has an equilibrium water activity in a range, the endpoints of which range comprise any two endpoints selected from endpoints of ranges given in additional embodiment 94 through additional embodiment 102.
104. The method of additional embodiment 94, wherein the yogurt has a smooth texture.
105. The method of additional embodiment 52, further comprising adding a starch.
106. The method of additional embodiment 52, further comprising adding a hydrocolloid.
107. The method of additional embodiment 52, further comprising adding a flavoring agent.
108. The method of additional embodiment 107, wherein the flavoring agent is selected from the group consisting of vanilla, maple, coffee, chocolate, caramel, and dulce de leche.
109. The method of additional embodiment 52, further comprising adding a food grade acid.
110. The method of additional embodiment 52, further comprising adding an antimycotic.
111. The method of additional embodiment 110, wherein the antimycotic is selected from the group consisting of sorbic acid, potassium sorbate, benzoic acid, sodium benzoate, propionic acid and sodium propionate.
112. The method of additional embodiment 52, further comprising adding a fruit piece or a processed fruit.
113. The method of additional embodiment 52, further comprising adding a fruit prep.
114. The method of additional embodiment 53, wherein the food product further comprises a bar.
115. The method of additional embodiment 53, wherein the food product further comprises a cookie.
116. The method of additional embodiment 53, wherein the food product further comprises a bakery product.
117. The method of additional embodiment 53, wherein the food product further comprises a muffin.
118. The method of additional embodiment 53, wherein the food product further comprises a breakfast cereal.
119. The method of additional embodiment 52, wherein the method provides a food product according to any of additional embodiments 1-51.
120. A food product comprising a yogurt, said yogurt comprising:
    a cultured milk comprising about 17-30% milk solids, non-fat by weight or a solute content of about 12-21% by weight, wherein the solutes are milk solids selected from the group consisting of milk solids from the milk, glucose derived from the milk solids from the milk, galactose derived from the milk solids from the milk, lactic acid derived from the milk solids from the milk, and lactase.
121. The food product of clause 120, further comprising a water activity of about 0.20 to about 0.98.
122. The food product of clause 120, further comprising a water activity of about 0.20 to about 0.6.
123. The food product of clause 120, further comprising a water activity of about 0.30 to about 0.5.
124. The food product of clause 120, wherein the cultured milk further comprises yogurt cultures.
125. The food product of clause 124, wherein the yogurt cultures comprise *Streptococcus thermophilus* and *Lactobacillus bulgaricus*.

126. The food product of clause 120, wherein the yogurt comprises at least one added solute.
127. The food product of clause 126, wherein the at least one added solute is selected from the group consisting of monosaccharide, disaccharide and soluble polysaccharide sugars; sugar alcohols; corn syrup; high fructose corn syrup; syrups from tapioca, wheat, rice or other grains; invert sugar syrup; honey; agave syrup; fruit juice; fruit juice concentrate; fructooligo-saccharides; inulin; polydextrose; corn syrup solids; tapioca, wheat, rice or other grain syrup solids; maltodextrins; glycerin; propylene glycol; erythritol or other polyols; milk permeate; soluble minerals; salts; and lactic acid or other food acids.
128. The food product of clause 126, wherein the at least one added solute is selected from the group consisting of glycerin, fructose, honey, sucrose, invert sugar syrup, milk permeate and lactic acid.
129. The food product of clause 120, wherein the yogurt has a pH less than or equal to about 4.6.
130. The food product of clause 120, wherein the cultured milk comprises lactose that has been at least partially hydrolyzed to glucose and galactose.
131. The food product of clause 126, wherein the food product is microbiologically stable;
  comprises an additional component selected from the group consisting of starch-based components and protein-based components; and
  does not comprise a moisture barrier between the additional component and the yogurt.
132. The food product of clause 131, wherein the additional component comprises a grain-based component.
133. The food product of clause 126, wherein the yogurt has a smooth texture.
134. The food product of clause 126, further comprising at least one added starch or one added hydrocolloid.
135. The food product of clause 126, further comprising at least one added food grade acid.
136. The food product of clause 120, wherein the food product comprises a preservative.
137. The food product of clause 126, wherein the food product further comprises a bar, a cookie, a muffin, or a breakfast cereal.
138. The food product of clause 125, wherein the food product has a titratable acidity of at least about 0.9%.
139. The food product of clause 120, wherein the food product has a fat concentration that does not exceed about 3.25 wt %.
140. The food product of clause 126, wherein the food product comprises about 8.0 wt % to about 30.0 wt % glycerin.
141. The food product of clause 126, wherein the food product comprises a mass of sweetener sufficient to substantially mask the bitterness of glycerin present in the food product for an average consumer.
142. A method for making a food product that comprises a yogurt, comprising the step of:
  culturing a milk to form a yogurt, wherein the milk comprises about 17 to about 30% milk solids, non-fat by weight or a solute content of about 12% to about 21% or about 4 to 21% by weight.
143. The method of clause 142, further comprising the step of:
  adding at least one solute to the yogurt.
144. The method of clause 142, wherein the milk further comprises lactose and wherein the method further comprises adding lactase to hydrolyze the lactose.
145. The method of clause 144, wherein the adding lactase to hydrolyze the lactose in the milk occurs during the culturing step.
146. The method of clause 143, wherein the adding at least one solute step comprises mixing the at least one solute with the yogurt.
147. The method of clause 146, wherein the mixing further comprises adding the at least one solute using a cold mix process.
148. The method of clause 142, wherein the mixing further comprises adding at least one additional ingredient using a cold mix process.
149. The method of clause 143, wherein the method further comprises dehydrating the yogurt.
150. The method of clause 149, wherein the dehydrating further comprises applying a hot process with dehydration to the yogurt.
151. The method of clause 149, wherein the dehydrating further comprises applying a vacuum dehydration process to the yogurt.
152. The method of clause 143, wherein the at least one solute comprises glycerin, fructose, honey, sucrose, invert sugar syrup, milk permeate and lactic acid.
153. The method of clause 142, wherein the culturing step further comprises culturing for a time period sufficient to lower the pH of the yogurt to less than or equal to about 4.6.
154. The method of clause 142, wherein the yogurt has a water activity of about 0.20 to about 0.98.
155. The method of clause 142, wherein the at least one solute is added to the yogurt to reduce the water activity of the yogurt to about 0.40 to about 0.85.
156. The method of clause 142, wherein the culturing step further comprises adding to the milk yogurt cultures.
157. The method of clause 156, wherein the yogurt cultures comprise *Streptococcus thermophilus* and *Lactobacillus bulgaricus*.
158. The method of clause 142, wherein the yogurt has a pH less than or equal to about 4.6.
159. The method of clause 143, wherein the food product is microbiologically stable;
  comprises an additional component selected from starch-based components or protein-based components; and
  does not comprise a moisture barrier between the additional component and the yogurt.
160. The method of clause 159, wherein the additional component comprises a grain-based component.
161. The method of clause 143, wherein the yogurt has a smooth texture.
162. The method of clause 142, further comprising adding a starch or a hydrocolloid.
163. A food product comprising a yogurt, said yogurt comprising:
  a cultured milk made from a milk comprising about 17-30 wt. % milk solids, non-fat.
164. The food product of clause 163, wherein the cultured milk comprises milk solids, non-fat, from the milk and derivative solids at a combined concentration of 17-30 wt. %; and wherein the derivative solids are selected from the group consisting of glucose derived from the milk solids from the milk, galactose derived from the milk solids from the milk, and lactic acid derived from the milk solids from the milk.
165. The food product of clause 163, wherein the yogurt comprises a water activity equal to no more than about 0.86.
166. The food product of clause 163, wherein the yogurt comprises at least one added solute.

167. The food product of clause 163, wherein the yogurt has a pH equal to no more than about 4.6.
168. The food product of clause 163, wherein the cultured milk comprises lactose that has been at least partially hydrolyzed to glucose and galactose.
169. The food product of clause 163, wherein the food product:
  is microbiologically stable;
  comprises an additional component selected from the group consisting of starch-based components and protein-based components; and
  does not comprise a moisture barrier between the additional component and the yogurt.
170. The food product of clause 163, wherein the yogurt has a smooth texture.
171. The food product of clause 163, wherein the food product has a titratable acidity of at least about 0.9%.
172. The food product of clause 166, wherein the food product comprises glycerin.
173. The food product of clause 163, wherein the cultured milk comprises a solute content of about 4-21% by weight, wherein the solutes are milk solids selected from the group consisting of milk solids from the milk, glucose derived from the milk solids from the milk, galactose derived from the milk solids from the milk, lactic acid derived from the milk solids from the milk, and lactase.
174. The food product of clause 163, wherein the cultured milk comprises a solute content of about 4-12% by weight.
175. The food product of clause 163, wherein the cultured milk comprises yogurt cultures.
176. The food product of clause 163, wherein the yogurt comprises milk proteins and no more than 20 wt. % of the milk proteins are denatured.
177. A method for making a food product that comprises a yogurt, said method comprising the step of:
  culturing a milk to form the yogurt, wherein the milk comprises about 17 to about 30% milk solids, non-fat by weight.
178. The method of clause 177 wherein the milk further comprises lactose and wherein the method further comprises adding lactase to hydrolyze the lactose.
179. The method of clause 177, further comprising the step of:
  applying a vacuum dehydration process to the yogurt to provide a vacuum-dehydrated yogurt.
180. The method of clause 177, further comprising the step of:
  adding at least one solute to the yogurt.
181. The method of clause 177, wherein the yogurt has a water activity equal to no more than about 0.85.
182. The method of clause 180, wherein the at least one solute is added to the yogurt to reduce a water activity of the yogurt to about 0.40 to about 0.85.
183. The method of clause 177, wherein the yogurt has a pH less than or equal to about 4.6.
184. The method of clause 177, wherein the food product is microbiologically stable;
  comprises an additional component selected from the group consisting of starch-based components and protein-based components; and
  does not comprise a moisture barrier between the additional component and the yogurt.
185. The method of clause 177, wherein the yogurt has a smooth texture.
186. The method of clause 177, wherein the milk comprises a solute content of about 12-21% by weight.
187. The method of clause 177, wherein the milk comprises a solute content of about 4-12% by weight.
188. The method of clause 177, further comprising:
  heating the yogurt to provide less than an energy input that would denature milk proteins.
189. The method of clause 177, further comprising:
  evaporating water from the yogurt at a vacuum of at least 20 inches Hg.
190. The method of clause 177, further comprising:
  moving the yogurt during heating.
191. The method of clause 177, further comprising:
  moving the yogurt during evaporation.
192. The method of clause 179, wherein the vacuum dehydration process comprises:
  heating the yogurt before the yogurt moves to an evaporation chamber.
193. The method of clause 179, wherein the vacuum-dehydration process occurs in an evaporation chamber, and the vacuum-dehydrated yogurt exiting the evaporation chamber is agitated.
194. The method of clause 179, wherein the vacuum-dehydrated yogurt has a milk solids, non-fat concentration of at least 25 wt. %.
195. The method of clause 179, wherein the vacuum-dehydrated yogurt has a carbohydrate to protein ratio of about 1.0-1.8 and a solute content of at least 15 wt. %.
196. The method of clause 179, wherein the vacuum dehydration process provides removed water at a water removal rate of at least 1,000 lbs/hr per effect.
197. The method of clause 179, wherein the vacuum-dehydrated yogurt has a carbohydrate to protein ratio of about 0.24-1.30 and a solute content of at least 4 wt. %.
198. A food product comprising a yogurt, said food product made according to any preceding method clause.

While this invention has been particularly shown and described with reference to preferred embodiments, it will be understood by those skilled in the art that various changes in form and detail can be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Furthermore, all values used in the description should be read as being modified by the qualifier "about," unless otherwise indicated herein or clearly contradicted by context.

We claim:
1. A food product comprising a yogurt, said yogurt comprising:
  a cultured milk made from a milk comprising at least 25 wt. % and less than 29 wt. % milk solids, non-fat;
  wherein the cultured milk comprises milk solids, non-fat, from the milk and derivative solids at a combined concentration equal to at least 25 wt. % and less than 29 wt. %;
  wherein the derivative solids are selected from the group consisting of glucose derived from the milk solids from the milk, galactose derived from the milk solids from the milk, and lactic acid derived from the milk solids from the milk;

wherein the cultured milk comprises lactose that has been at least partially hydrolyzed to glucose and galactose;

wherein the yogurt comprises a water activity equal to no more than 0.70;

wherein the yogurt comprises at least one added solute, wherein the at least one added solute comprises glycerin;

wherein the yogurt has a pH equal to no more than 4.6; and wherein the yogurt has a fat concentration that does not exceed 3.25% by weight.

2. The food product of claim 1, wherein the food product:
is microbiologically stable;
comprises an additional component selected from the group consisting of starch-based components and protein-based components; and
does not comprise a moisture barrier between the additional component and the yogurt.

3. The food product of claim 1, wherein the yogurt has a smooth texture.

4. The food product of claim 1, wherein the food product has a titratable acidity of at least about 0.9%.

5. The food product of claim 1, wherein the cultured milk comprises yogurt cultures.

6. The food product of claim 1, wherein the yogurt comprises milk proteins and no more than 20 wt. % of the milk proteins are denatured.

7. A method for making a food product that comprises a yogurt, said method comprising the steps of:
culturing a milk to form the yogurt, wherein the milk comprises:
at least 25% and less than 29% milk solids, non-fat by weight; and
lactose;
adding lactase to hydrolyze the lactose; and
adding at least one solute to the yogurt, wherein the at least one solute comprises glycerin;
wherein the yogurt has a water activity equal to no more than 0.7;
wherein the yogurt has a pH equal to no more than 4.6;
wherein the yogurt has a fat concentration that does not exceed 3.25% by weight.

8. The method of claim 7, further comprising the step of:
applying a vacuum dehydration process to the yogurt to provide a vacuum-dehydrated yogurt.

9. The method of claim 7, wherein the at least one solute is added to the yogurt to reduce the water activity of the yogurt to about 0.40 to about 0.7.

10. The method of claim 7, wherein the food product is microbiologically stable;
comprises an additional component selected from the group consisting of starch-based components and protein-based components; and
does not comprise a moisture barrier between the additional component and the yogurt.

11. The method of claim 7, wherein the yogurt has a smooth texture.

12. The method of claim 7, wherein the milk comprises a solute content of about 12-21% by weight.

13. The method of claim 7, wherein the milk comprises a solute content of about 4-12% by weight.

14. The method of claim 7, further comprising:
heating the yogurt to provide less than an energy input that would denature milk proteins.

15. The method of claim 7, further comprising:
evaporating water from the yogurt at a vacuum of at least 20 inches Hg.

16. The method of claim 14, further comprising:
moving the yogurt during the heating.

17. The method of claim 8, further comprising:
moving the yogurt during evaporation that occurs while applying the vacuum dehydration process to the yogurt.

18. The method of claim 8, wherein the vacuum dehydration process comprises:
heating the yogurt before the yogurt moves to an evaporation chamber.

19. The method of claim 8, wherein the vacuum dehydration process occurs in an evaporation chamber, and the vacuum-dehydrated yogurt exiting the evaporation chamber is agitated to provide a flowable vacuum-dehydrated yogurt.

20. The method of claim 8, wherein the vacuum-dehydrated yogurt has a milk solids, non-fat concentration of at least 25 wt. %.

21. The method of claim 8, wherein the vacuum-dehydrated yogurt has a carbohydrate to protein ratio of about 1.0-1.8 and a solute content of at least 15 wt. %.

22. The method of claim 8, wherein the vacuum dehydration process provides removed water at a water removal rate of at least 1,000 lbs/hr per effect.

23. The method of claim 8, wherein the vacuum-dehydrated yogurt has a carbohydrate to protein ratio of about 0.24-1.30 and a solute content of at least 4 wt. %.

24. A food product comprising a yogurt, said food product made according to the method of claim 7.

25. The food product of claim 1, wherein the at least one added solute comprises glycerin, fructose, honey, sucrose, invert sugar syrup, milk permeate and lactic acid.

26. The method of claim 7, wherein the at least one added solute comprises glycerin, fructose, honey, sucrose, invert sugar syrup, milk permeate and lactic acid.

27. The food product of claim 1, wherein the cultured milk comprises a cultured-milk-and-derivative-solids solute content due to the milk solids, non-fat, and the derivative solids; wherein the cultured-milk-and-derivative-solids solute content is equal to at least 17.6425% and less than 20.4653% by weight.

28. The method of claim 7, wherein the milk comprises a milk-and-derivative-solids solute content due to the milk solids, non-fat, and the derivative solids; wherein the derivative solids are solids derived from milk solids in the milk; wherein the milk-and-derivative-solids solute content is equal to at least 17.6425% and less than 20.4653% by weight.

29. The food product of claim 1, wherein the yogurt comprises 8.0 to 30% glycerin by weight.

30. The method of claim 7, wherein the yogurt comprises 8.0 to 30% glycerin by weight.

* * * * *